United States Patent
Li et al.

(10) Patent No.: US 11,604,851 B2
(45) Date of Patent: Mar. 14, 2023

(54) METHOD AND FRAMEWORK FOR SYSTEM IDENTIFICATION USING ONLY PRE-BIFURCATION DATA

(71) Applicant: The Hong Kong University of Science and Technology, Hong Kong (CN)

(72) Inventors: Larry Kin Bong Li, Hong Kong (CN); Minwoo Lee, Seoul (KR); Yuanhang Zhu, Providence, RI (US); Vikrant Gupta, Shenzhen (CN); Yu Guan, Hong Kong (CN)

(73) Assignee: The Hong Kong University of Science and Technology, Hong Kong (GN)

( * ) Notice: Subject to any disclaimer, the term of this patent is extended or adjusted under 35 U.S.C. 154(b) by 248 days.

(21) Appl. No.: 15/929,995

(22) Filed: Jun. 2, 2020

(65) Prior Publication Data
US 2020/0380062 A1    Dec. 3, 2020

Related U.S. Application Data

(60) Provisional application No. 62/921,141, filed on Jun. 3, 2019.

(51) Int. Cl.
*G06F 17/12* (2006.01)
*G01N 29/24* (2006.01)

(52) U.S. Cl.
CPC ......... *G06F 17/12* (2013.01); *G01N 29/2431* (2013.01)

(58) Field of Classification Search
CPC .......... G06F 17/12; G06F 17/11; G06F 17/10; G06F 17/00; G06F 17/13; G01N 29/2431; G01N 29/24; G01N 29/22; G01N 29/00
See application file for complete search history.

(56) References Cited

U.S. PATENT DOCUMENTS 5,642,000 A  *  6/1997  Jean-Jumeau ........ H02J 3/1871
                                                    307/31
6,947,876 B1     9/2005  Galarza et al.
(Continued)

OTHER PUBLICATIONS

K.r. Schenk-Hoppe, "Bifurcation Scenarios of the Noisy Duffing-van der Pol Oscillator", May 6, 1996, Kluwer Academic Publishers, pp. 256-274 (Year: 1996).*

(Continued)

*Primary Examiner* — Mohamed Charioui
(74) *Attorney, Agent, or Firm* — S&F/WEHRW

(57) ABSTRACT

Frameworks and methods for generating early-warning indicators of impending nonlinear instabilities of a dynamical system are provided. In accordance with one aspect, the framework includes a data collector and a system identification (SI) modeler. The data collector is coupled to the dynamical system and collects pre-bifurcation data. The SI modeler predicts early-warning indicators of impending nonlinear instabilities using only the pre-bifurcation data and the SI modeler includes a means for extrapolating Fokker-Planck coefficients in response to the pre-bifurcation data to generate precursors to a Hopf bifurcation and/or to identify a type of the Hopf bifurcation and/or to forecast the limit-cycle oscillation (LCO) amplitudes of a post-bifurcation regime. In addition, the SI modeler predicts the locations of the Hopf bifurcation points, the type of the Hopf bifurcation and the LCO amplitudes of the post-bifurcation regime.

9 Claims, 47 Drawing Sheets

(56) References Cited

U.S. PATENT DOCUMENTS

| | | | |
|---|---|---|---|
| 8,452,576 B2 | 5/2013 | Reich et al. | |
| 9,517,030 B2 | 12/2016 | Hunter et al. | |
| 9,864,356 B2 | 1/2018 | Lu et al. | |
| 2015/0377915 A1* | 12/2015 | Claudel | G01P 5/02 73/170.08 |
| 2018/0333106 A1* | 11/2018 | Roberts | G16H 50/30 |

OTHER PUBLICATIONS

Noira et al.; Deterministic quantities characterizing noise driven Hopf bifurcations in gas turbine combustors; International Journal of Non-Linear Mechanics; vol. 50; 2013; pp. 152-163.
Boujo et al.; Robust identification of harmonic oscillator parameters using the adjoint Fokker-Planck equation; Proceedings of the Royal Society A; vol. 473: 20160894; 2017.
Bonciolini et al.; Experiments and modelling of rate-dependent transition delay in a stochastic subcritical bifurcation; Royal Society Open Science; vol. 5: 172078; 2018.
Lee et al.; System identification of a low-density jet via its noise-induced dynamics; Journal of Fluid Mechanics; vol. 862; 2019; pp. 200-215.
E. H. Van Nes and M. Scheffer, "Slow recovery from perturbations as a generic indicator of a nearby catastrophic shift," Am. Nat., vol. 169, No. 6, pp. 738-747, 2007.
V. Guttal and C. Jayaprakash, "Changing skewness: an early warning signal of regime shifts in ecosystems," Ecol. lett., vol. 11, No. 5, pp. 450-460, 2008.
H. Gotoda, M. Amano, T. Miyano, T. Ikawa, K. Maki, and S. Tachibana, "Characterization of complexities in combustion instability in a lean premixed gas-turbine model combustor," Chaos, vol. 22, No. 4, p. 043128, 2012.
M. Murugesan and R. I. Sujith, "Detecting the onset of an impending thermoacoustic instability using complex networks," J Propul. Power, vol. 32, No. 1, pp. 707-712, 2016.
L. Kabiraj, R. Steinert, A. Saurabh, and C. O. Paschereit, "Coherence resonance in a thermoacoustic system," Phys. Rev. E, vol. 92, p. 042909, 2015.
G. Najafian, "Application of system identification techniques in efficient modelling of offshore structural response, part i: Model validation," Appl Ocean Res., vol. 29, No. 1, pp. 17-36, 2007.
M. P. Schoen and J.-C. Lee, "Application of system identification for modeling the dynamic behavior of axial flow compressor dynamics," Int. J Rotating Mach., vol. 2017, 2017.
M. A. Fard, T. Ishihara, and H. Inooka, "Identification of the head-neck complex in response to trunk horizontal vibration," Biol. Cybern., vol. 90, No. 6, pp. 418-426, 2004.
S. L. Brunton, J. L. Proctor, and J. N. Kutz, "Discovering governing equations from data by sparse identification of nonlinear dynamical systems," Proc. Natl. Acad. Sci. USA, vol. 113, No. 15, pp. 3932-3937, 2016.

* cited by examiner

900

950

3300

3320

METHOD AND FRAMEWORK FOR SYSTEM IDENTIFICATION USING ONLY PRE-BIFURCATION DATA

PRIORITY CLAIM

This application claims priority from U.S. Provisional Patent Application No. 62/921,141 filed on Jun. 3, 2019.

TECHNICAL FIELD

The present invention generally relates to system identification of a dynamical system, and more particularly relates to system identification of a dynamical system using pre-bifurcation data and/or noise-induced data.

BACKGROUND OF THE DISCLOSURE

Many natural and engineered systems are nonlinear and exhibit qualitative transitions in response to variations in the system parameters. In a dynamical system, such a transition is known as a bifurcation, and the parameters under variation are called the bifurcation parameters. Typical examples of bifurcations include Hopf bifurcations, saddle-node (fold) bifurcations, pitchfork bifurcations, flip bifurcations, and transcritical bifurcations. A bifurcation is generally accompanied by a change in stability of the system's coexisting solutions. A change in the stability and/or the number of system's equilibria occur at a critical point referred to as a bifurcation point.

To be able to predict locations and types of bifurcation points and the dynamics beyond them, existing system-identification methods require data in the limit-cycle regime after the bifurcation has occurred (i.e., post-bifurcation data), which can be difficult or even dangerous to obtain.

Thus, there is a need for methods and frameworks to predict the locations and types of bifurcation points with only pre-bifurcation data. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a method for system identification in a dynamical system is provided. The method includes determining non-linear behavior in a post-bifurcation regime of the dynamical system using only pre-bifurcation data from a pre-bifurcation regime of the dynamical system. Determining the non-linear behavior in the post-bifurcation regime of the dynamical system includes predicting the order of nonlinearity, the location of one or more bifurcation points separating the pre-bifurcation regime from the post-bifurcation regime, a type of the bifurcation, or limit-cycle oscillations in the post-bifurcation regime.

According to another aspect of the present embodiments, a framework for generating early-warning indicators of impending nonlinear instabilities of a dynamical system is provided. The framework includes a data collector and a system identification (SI) modeler. The data collector is coupled to the dynamical system and collects pre-bifurcation data. The SI modeler predicts early-warning indicators of impending nonlinear instabilities using only the pre-bifurcation data and the SI modeler includes a means for extrapolating van der Pol coefficients in response to the pre-bifurcation data to generate precursors to a Hopf bifurcation and/or to identify a type of the Hopf bifurcation and/or to forecast limit-cycle oscillation (LCO) amplitudes of a post-bifurcation regime. In addition, the SI modeler predicts the properties of a Hopf bifurcation, such as the location of the Hopf point, the type of the Hopf bifurcation and the LCO amplitudes of the post-bifurcation regime.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 1A is a conventional schematic illustration of Hopf bifurcations, wherein FIG. 1A is a schematic illustration of a supercritical Hopf bifurcation.

FIG. 1B is a conventional schematic illustration of Hopf bifurcations, wherein FIG. 1B is a schematic illustration of a subcritical Hopf bifurcation.

FIG. 2A depicts illustrations of conventional pre-bifurcation features, wherein FIG. 2A depicts four illustrations of system recovery from a perturbation near to or far from bifurcation recovery.

FIG. 2B depicts illustrations of conventional pre-bifurcation features, wherein FIG. 2B depicts graphs illustrating skewness of V under a change in the bifurcation parameter c.

FIG. 3A depicts a graph of conventional singularity features, wherein FIG. 3A depicts a graph of singularity spectra for varying equivalence ratio ($\phi$) as a measure of multi-fractality.

FIG. 3B depicts a graph of conventional singularity features, wherein FIG. 3B depicts a graph of the singularity spectra width for varying equivalence ratio ($\phi$) as a measure of multi-fractality.

FIG. 4A depicts a graph of conventional pressure and network properties in a combustor, wherein FIG. 4A depicts a root mean square (RMS) unsteady pressure.

FIG. 4B depicts a graph of conventional pressure and network properties in a combustor, wherein FIG. 4B depicts a normalized clustering coefficient.

FIG. 4C, depicts a graph of conventional pressure and network properties in a combustor, wherein FIG. 4C depicts a normalized characteristic path length.

FIG. 4D depicts a graph of conventional pressure and network properties in a combustor, wherein FIG. 4D depicts a normalized network diameter.

FIG. 4E depicts a graph of conventional pressure and network properties in a combustor, wherein FIG. 4E depicts a normalized global efficiency.

FIG. 5A depicts graphs of conventional effects of varying levels of noise, wherein FIG. 5A depicts a graph of pressure fluctuation amplitude under varying levels of noise in a subthreshold regime and FIG. 5B depicts a graph of coherence factor ($\beta$) as a function of noise for different equivalence ratios.

FIG. 5B depicts graphs of conventional effects of varying levels of noise, wherein FIG. 5B depicts a graph of coherence factor ($\beta$) as a function of noise for different equivalence ratios.

FIG. 7A depicts an example of system identification applications for the system identification loop of FIG. 6, wherein FIG. 7A is an illustration of an offshore structure.

FIG. 7B depicts an example of system identification applications for the system identification loop of FIG. 6, wherein FIG. 7B is a schematic illustration of an axial compressor.

FIG. 7C depicts an example of system identification applications for the system identification loop of FIG. 6, wherein FIG. 7C is an illustration of a human head-neck complex.

FIG. 9A depicts an illustrations of evolution of a(t) and x(t) for different system states, wherein FIG. 9A is an illustration of noise-induced dynamics in a marginally unconditionally stable regime.

FIG. 9B depicts an illustrations of evolution of a(t) and x(t) for different system states, wherein FIG. 9B is an illustration of noise-free limit-cycle development in a marginally linearly unstable regime.

FIG. 11A depicts a graph of bifurcation for two representative flow conditions in accordance with the present embodiments, wherein FIG. 11A is a bifurcation graph of a first experimental case ExpSuper.

FIG. 11B depicts a graph of bifurcation for two representative flow conditions in accordance with the present embodiments, wherein FIG. 11B is a bifurcation graph of a second experimental case ExpSub.

FIG. 12A shows the process of finding the unknown parameters of the actuator model, which converts the loudspeaker input voltage (V) to the noise amplitude (d), wherein FIG. 12A is a graph modelling an actuator to determine experimental data and linear fits for a variable n.

FIG. 12B shows the process of finding the unknown parameters of the actuator model, which converts the loudspeaker input voltage (V) to the noise amplitude (d), wherein FIG. 12B is a graph modelling an actuator to determine experimental data and linear fits for variables b and k.

FIG. 13A depicts a graph of probability density function of the velocity fluctuation amplitude (P(a)) under increasing noise amplitudes in accordance with the present embodiments, wherein FIG. 13A is a graph for ExpSuper (Re=584).

FIG. 13B depicts a graph of probability density function of the velocity fluctuation amplitude (P(a)) under increasing noise amplitudes in accordance with the present embodiments, wherein FIG. 13B is a graph for ExpSub (Re=755).

FIG. 14A depicts model coefficients with respect to Re for the ExpSuper data in accordance with the present embodiments, wherein FIG. 14A is a graph of a linear fit of experimental data.

FIG. 15A depicts model coefficients with respect to Re for ExpSub in accordance with the present embodiments, wherein FIG. 15A is a graph of a linear fit of experimental data.

FIG. 15B depicts model coefficients with respect to Re for ExpSub in accordance with the present embodiments, wherein FIG. 15B is a graph of power-law fits of the experimental data.

FIG. 15C depicts model coefficients with respect to Re for ExpSub in accordance with the present embodiments, wherein FIG. 15C is a graph of power-law fits of the experimental data.

FIG. 15D depicts model coefficients with respect to Re for ExpSub in accordance with the present embodiments, wherein FIG. 15D is a graph of power-law fits of the experimental data.

FIG. 15E depicts model coefficients with respect to Re for ExpSub in accordance with the present embodiments, wherein FIG. 15E is a graph of power-law fits of the experimental data.

FIG. 16A depicts dynamic and P-bifurcation plots of ExpSuper data in accordance with the present embodiments, wherein FIG. 16A is a dynamic bifurcation plot of the ExpSuper data.

FIG. 16B depicts dynamic and P-bifurcation plots of ExpSuper data in accordance with the present embodiments, wherein FIG. 16B is a P-bifurcation or stochastic bifurcation plot of the ExpSuper data.

FIG. 17A depicts dynamic and P-bifurcation plots of ExpSub data in accordance with the present embodiments, wherein FIG. 17A is a dynamic bifurcation plot of the ExpSub data.

FIG. 17B depicts dynamic and P-bifurcation plots of ExpSub data in accordance with the present embodiments, wherein FIG. 17B is a P-bifurcation or stochastic bifurcation plot of the ExpSub data.

FIG. 21A depicts an illustration of operational data of the system of FIG. 20 collected in accordance with the present embodiments, wherein FIG. 21A depicts an experimental bifurcation diagram of the system.

FIG. 21B depicts an illustration of operational data of the system of FIG. 20 collected in accordance with the present embodiments, wherein FIG. 21B depicts the power spectral density of the pressure fluctuations as a function of the flame position.

FIG. 23A depicts a graph of experimental data obtained from the system of FIG. 20 to determine actuator model coefficients in accordance with the present embodiments, wherein FIG. 23A is a graph of experimental data where the gradient of a linear fit of that data has a gradient of the actuator model coefficient n k.

FIG. 23B depicts a graph of experimental data obtained from the system of FIG. 20 to determine actuator model coefficients in accordance with the present embodiments, wherein FIG. 23B is a graph of experimental data where the gradient of a linear fit of that data has a gradient of the actuator model coefficient k.

FIG. 25A depicts a graph illustrating anisochronicity of the system of FIG. 20 just before the Hopf point in accordance with the present embodiments, wherein FIG. 25A depicts a graph of a peak frequency as a function of a noise amplitude.

FIG. 25B depicts a graphs illustrating anisochronicity of the system of FIG. 20 just before the Hopf point in accordance with the present embodiments, wherein FIG. 25B depicts a power spectral density graph at different values of noise amplitudes on a fixed-point branch.

FIG. 26A depicts a graph of DVDP coefficient determination in accordance with the present embodiments, wherein FIG. 26A is a graph of a linear fit of experimental data for the linear coefficient ($\varepsilon$)

FIG. 26B depicts a graph of DVDP coefficient determination in accordance with the present embodiments, wherein FIG. 26B is a graph of power-law fits of the experimental data for the nonlinear coefficients ($\alpha_1$, $\alpha_2$, $\alpha_3$).

FIG. 26C depicts a graph of DVDP coefficient determination in accordance with the present embodiments, wherein FIG. 26C is a graph of power-law fits of the experimental data for the nonlinear coefficients ($\alpha_1$, $\alpha_2$, $\alpha_3$).

FIG. 26D depicts a graph of DVDP coefficient determination in accordance with the present embodiments, wherein FIG. 26D is a graph of power-law fits of the experimental data for the nonlinear coefficients ($\alpha_1$, $\alpha_2$, $\alpha_3$).

FIG. 26E depicts a graph of DVDP coefficient determination in accordance with the present embodiments, wherein FIG. 26E is a graph of power-law fits of the experimental data for the nonlinear coefficients ($\alpha_1$, $\alpha_2$, $\alpha_3$).

FIG. 28A depicts a graph comparing phase portraits of experimental data with phase portraits of the numerical model found via SI in accordance with the present embodiments, wherein FIG. 28A is a graph of phase portraits at a position on the limit-cycle branch where z/L=0.273.

FIG. 28B depicts a graph comparing phase portraits of experimental data with phase portraits of the numerical model found via SI in accordance with the present embodiments, wherein FIG. 28B is a graph of phase portraits at a position on the limit-cycle branch where z/L=0.285.

FIG. 28C depicts a graph comparing phase portraits of experimental data with phase portraits of the numerical model found via SI in accordance with the present embodiments, wherein FIG. 28C is a graph of phase portraits at a position on the limit-cycle branch where z/L=0.297.

FIG. 28D depicts a graph comparing phase portraits of experimental data with phase portraits of the numerical model found via SI in accordance with the present embodiments, wherein FIG. 28D is a graph of phase portraits at a position on the limit-cycle branch where z/L=0.308.

FIG. 31A depicts a graph of an experimental pre-bifurcation data in accordance with the present embodiments, wherein FIG. 31A is a phase portrait.

FIG. 31B depicts a graph of experimental pre-bifurcation data in accordance with the present embodiments, wherein FIG. 31B is graph of a time series.

FIG. 31C depicts a graph of experimental pre-bifurcation data in accordance with the present embodiments, wherein FIG. 31C is a graph of power spectral density (PSD).

FIG. 31D depicts a graph of experimental pre-bifurcation data in accordance with the present embodiments, wherein FIG. 31D is a graph of a normalized auto-correlation function (ACF).

FIG. 32A depicts a graph of experimental data at a location near the bifurcation point in accordance with the present embodiments, wherein FIG. 32A is graph of a time series.

FIG. 32B depicts a graph of experimental data at a location near the bifurcation point in accordance with the present embodiments, wherein FIG. 32B is a graph of PSD FIG. 32C depicts a graph of experimental data at a location near the bifurcation point in accordance with the present embodiments, wherein FIG. 32C is a graph of normalized ACF.

FIG. 33A depicts a graph of experimental post-bifurcation data in accordance with the present embodiments, wherein FIG. 33A is a phase portrait.

FIG. 33B depicts a graph of experimental post-bifurcation data in accordance with the present embodiments, wherein FIG. 33B is graph of a time series.

FIG. 33C depicts a graph of experimental post-bifurcation data in accordance with the present embodiments, wherein FIG. 33C is a graph of PSD.

FIG. 33D depicts a graph of experimental post-bifurcation data in accordance with the present embodiments, wherein FIG. 33D is a graph of normalized ACF.

FIG. 34A depicts a graph of drift and diffusion terms measured experimentally and their regression for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 34A depicts a graph of drift terms.

FIG. 34B depicts a graph of drift and diffusion terms measured experimentally and their regression for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 34B depicts a graph of diffusion terms.

FIG. 35A depicts a graph illustrating convergence history of terms from Equation 27 for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 35A is a graph of the convergence history of E, which is the error between the experimental and numerical drift and diffusion terms.

FIG. 35B depicts a graph illustrating convergence history of terms from Equation 27 for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 35B is a graph of the convergence history of d.

FIG. 35C depicts a graph illustrating convergence history of terms from Equation 27 for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 35C is a graph of the convergence history of ε.

FIG. 35D depicts a graph illustrating convergence history of terms from Equation 27 for three combustor lengths $l_c$ (i.e., a pre-bifurcation length of 1375 mm, a post-bifurcation length of 1600 mm, and a length of 1500 mm around the bifurcation point) in accordance with the present embodiments, wherein FIG. 35D is a graph of the convergence history of $α_1$.

FIG. 36A depicts a graph of amplitude and coefficients after SI optimization in accordance with the present embodiments, wherein FIG. 36A is a graph of noise amplitude d.

FIG. 36B depicts a graph of amplitude and coefficients after SI optimization in accordance with the present embodiments, wherein FIG. 36B is a graph of the linear VDP coefficient ε.

FIG. 36C depicts a graph of amplitude and coefficients after SI optimization in accordance with the present embodiments, wherein FIG. 36C is a graph of the highest identifiable nonlinear coefficient $α_1$.

Figure 1A:
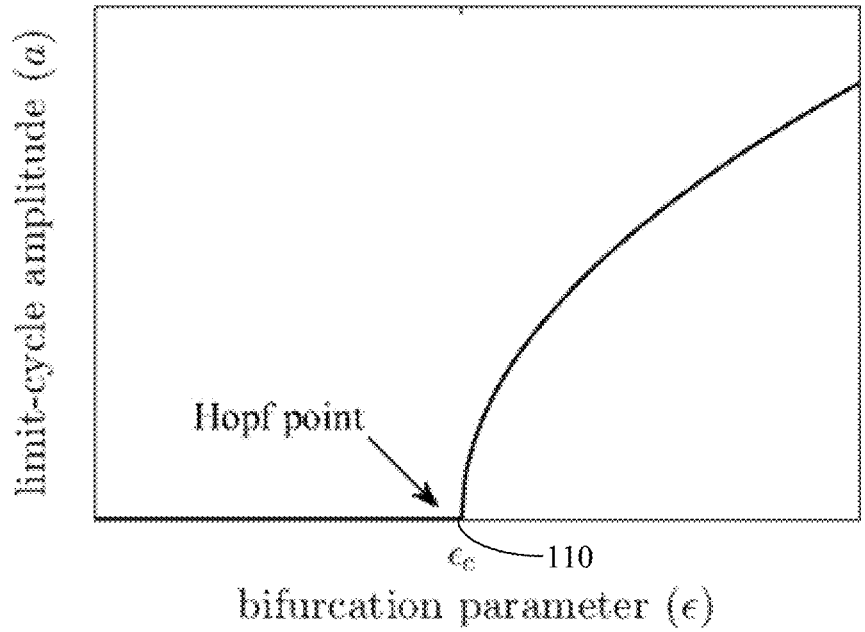

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present system identification methods and frameworks that can successfully predict an (i) order of nonlinearity, (ii) locations and types of bifurcation points, and (iii) limit-cycle dynamics beyond them without the need for post-bifurcation data. The system identification methods and frameworks in accordance with present embodiments use data from only the unconditionally stable regime of pre-bifurcation data. A novel actuator model in accordance with the present embodiments exploits the noise-induced response of the system. In addition, a coefficient extraction method based on the probability density function of the noise-perturbed oscillatory system is utilized in accordance with the present embodiments. Further, a framework for the extrapolation of the van der Pol coefficients in accordance with the present embodiments enables accurate prediction of bifurcation and post-bifurcation behaviors.

The methods and frameworks in accordance with the present embodiments require only data in the unconditionally stable regime (i.e. before bifurcation) to predict the locations and types of bifurcation points and the dynamics beyond them. This is achieved by combining accurate extraction of the van der Pol coefficients and the reconstruction of bifurcation diagrams based on the extrapolation of those coefficients. Although existing methods using noise-induced dynamics employ output-only methods, the methods in accordance with the present embodiments utilizes a more robust input-output method, which is enabled by a unique actuator model that quantifies the system input noise. Through this method, the system identification framework in accordance with the present embodiment can successfully predict the bifurcation point, the bifurcation type, and the post-bifurcation dynamics with data from only the unconditionally stable pre-bifurcation regime.

Many natural and engineered systems are nonlinear and exhibit qualitative transitions in response to variations in the system parameters. In a dynamical system, such a transition is known as a bifurcation, and the parameters under variation are called the bifurcation parameters. A bifurcation is generally accompanied by a change in stability of the system's coexisting solutions. For example, a dynamical system with bifurcation parameter ε:

$$\frac{dX}{dt} = F(X, \varepsilon), \quad (1)$$

has a bifurcation at a critical value $\varepsilon = \varepsilon_c$, where F is a smooth function. A change in the stability and/or the number of system's equilibria occur at the critical point ($\varepsilon = \varepsilon_c$). Typical examples of bifurcations, as mentioned above, include Hopf bifurcations, saddle-node (fold) bifurcations, pitchfork bifurcations, flip bifurcations, and transcritical bifurcations.

While Hopf bifurcations, also known as Poincare-Andronov-Hopf bifurcations, are the focus of the discussion below, methods and frameworks in accordance with the present embodiments are not limited to Hopf bifurcations and are applicable to other types of bifurcations. In Equation 1, let X* be a steady solution $F(X^*, \varepsilon) = 0$, while ε is varied. When linearized near X*, the Jacobian matrix J of the system is:

$$J = \frac{\partial F(X, \varepsilon)}{\partial X}\bigg|_{X=X^*}. \quad (2)$$

Suppose there exists a pair of nonzero complex conjugate eigenvalues of J. When this pair crosses the imaginary axis due to a variation in ε, the fixed-point solution loses stability, and a limit-cycle is born at a Hopf point $\varepsilon=\varepsilon_c$. The normal form of the Hopf bifurcation for variable α is:

$$\frac{da}{dt} = a((\varepsilon + i) + \alpha_1|a|^2 + \ldots), \quad (3)$$

where $\alpha_1 = \alpha_{R1} + \alpha_{I1}$ i. Equation 3 is known as the Stuart-Landau equation and is derived from hydrodynamic equations using an energy balance. Both $\alpha_{R1}$ and $\alpha_{I1}$ are real, and $\alpha_{R1}$ is called the first Lyapunov constant. The amplitude of the limit-cycle is determined by ε and $\alpha_{R1}$, and its angular frequency is determined by $\alpha_{I1}$.

Figure 1B:
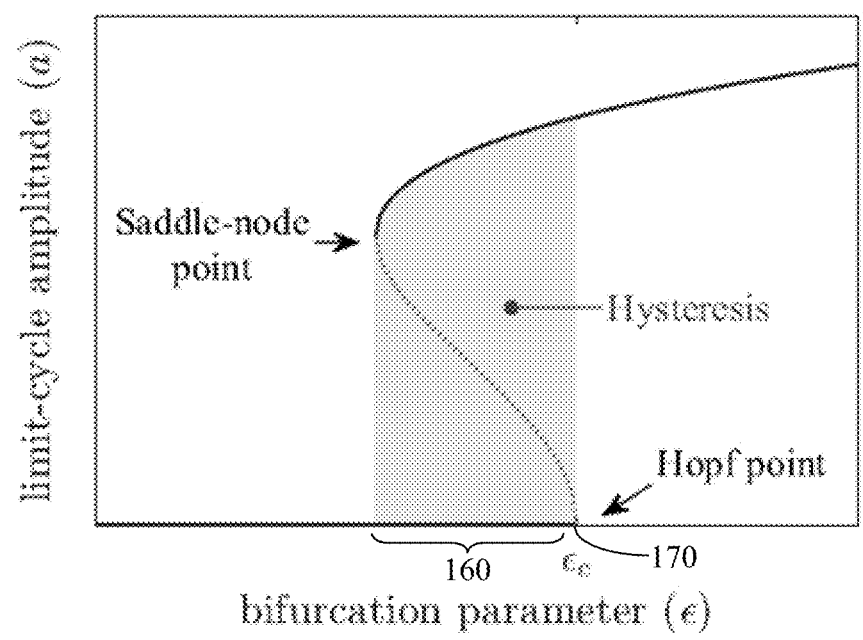

Referring to FIGS. 1A and 1B, schematic illustrations 100, 150 depict two ways in which a Hopf bifurcation can occur. The schematic illustration 100 depicts a supercritical Hopf bifurcation. When $\alpha_{R1}$ is negative, a supercritical Hopf bifurcation occurs where limit-cycle oscillations are observed only after the critical point 110 ($\varepsilon > \varepsilon_c$) and their amplitude gradually increases. The schematic illustration 150 depicts a subcritical Hopf bifurcation. When $\alpha_{R1}$ is positive, a subcritical Hopf bifurcation occurs where the limit-cycle can be found in the hysteretic region 160 ($\varepsilon < \varepsilon_c$) before the Hopf point 170. An abrupt jump of the oscillation amplitude is observed for this type of Hopf bifurcation.

Hopf bifurcations arise in many oscillatory systems in nature and engineering, including chemical, biological, electrical, finance, fluid and fluid-structural systems. In such practical systems, limit-cycle oscillations are sometimes desirable and sometimes not desirable because they can cause unwanted resonances. For both cases, predicting the bifurcation and its resulting limit-cycle dynamics is important.

For many years, early-warning indicators of impending bifurcation have been studied. For example, a phenomenon commonly used to develop early-warning indicators is Critical Slowing Down (CSD). When a small perturbation is introduced to a system, the system recovers to its stable solution. As the system approaches the 'critical point' (i.e. bifurcation), the rate at which it recovers from the perturbation becomes slower. This 'slowing down' phenomenon near a bifurcation is called CSD.

Figure 2A:
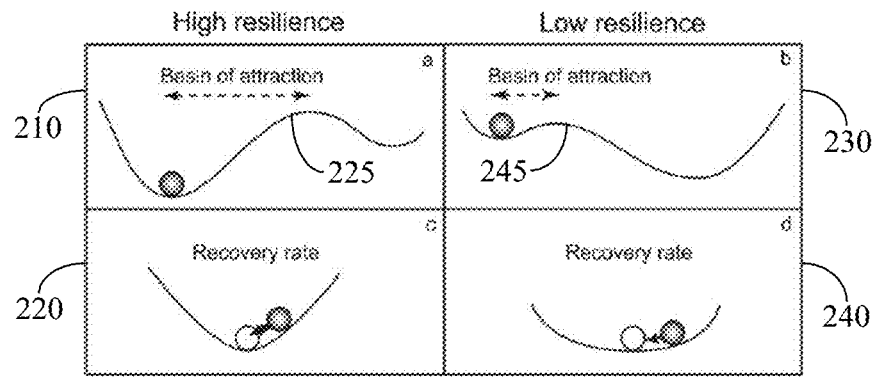

Analyses of various systems show that CSD starts well before the bifurcation point is reached, with the recovery rate decreasing monotonically as the bifurcation is approached. Quantitatively, CSD can be inferred from an increasing return time, higher lag-1 autocorrelation, increasing variance, or other indicators. Referring to FIG. 2A, depict illustrations 200 of the CSD phenomenon. (Source of FIG. 2A: E. H. Van Nes and M. Scheffer, "Slow recovery from perturbations as a generic indicator of a nearby catastrophic shift," *Am. Nat.*, vol. 169, no. 6, pp. 738-747, 2007.) As can be seen in high resilience illustrations 210, 220, when the system is far from the bifurcation 225 in the illustration 210, the system recovers very quickly from a perturbation, as shown in the recovery rate in the illustration 220. As seen in the low resilience illustrations 230, 240, when the system is closer to the bifurcation 245 in the illustration 230, the recovery rate decreases, as shown in the illustration 240.

CSD is observed in many types of bifurcations, including Hopf bifurcations. For example, it has been shown that it is possible to predict the onset of a Hopf bifurcation from CSD in a prototypical thermoacoustic system as an increase in the lag-1 autocorrelation and variance can be observed well before the subcritical Hopf bifurcation. A conventional methodology to forecast post-bifurcation behavior analyzes the CSD under external perturbations. With prior knowledge about the location of the bifurcation point and using this methodology, the type of Hopf bifurcation (i.e. whether it is supercritical or subcritical) and the limit-cycle amplitude can be predicted from pre-bifurcation data. In addition, the post-bifurcation dynamics of a nonlinear aeroelastic model under gust perturbations was predicted. However, while the post-bifurcation limit-cycle amplitude may be predicted with only pre-bifurcation data, this methodology requires information about how close the system is to the bifurcation point. In other words, a priori knowledge of the location of the bifurcation point is required. The methods and frameworks in accordance with the present embodiments does not require a priori knowledge of the location of the bifurcation point.

Figure 2B:
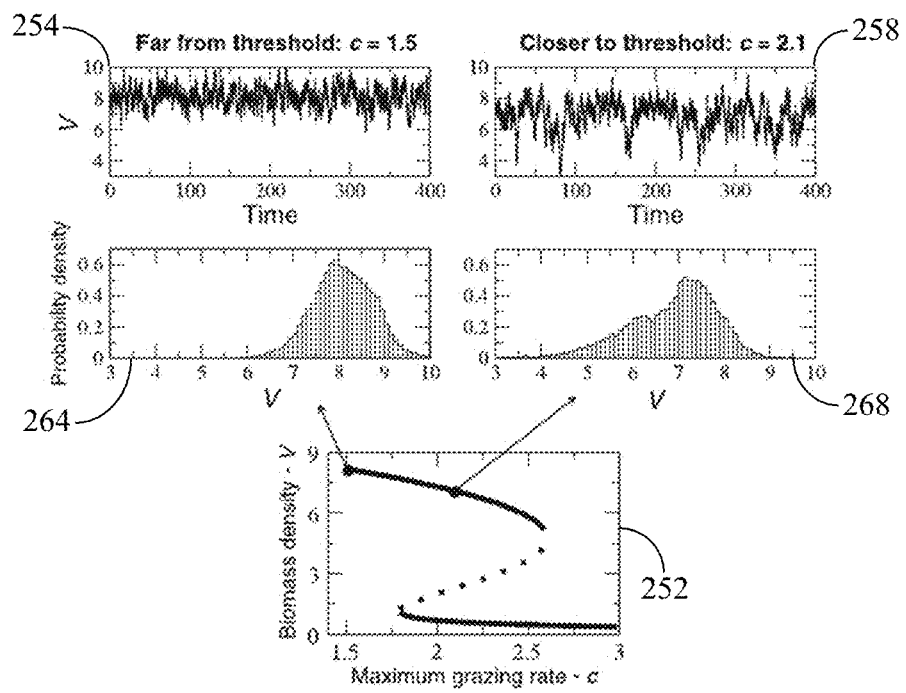

Another early-warning indicator of an approaching bifurcation is the asymmetry of the distribution of the time-series data. Specifically, the probability density function of the time trace is nearly symmetric to the median, but its skewness increases as the system approaches a bifurcation point. Referring to FIG. 2B, an illustration 250 demonstrates skewness of biomass density V under a change in the bifurcation parameter c (i.e., the maximum grazing rate). (Source of FIG. 2B: V. Guttal and C. Jayaprakash, "Changing skewness: an early warning signal of regime shifts in ecosystems," *Ecol. lett.*, vol. 11, no. 5, pp. 450-460, 2008.) A graph 232 depicts the relationship between the biomass density V and the maximum grazing rate c. Graphs 254, 258 depict the variation of the biomass density V over time when far from the threshold (the graph 254) and closer to the threshold (the graph 258), while graphs 264, 268 depict probability density of the biomass density V when far from the threshold (the graph 264) and closer to the threshold (the graph 268). From the graphs 254, 264, 258, 268, it can be seen that the asymmetry intensifies as the system approaches the bifurcation. This 'skewness' of the signal is observed from both sides of the bifurcation, and serves as a robust precursor near the Hopf bifurcation. However, this precursor lacks the ability to predict the exact location of the bifurcation point.

Some early-warning measures of an impending bifurcation can only be obtained in a highly stochastic environment. These precursors have been developed for systems with high intrinsic noise, such as turbulent combustors. These precursors are different from those using the noise-induced dynamics under external stochastic forcing (e.g. coherence resonance), because these precursors make use of only the system's intrinsic noise.

If the system is in a fixed-point regime and under the influence of strong intrinsic noise, the instantaneous state of the system is determined by the competition between the system's damping process and the stochastic driving. The damping level decreases as the system approaches the bifurcation, and the damping coefficient thus can be used as an early-warning signal. For example, a strategy for determining a combustor's stability margin (i.e. how far the system is from the bifurcation) has been proposed that uses the damping coefficient, which is calculated from the autocorrelation function. This approach has been extended to the frequency domain, obtaining noise-driven precursors for multi-mode oscillations. However, compared to other precursors, the damping coefficient has the limitation that the system must be very close to the bifurcation for the prediction to be accurate. Furthermore, if the transition between two states (e.g. flickering) occurs, the damping coefficient can be difficult to determine.

In highly stochastic systems, the transition from one state to another can occur even far before the bifurcation point. This is because when an alternative basin of attraction emerges, noise can trigger the system to flip to such a state. The phenomenon in which a system rapidly switches back and forth between two states is referred to as flickering. Flickering is considered an early-warning indicator for a bifurcation because it happens more frequently as the system approaches the bifurcation. For example, in an ecological system, flickering in the form of eutrophication events and algal blooms was found and it was shown that this phenomenon presages the bifurcation from the oligotrophic state to the eutrophic state. However, like most other precursors, flickering only provides a qualitative prediction of an impending bifurcation.

Intermittency is a phenomenon in which a system alternates between two qualitatively different states. Using low-order models, three different types of intermittency have been identified corresponding to a saddle-node bifurcation, a Hopf bifurcation, and a period-doubling bifurcation. Another type of intermittency occurs in systems where the bifurcation parameter has aperiodic temporal fluctuations. When this 'on-off' intermittency arises, the system alternates between the quiescent (off) states and the bursting (on) states. Phenomenologically, intermittency is similar to flickering, but their dynamics are different because intermittency can have chaotic behavior, and generally involves transitions to/from chaos.

For example, based on the observation that combustion noise is composed of chaotic fluctuations, it has been shown that intermittency presages a transition from chaotic combustion noise to periodic thermoacoustic oscillations. Because such intermittency lasts longer in time as the system approaches the bifurcation, it has been suggested that the onset of periodic thermoacoustic oscillations can be predicted by quantifying the intermittency. In an aeroelastic system, it has been shown that the onset of flutter is presaged by on-off intermittency, and can be predicted with statistical measures of the intermittency, such as those from recurrence quantification. Given that the threshold is defined a priori, quantifiers of intermittency serve as robust precursors that can predict bifurcation further in advance than other precursors such as the damping coefficient. However, intermittency lacks the ability to predict the exact location of the bifurcation and the post-bifurcation behavior.

When a system has chaotic dynamics, its signal shows a self-similar structure across different time scales. In other words, a chaotic time signal has fractal patterns, whose individual sections resemble the whole signal. The complexity of a fractal signal can be expressed using the non-integer fractal dimension D. Mathematically, a fractal time signal $x(t)$ has the relationship $x(ct)=x(t)/c^H$ for some scaling c, where H is the Hurst exponent that characterizes the fractal. H is related to D through the relationship $D=2-H$.

In practical systems, however, the signal is not perfectly self-similar, and a single fractal dimension or Hurst exponent is not enough to describe the dynamics. An interwoven subset of different fractal dimensions forms these systems, and such a system is called a multi-fractal system. In these systems, the concept of the Hurst exponent is generalized, and the singularity spectrum ($f(\alpha)$), also called the multi-fractal spectrum) is sometimes also used to characterize the system. Specifically, the width of the singularity spectrum ($\Delta\alpha$) quantifies the multi-fractality of the signal. Multi-fractality has been found in various systems, including fluid systems, combustion systems, mechanical systems and electromagnetic systems.

Figure 3A:
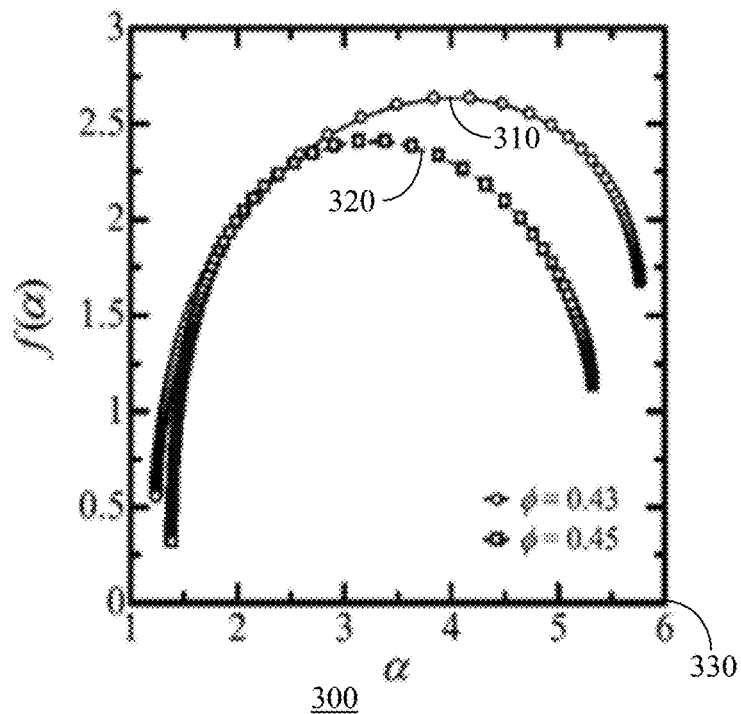
Figure 3B:
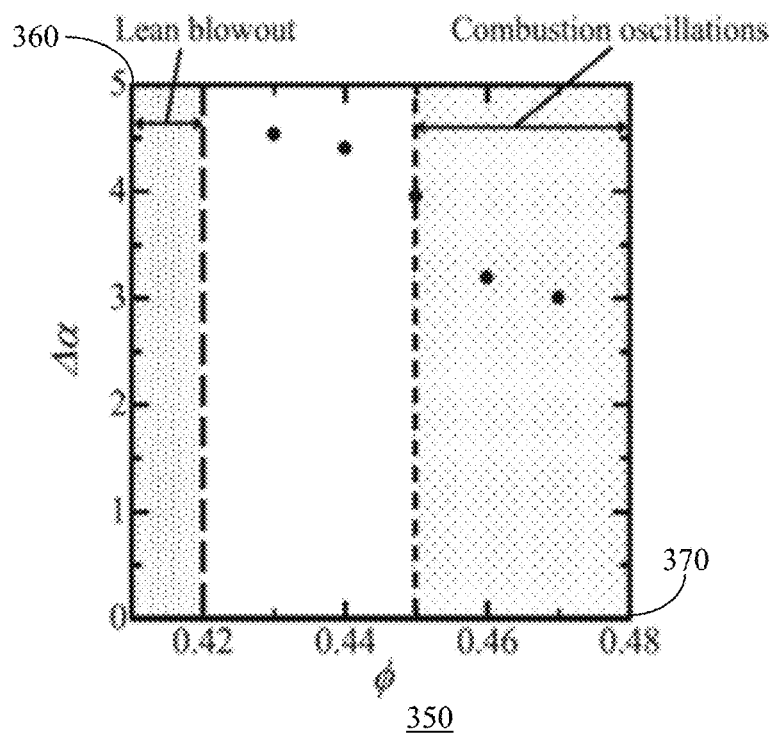
Figure 4A:
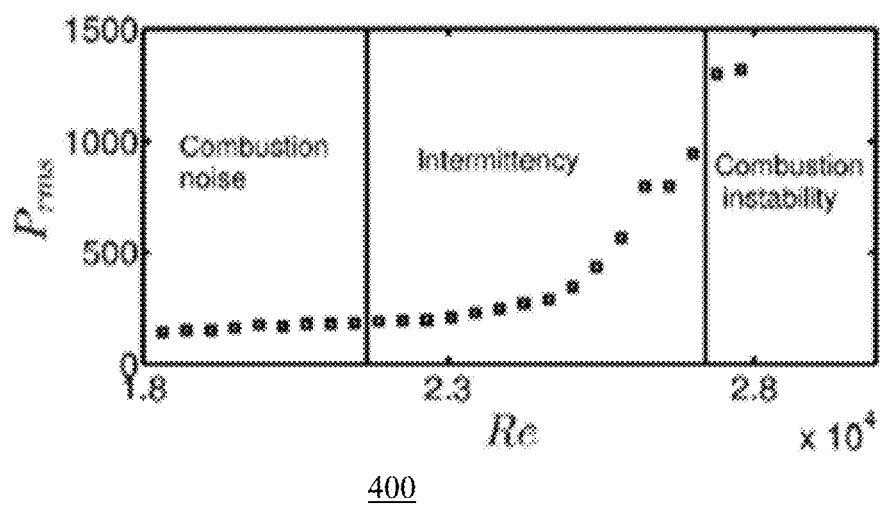
Figure 4B:
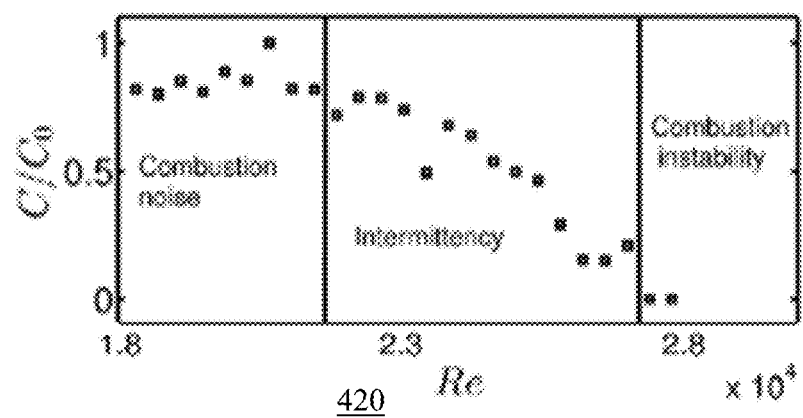
Figure 4C:
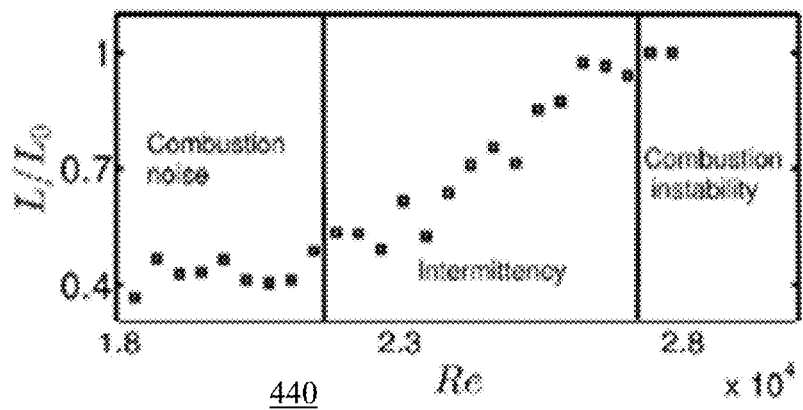
Figure 4D:
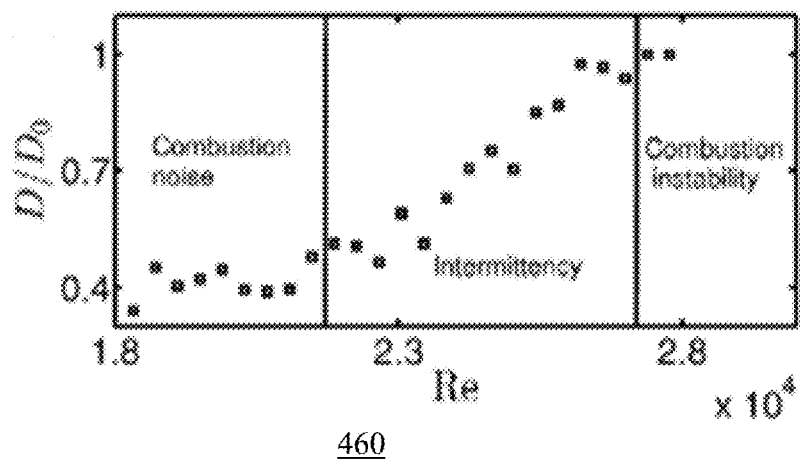
Figure 4E:
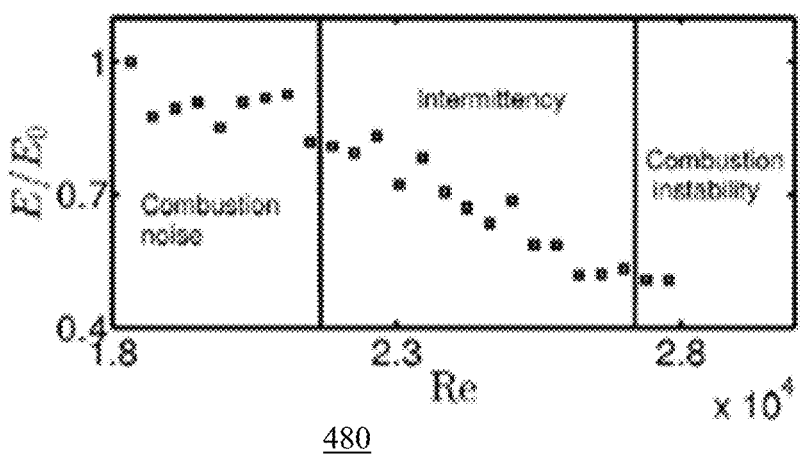

It has been recently found that the multi-fractality of a turbulent combustion system decreases before the onset of thermoacoustic oscillations with slow amplitude modulations. In particular, it was shown that the width of the singularity spectrum $f(\alpha)$ starts to decrease as the system approaches the onset of thermoacoustic oscillations. Referring to FIGS. 3A and 3B, graphs 300, 350 depict conventional singularity features. (Source of FIGS. 3A and 3B: H. Gotoda, M. Amano, T. Miyano, T. Ikawa, K. Maki, and S. Tachibana, "Characterization of complexities in combustion instability in a lean premixed gas-turbine model combustor," Chaos, vol. 22, no. 4, p. 043128, 2012.) The graph 300 depicts singularity spectra $f(\alpha)$ 310, 320 for varying equivalence ratio ($\phi$) 0.43 and 0.45, respectively. The graph 350 depicts a singularity spectra width $\Delta\alpha$ 360 for varying equivalence ratio ($\phi$) 370 as a measure of multi-fractality. It has been shown that the multi-fractal signature also exists in combustion noise, and can serve as a precursor to thermoacoustic instability.

The multi-fractal characteristics of an aeroelastic system were also analyzed and the analysis showed that precursors, such as the generalized Hurst exponent, are capable of predicting a Hopf bifurcation prior to the onset of flutter oscillations. However, an ad-hoc instability threshold for the multi-fractal measure is required to quantitatively determine the proximity to the bifurcation.

A further measure of complexity in time-series data is permutation entropy. Permutation entropy captures a relationship between the segments of a time-series by extracting the probability distribution of the ordinal patterns. The normalized permutation entropy ($\bar{h}$) lies between zero and one. If $\bar{h}$ is close to one, it indicates that the system's dynamics is complex and, therefore, the time-series is noisy. On the other hand, if $\bar{h}$ is close to zero, the system is more deterministic. For a signal contaminated by noise, the permutation entropy is easier to obtain compared with other complexity measures such as fractal dimensions. Also, thanks to its algorithmic simplicity, the permutation entropy is computationally cheap to obtain.

A statistical complexity measure (SCM) method, which defines a quantifier of Jensen-Shannon statistical complexity ($C_{JS}$), has also been proposed. Specifically, the quantifier $C_{JS}$ is obtained from the product of $\bar{h}$ and the discrepancy between P and $P_e$, where P is the probability distribution of the examined time series and $P_e$ is the probability distribution of the uniform distribution. The quantifier $C_{JS}$ provides significant additional information about a system's complexity, especially regarding the peculiarity of the underlying probability distribution. It was suggested that combining $\bar{h}$ and $C_{JS}$, specifically by creating a two-dimensional plane with $\bar{h}$ on the x-axis and $C_{JS}$ on the y-axis, is a powerful way of examining the complexity of a time series. This plane is known as the complexity-entropy causality plane (CECP), and it is used to distinguish dynamical states of various systems.

Apart from their ability to determine the dynamical states of a system, the permutation entropy and CECP can be used to predict changes in dynamical states, i.e. bifurcations. For example, by analyzing the brain signal (electroencephalogram) of genetic absence epilepsy rats, it was found that the permutation entropy decreases well before a seizure starts. From this observation, the seizures can be predicted by setting a predefined threshold for the permutation entropy.

In a thermoacoustic system, a decrease in the permutation entropy at the onset of thermoacoustic instability has been reported. Furthermore, CECP was used to detect the transition from small-amplitude aperiodic oscillations to large-amplitude periodic oscillations. Through the use of machine learning, the transition to thermoacoustic oscillations could be predicted before it occurs by using k-means clustering to assign zones in the CECP (i.e., feature space) to determine different dynamical states.

Recently, the complex network approach has been used to capture the dynamics of complex systems. In network analysis (also called graph analysis in mathematics), a system is modeled with a set of items (nodes) and the connections between them (edges). In a system whose structure is irregular and complex (i.e., complex systems), network properties provide key information about the system's dynamics. Converting time-series data into a complex network structure provides an efficient method of finding hidden patterns in complex systems. The complex network approach has been used to analyze various systems such as the world-wide-web, socio-biological networks, the power grid, turbulent jet flow, and thermoacoustic systems.

Near a bifurcation, changes in the dynamics of a complex system are reflected in network properties. For example, network properties, such as the entropy of transition networks and the mean edge betweenness of visibility graphs, decrease as the system approaches a pitchfork bifurcation. By analyzing a mathematical model for lake eutrophication, these network-based precursors are capable of forecasting real-world bifurcations.

Referring to FIGS. 4A-4E, graphs 400, 420, 440, 460, 480 depict conventional pressure and network properties in a combustor. The graph 400 depicts a root mean square (RMS) unsteady pressure ($P_{rms}$). (Source of FIGS. 4A-4E: M. Murugesan and R. I. Sujith, "Detecting the onset of an impending thermoacoustic instability using complex networks," *J. Propul. Power*, vol. 32, no. 1, pp. 707-712, 2016.) The graph 420, 440, 460, 480 depict network properties in a combustor where the graph 420 depicts a normalized clustering coefficient (C), the graph 440 depicts a normalized characteristic path length (L), the graph 460 depicts a normalized network diameter (D), and the graph 480 depicts a normalized global efficiency (E).

For a thermoacoustic system, four network properties, namely the clustering coefficient, characteristic path length, network diameter, and global efficiency were analyzed and, as the system approaches the onset of thermoacoustic instability (i.e. limit-cycle oscillations), these properties vary monotonically (see the graphs 400, 420, 440, 460, 480 (FIGS. 4A to 4E)) suggesting that the network properties can serve as early-warning indicators. In addition, a method for early detection of thermoacoustic instability using complex networks has been proposed which combines the use of transition patterns in the ordinal partition transition network and machine learning. However, thresholds in the feature space need to be defined using support vector machines.

While several precursors to an impending bifurcation have been discussed and early-warning indicators exist that can forecast the onset of instability, all of the discussed forecast mechanisms have two limitations. First, to be able to accurately forecast the location of the bifurcation, ad-hoc instability thresholds must be defined. Such thresholds generally require experimental data from both the pre- and post-bifurcation regimes, which can be difficult or dangerous to acquire. Second, without a priori information about the bifurcation point, established early-warning indicators tend to have difficulty predicting the limit-cycle dynamics beyond the Hopf point. The methods and frameworks in accordance with the present embodiments, however, provide a system-identification framework that overcomes both of these limitations.

Every practical dynamical system is, in principle, subjected to noise. It is intuitive to view noise as a source of contamination to the system's original signal. However, it has been shown that noise can induce unexpected phenomena, which can in fact provide valuable information about the system and its proximity to the stability boundaries.

For this reason, the response of nonlinear dynamical systems to noise has attracted much attention from mathematicians, scientists and engineers over the last few decades. Studies have shown that noise-induced dynamics can be found in a variety of oscillatory motions in mechanical, biological, and chemical processes, ranging from micro-optical transport to plasma fluctuations to bursting neurons to glacial climate changes. The phenomena demonstrating the influence of noise on a system include stochastic resonance, coherence resonance, noise-induced transition, and noise-induced pattern formation.

Consider a dynamical system perturbed by weak periodic forcing. When an optimal level of white noise is added to the system, the noise amplifies the original periodic forcing. This phenomenon, where the noise 'resonates' with the periodic signal, is known as stochastic resonance. Stochastic resonance (SR) was observed in periodically recurrent ice ages where it was found that the effect of the modulation of Earth's orbital eccentricity (weak periodic forcing), which by itself is too weak, was amplified by short-term climate fluctuation (white noise), triggering periodically recurrent ice ages. Experimental confirmation of SR was found by applying white noise to a Schmidt trigger—an increase in the output voltage signal-to-noise ratio (SNR) was observed. Thereafter, SR has been used to amplify weak periodic signals in the fields of physics, chemistry, biology, and engineering.

The SR framework has provided insight into the coherent behavior of numerous nonlinear dynamical systems under periodic forcing. The behavior of most systems, however, is governed by the intrinsic dynamics, rather than external periodic forcing. Thus, questions have been raised as to whether noise alone can induce coherence in the absence of external periodic signal.

It has been found that even in the absence of external periodic forcing, noise alone can stimulate coherent motion and induce a peak in the power spectrum. It has also been found that the position and height of this spectral peak are strongly dependent on the amplitude of the noise. This phenomenon has been interpreted as ' SR without external periodic force' or ' autonomous SR'. In excitable systems, it has been found that the coherence in the noise-induced dynamics first increases, reaches a maximum, and then decreases as the noise amplitude increases. This phenomenon has been termed coherence resonance. Coherence resonance (CR) has been defined in terms of the coherence factor $\beta = H\omega_p/\Delta_\omega$, where H is height of the spectral peak, $\omega_p$ is the peak frequency, and $\Delta_\omega$ is the peak width. It has been shown that CR is a concomitant phenomenon to a Hopf bifurcation and can be used to distinguish between supercritical and subcritical Hopf bifurcations. This concept has allowed CR to be used to distinguish the type of Hopf bifurcation generated from low-order models.

For the purposes of forecasting, it has been found that CR can be used to forecast the onset of a Hopf bifurcation. Before the concept of CR was established, it was shown that the spectrum of a noise-perturbed system contains precursors capable of forecasting impending instabilities. Specifically, it was found that the coherence of a system's response to noise increases as the system approaches the bifurcation. This permits CR to be used as a 'noisy precursor' to impending oscillations.

Figure 5A:
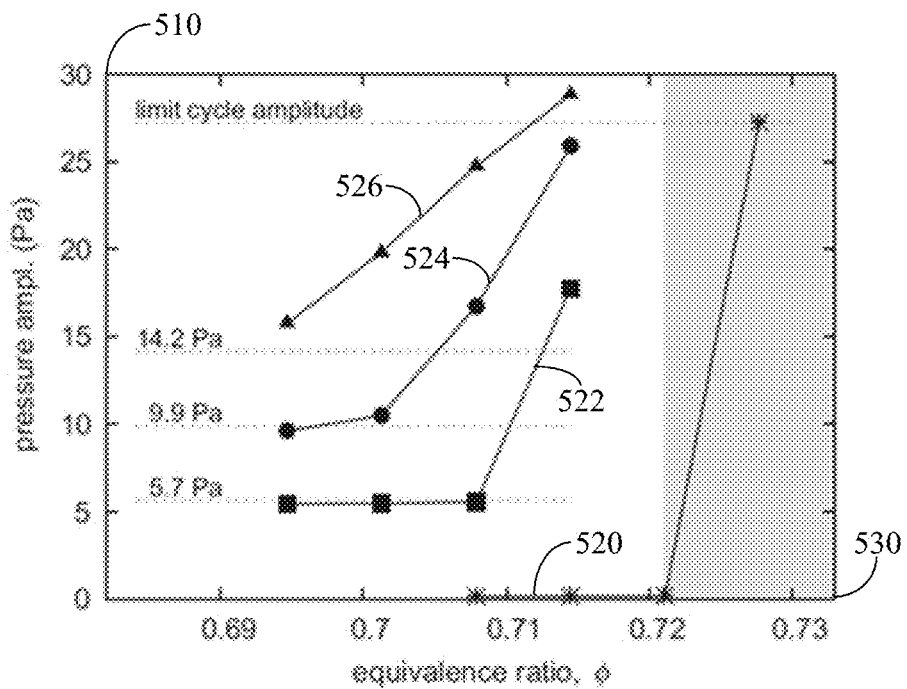
Figure 5B:
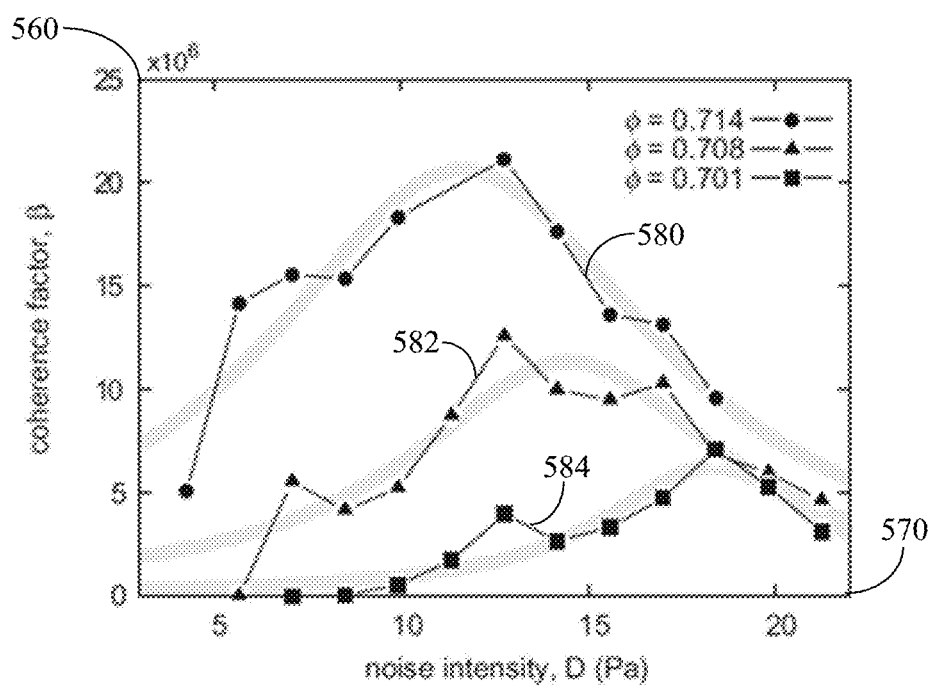

Referring to FIGS. 5A and 5B, graphs 500, 550 depict that CR can be found in the unconditionally stable regime prior to a subcritical Hopf bifurcation, which suggests that CR can be used to predict the approaching thermoacoustic instability. (Source of FIGS. 5A and 5B: L. Kabiraj, R. Steinert, A. Saurabh, and C. O. Paschereit, "Coherence resonance in a thermoacoustic system," *Phys. Rev. E*, vol. 92, p. 042909, 2015.) The graph 500 depicts pressure fluctuation amplitude 510 under varying levels of noise 520, 522, 524, 526 in a subthreshold regime for different equivalence ratios 530. The graph 550 depicts coherence factor ($\beta$) 560 as a function of noise 570 for different equivalence ratios 580, 582, 584. CR in a hydrodynamic system (i.e., a low-density jet) was used to forecast the onset of global instability. However, CR-based forecasting shares the same limitation with the other precursors previously discussed: for quantitative prediction of the bifurcation point, an ad-hoc threshold is required.

Figure 6:
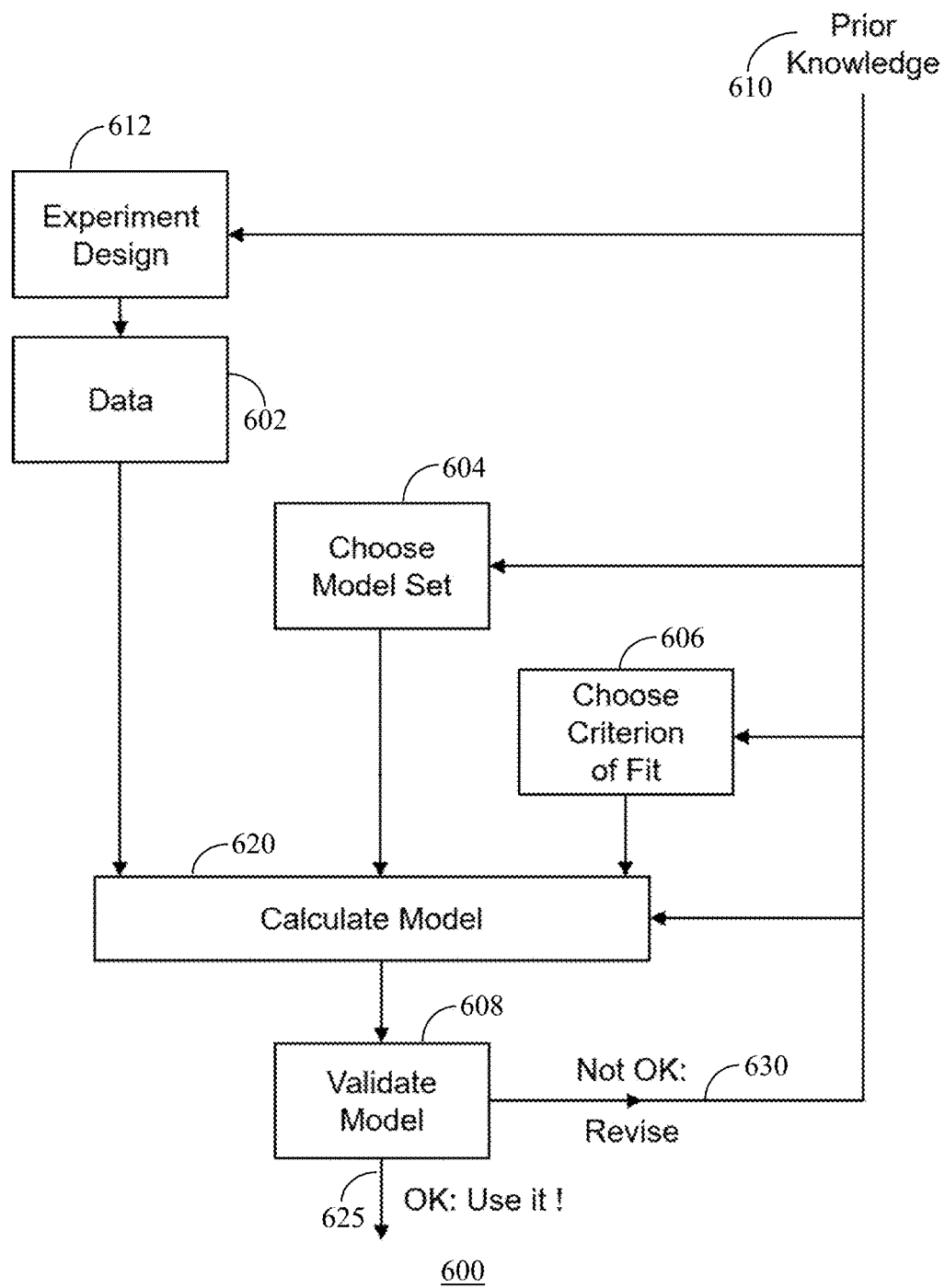
FIG. 6 depicts a flowchart of a conventional system identification loop.

System identification (SI), also known as model identification, is a statistical method of building a mathematical model of a system from the input and/or output data of that system. Referring to FIG. 6, a flowchart 600 depicts a SI loop which includes three basic entities required to build a model: data 602, a set of candidate models 604, and a rule to evaluate the model 606. (Source of FIG. 6: L. Ljung, *System identification: theory for the user*, 2nd ed., Prentice-Hall information and system sciences series. Upper Saddle River, N.J.: Prentice Hall, 1999.) These entities 602, 604, 606, along with the validation process 608 which follows, form the SI loop which is illustrated in the flowchart 600. In operation, prior knowledge 610 is used to design 612 an experiment to generate the data 602, to select the set of candidate models 604 and to choose the rules 606 (i.e., criterion of fit). The data 602, the model candidates 604, the rules 606, and the prior knowledge 610 are used to calculate a model 620 which is then subjected to the validation process 608. If the model is validated 608, then it is used 625. If the model is not validated 608, it is used 630 to revise the experimental design 612, the candidate models 604 and the rules 606.

There are two main purposes of SI. In control problems, the goal is to design a control strategy, where in other cases, the primary interest is to analyze and 'diagnose' a system. In the latter case, the final goal is to find the types and values of the system parameters, and to determine how those parameters relate to the system dynamics. For this purpose, SI has proved to be useful in a variety of fields.

Figure 7A:
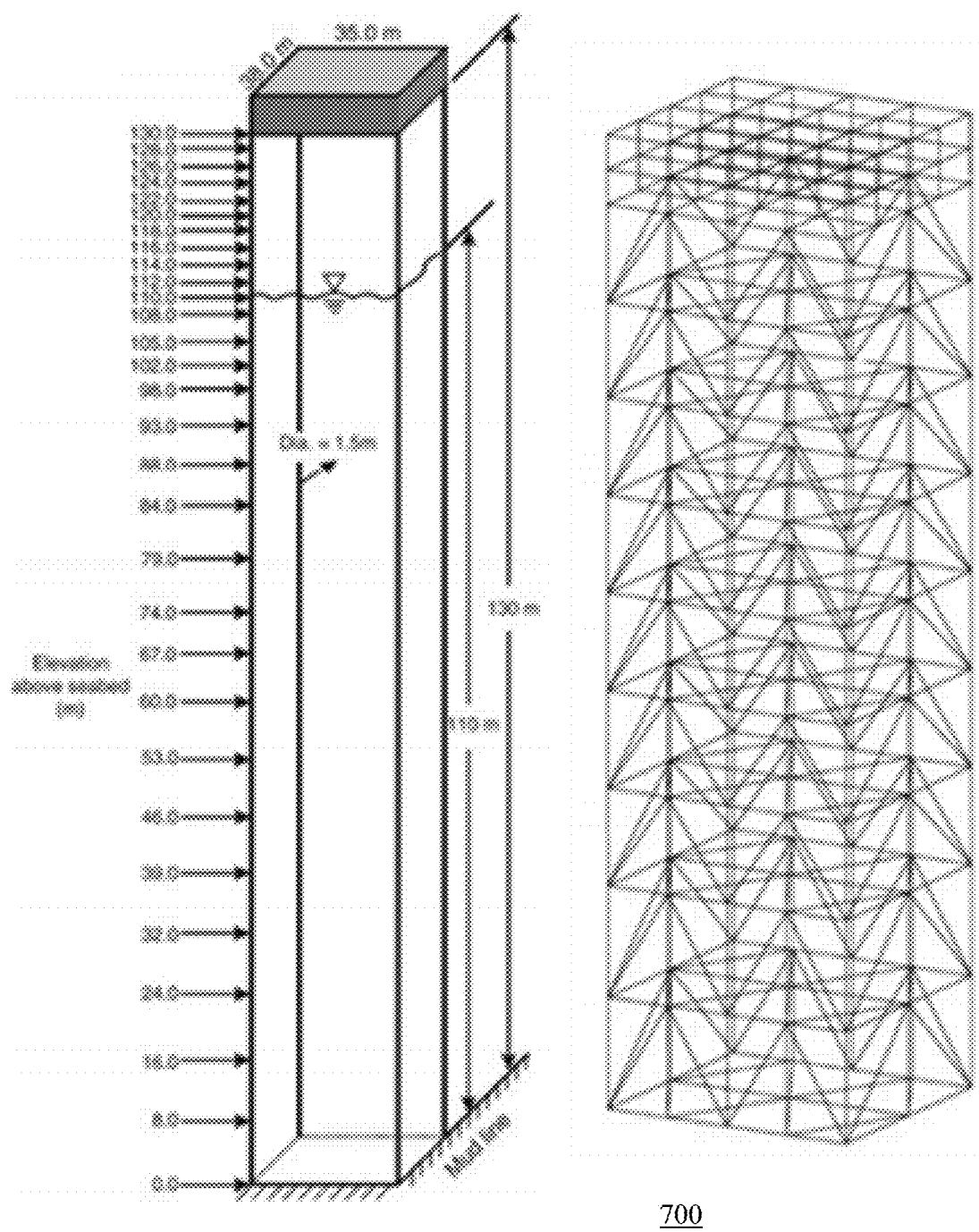
Figure 7B:
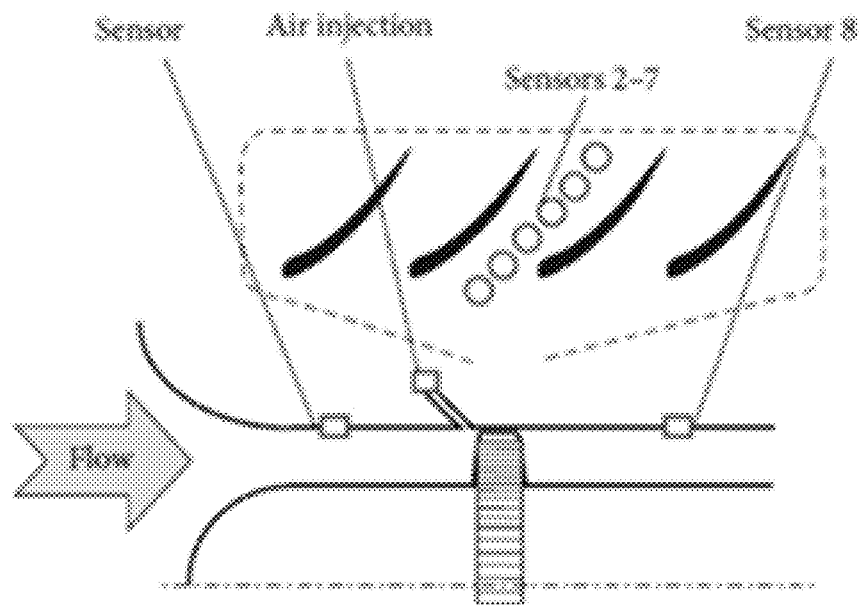

In mechanical and aerospace engineering, SI is often performed on structural or thermofluid systems to find the variables and to estimate the system response. For example, the dynamic response of an offshore structure, such as the structure 700 in FIG. 7A, was evaluated by identifying system parameters, such as the nonlinear drag component and the linear inertial component. (Source of FIG. 7A: G. Najafian, "Application of system identification techniques in efficient modelling of offshore structural response. part ii: Model validation," Appl. Ocean Res., vol. 29, no. 1, pp. 17-36, 2007.) Referring to FIG. 7B, an illustration 730 depicts an axial compressor where SI was used to investigate the way tip air injection and throttle activation affect the overall compressor dynamics. (Source of FIG. 7B: M. P. Schoen and J.-C. Lee, "Application of system identification for modeling the dynamic behavior of axial flow compressor dynamics," *Int. J. Rotating Mach.*, vol. 2017, 2017.) SI has also been applied to flight test data in order to build an analytical model for aircraft aerodynamics which has been used for aircraft simulation, the design of control systems, and dynamic analysis of general transport aircraft, fighter aircraft, the space shuttle and other test aircraft.

Figure 7C:
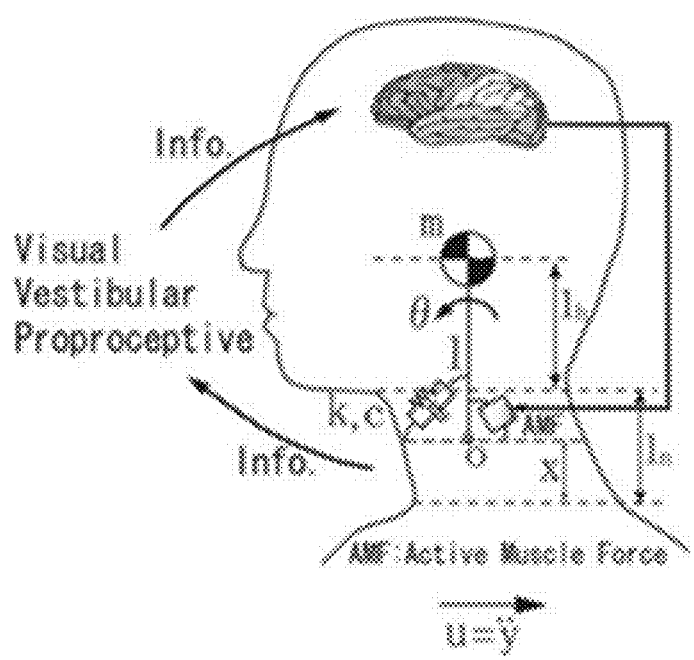

In biology, an increasing number of researchers are using SI to model physiological systems. For example, SI has been used to model the frequency response of the respiratory system with a fourth-order mechanical model, and parameters governing the system have been identified such as tissue compliance, alveolar gas compressibility and airway resistance. Referring to FIG. 7C an illustration 760 depicts a method of identifying a vibration in the human head-neck complex in a seated human body using SI to model the head-neck complex as a simple spring-mass-damper model with a single degree of freedom. (Source of FIG. 7C: M. A. Fard, T. Ishihara, and H. Inooka, "Identification of the head-neck complex in response to trunk horizontal vibration," *Biol. Cybern.*, vol. 90, no. 6, pp. 418-426, 2004.)

SI tools have also been adopted in econometrics. For example, a stochastic model, based on both time-domain and frequency-domain approaches, can be used to analyze and forecast an economic time series. In addition, SI of stock markets in several countries has been performed to separate systematic signals from noise. Other fields in which SI theory has been applied include geophysics, environmental science, and electromagnetism.

Figure 8:
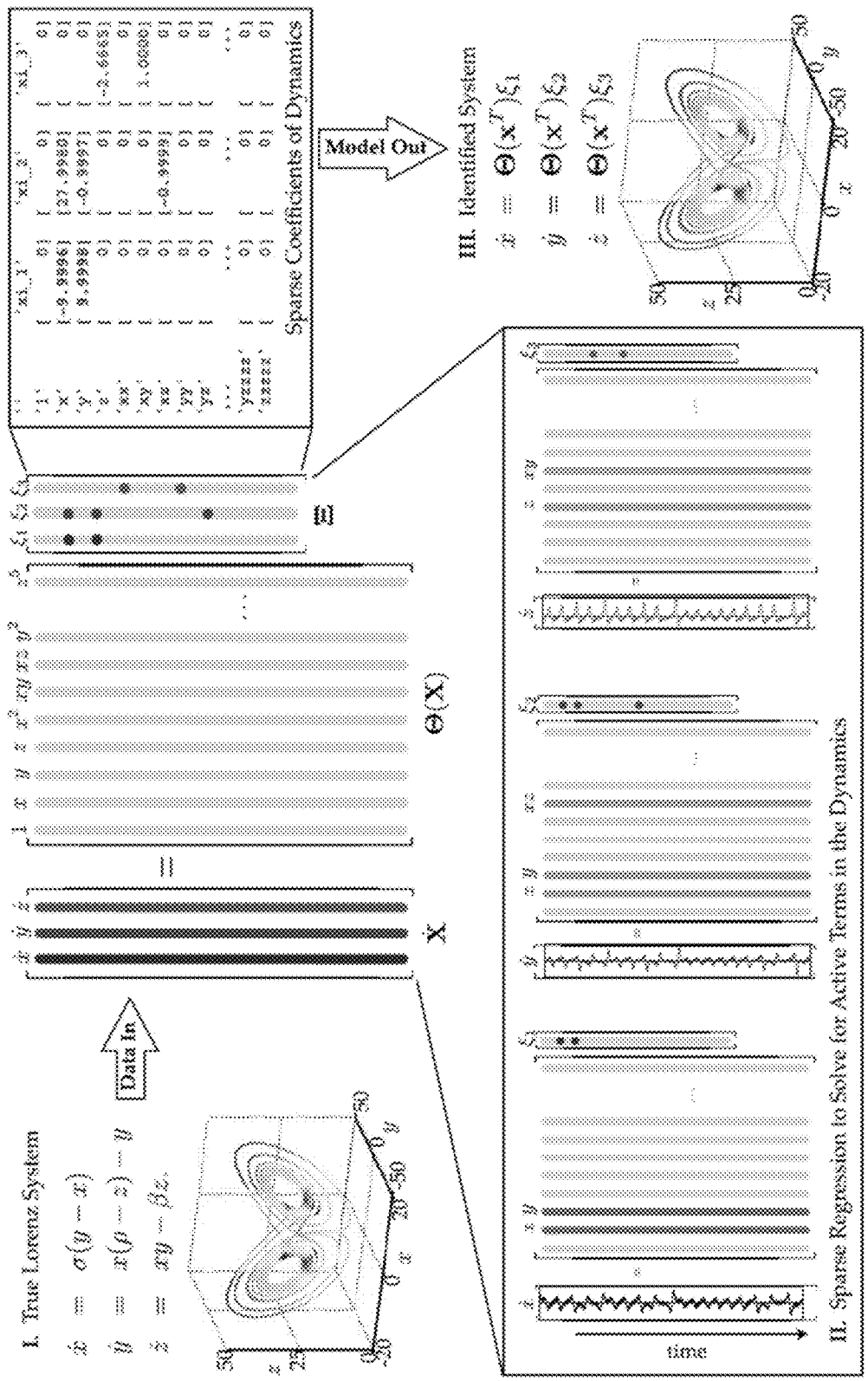
FIG. 8 depicts a schematic diagram of a conventional sparse identification of nonlinear dynamics (SINDy) algorithm.

Apart from conventional SI methods, SI methods have been shown to work even without candidate models 604 (FIG. 6). These methods are purely data-driven, requiring no a priori knowledge of the system. For example, symbolic regression has been used to identify the governing equations of oscillatory systems. In addition, an identification framework has been developed that uses a sparsity promoting tool and machine learning to establish low-dimensional models of physical systems as shown in FIG. 8. FIG. 8 depicts a schematic diagram 800 of a conventional sparse identification of nonlinear dynamics (SINDy) algorithm. (Source of FIG. 8: S. L. Brunton, J. L. Proctor, and J. N. Kutz, "Discovering governing equations from data by sparse identification of nonlinear dynamical systems," *Proc. Natl. Acad. Sci. USA*, vol. 113, no. 15, pp. 3932-3937, 2016.) The active terms are identified from iterative sparse regression, and the original dynamics of the Lorentz system is captured in the reconstructed trajectory.

Although such data-driven frameworks can successfully identify the unknown models of a system, their use is limited to cases where abundant data is available. In practical situations, collecting abundant data is often difficult or expensive, so conventional model-based SI is preferred for its improved viability.

Among the various approaches for model-based SI, it has been shown that SI of a stochastic system can be conducted by analyzing a system's noise-induced response. This approach focuses on the fact that the probability density function of a stochastic time series is determined by only two factors: (i) the system's deterministic dynamics and (ii) the dynamic noise that affects the system's deterministic dynamics. Thus, by modeling the system's dynamics with a stochastic differential equation, its deterministic component can be extracted from the corresponding Fokker-Planck equation, which describes the system's probability density function.

It has been proposed that the drift and diffusion terms of the Fokker-Planck equation, which correspond to the deterministic and the random parts of the system, respectively, can be extracted from the probability density function of a system's time-series data. Based on this approach, a method has been proposed for identifying model equations from noisy experimental data, specifically by fitting analytical functions to numerically determined drift and diffusion terms. Subsequently, SI based on the Fokker-Planck equation has been carried out to identify the dynamics of stochastic systems.

For practical application of this class of SI, a system's intrinsic perturbations are often used as the source of noise, and only the output signal is measured. This is referred to as 'output-only SI'. For instance, deterministic quantities, such as linear and nonlinear coefficients, have been extracted from a turbulent gas-turbine combustor. Specifically, the combustor pressure is modeled using a self-sustained oscillator equation with unknown coefficients, and a noise term is used to model the intrinsic noise source. From the Fokker-Planck equations, the unknown coefficients of the mathematical model are identified. This SI framework can be further improved via optimization based on the adjoint Fokker-Planck equation. In this optimization routine, the originally identified coefficients of the oscillator equation are optimized by minimizing the discrepancy between the experimental and mathematical drift and diffusion terms of the Fokker-Planck equation. However, in all of these SI methods, at least some data from the limit-cycle regime is required to identify the post-bifurcation behavior. In other words, this SI framework cannot forecast a bifurcation using only pre-bifurcation data.

As described previously, a Hopf bifurcation arises in many natural and engineered systems. It is of interest to be able to forecast a Hopf bifurcation using only pre-bifurcation data. However, existing precursors require ad-hoc instability thresholds to be defined, using both pre- and post-bifurcation data. This implies that the instability boundaries cannot truly be forecasted. In practical systems, collecting data in the post-bifurcation regime can be difficult or even dangerous. Furthermore, existing SI methods cannot forecast post-bifurcation behavior.

Many natural and engineering systems exhibit bifurcations as the system parameters are varied. A canonical example is a Hopf bifurcation, which is observed in many important dynamical systems, such as power plants, skyscrapers and brain cells. In accordance with the present embodiments, methods and frameworks for identifying post-bifurcation system dynamics use only pre-bifurcation data. With no need to observe the system in its limit-cycle regime, methods and frameworks in accordance with the present embodiments can identify the locations and types of the bifurcation points, and the system dynamics beyond them.

System identification is the process of building a mathematical model of a dynamical system, and is conducted to diagnose, predict or control the system. Conventionally, there are two main methods of performing system identification: (i) data-driven methods and (ii) model-based methods.

In data-driven system identification, a mathematical model is constructed from data only. While knowledge of system details is not required, it is essential to obtain a large amount of data from experiments and/or simulations. In practical systems, it is difficult and costly to collect large datasets. Therefore, model-based system identification is preferred, where a reduced-order model of the system is introduced and its coefficients are determined from data. For example, a system near a Hopf bifurcation usually obeys the Stuart-Landau equation (Equation 4), a low-order system model:

$$\frac{da}{dt} = k_1 a + k_2 a^3 + \dots, \qquad (4)$$

where a is the oscillation amplitude, t is time, $k_1$ is a linear driving/damping coefficient and $k_2$ is a nonlinear coefficient. In Equation 1, $k_1<0$ implies that the system is in its stable state. A limit cycle is born at $k_1=0$. Then, $k_1$ and $k_2$ can be extracted from experimental data. However, these conventional methods neglect the presence of noise, which can change the system dynamics in non-trivial ways.

By contrast, recent model-based system identification methods exploit the influence of noise to identify the system parameters. For example, some conventional model-based system identification methods transform the Stuart-Landau equation (Equation 1) to its corresponding Fokker-Planck equation using a time-averaged noise effect on a probability density function to identify unknown coefficients of the system. Yet, all of the aforementioned system-identification methods require at least some observations of the limit-cycle state to be able to predict the Hopf bifurcation and the dynamics beyond it. In most real-world systems, it is difficult or even dangerous to collect data in the limit-cycle state because of the occurrence of high-amplitude self-excited oscillations that can shake the system violently and damage its components.

While existing methods of system identification require at least some data from the post-bifurcation regime, methods and frameworks in accordance with present embodiments advantageously not only enable system identification to be performed using data from only the pre-bifurcation regime, but also enable the post-bifurcation dynamics to be predicted, paving the way for the development of early-warning indicators of impending nonlinear instabilities.

The methods and frameworks in accordance with the present embodiments can identify (i) the order of nonliearity (ii) the locations and types of the bifurcation points, and (iii) the post-bifurcation dynamics, without requiring use of any post-bifurcation data. The methods and frameworks in accordance with the present embodiments exploits the noise-induced dynamics of a system in the unconditionally stable regime by perturbing it with different amplitudes of Gaussian white noise by, for example, using a self-sustained oscillator model (Equation 5) and its corresponding stationary Fokker-Planck equation (Equation 6):

$$\ddot{x} - \left(\epsilon + \alpha_1 x^2 + \alpha_2 x^4 + \alpha_3 x^6 + \alpha_4 x^8 + \dots\right)\dot{x} + x + \beta x^3 = \sqrt{2d}\,\eta(t), \qquad (5)$$

$$P(a) = C a \exp\left[\frac{a^2}{d}\left(\frac{\epsilon}{2} + \frac{\alpha_1}{16}a^2 + \frac{\alpha_2}{48}a^4 + \frac{\alpha_3}{512}a^6 + \frac{\alpha_4}{1280}a^8 + \dots\right)\right], \qquad (6)$$

where β is the anisochronicity factor that controls the shift of frequency, C is the normalization constant and P(a) is the stationary probability density function, which is independent of β. By taking the logarithm of Equation 6, a ratio of unknown coefficents (ε, $\alpha_1$, $\alpha_2$, ... ) and d can be obtained by polynomial regression.

Also, in accordance with the present embodiments, a unique actuator model translates actuator input (V) into system input noise (d), to accurately quantify the effect of noise. This is accomplished by assuming a power-law relationship between V and d such that $d=b+kV^n$, where k, n are constants and b is the inherent background noise. Assuming $b \ll d$:

$$\ln\left(\frac{d}{X}\right) = n \ln V + \ln\left(\frac{d}{X}\right), \quad (7)$$

where X is an arbitrary constant. Because the ratio $(d/\in, d/\alpha_1, \ldots)$ is known, X can be swapped with one of the unknown coeffients. Then, from the slope of Equation 7, n can be extracted. The other unknowns k and b can be found from the relationship of Equation 8:

$$\int_{-\infty}^{\infty} S_u(\omega) d\omega = \frac{2d}{\Delta_\omega} = \frac{2(b+kV^n)}{\Delta_\omega}, \quad (8)$$

where $S_u$ is the spectrum and $\Delta_\omega$ is the half-width at half-maximum of its Lorentzian fit. Because $S_u$ and $\Delta_\omega$ are obtained from experiments, k and b can be extracted from the y-intercept and gradient of Equation 8. Thereafter, the unknown coefficients $\in$, $\alpha_1$, $\alpha_2$, ... are obtained from Equation 6.

With the coefficients identified, the system's order of nonlinearity is analyzed. Coefficients are extracted by adding successively higher terms and performing polynomial regression until the rank becomes deficient. The bifurcation type is also identified from the sign of the first nonlinear coefficient ($k_2$ of Equation 1). Then, the identified coefficients are extrapolated to predict the bifurcation points and the system behavior beyond them. For the linear coefficient E, we use linear regression. The relationship between the bifurcation parameter and the nonlinear coefficients is unknown, but a power-law relationship $\alpha_n \propto (\text{Re}-m_1)^{m_2}$ is assumed, where $m_1$ and $m_2$ are positive constants obtained from least-square regression.

Thus, in accordance with the present embodiments, a SI framework is advantageously provided that uses noise-perturbed data in only a fixed-point regime (i.e., a pre-bifurcation regime) to forecast (i) the location of a Hopf bifurcation point, (ii) the type of the Hopf bifurcation (i.e. whether it is supercritical or subcritical), and (iii) the limit-cycle amplitudes (i.e., the post-bifurcation regime). Thus, the SI methods and frameworks in accordance with the present embodiments can achieve these tasks without the need to define ad-hoc instability thresholds.

System identification (SI) frameworks suitable for the present embodiments include input-output SI and output-only SI. For input-output SI and in accordance with the methods and frameworks of the present embodiments, a unique actuator model and a method for extracting the unknown system coefficients are provided. For output-only SI and in accordance with the methods and frameworks of the present embodiments, we present the method used to extract the unknown system coefficients. In addition, for both input-output and output-only SI and in accordance with the methods and frameworks of the present embodiments, a method for forecasting the bifurcation point and the post-bifurcation limit-cycle amplitude based on the extrapolation of the coefficients is provided.

Figure 9A:
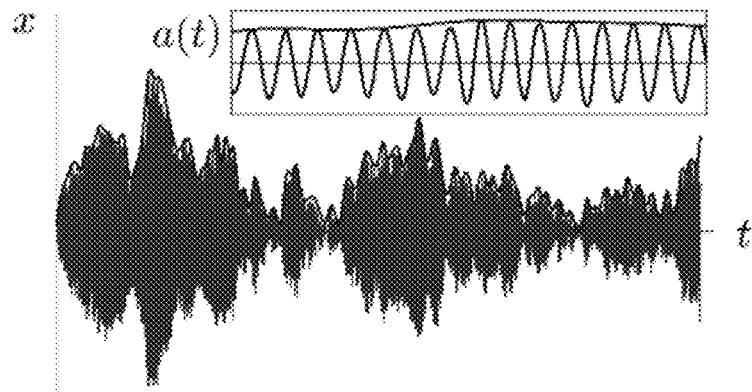
Figure 9B:
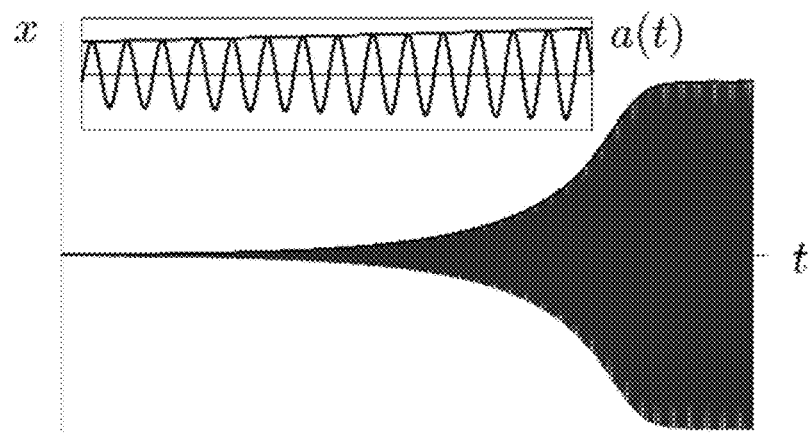

Referring to FIGS. 9A and 9B, illustrations 900, 950 relate oscillation amplitude, a(t), to the instantaneous state of the system, x(t), where the illustration 900 depicts evolution of a(t) and x(t) for noise-induced dynamics in a marginally unconditionally stable regime and the illustration 950 depicts evolution of a(t) and x(t) noise-free limit-cycle development in the marginally linearly unstable regime. In both illustrations 900, 950, the evolution of a(t), which can be approximated by Equation 8 (the Stuart-Landau equation), is at a much slower rate than that of x(t). The effect of noise on the system is felt via x(t), for which we assume the following governing equation:

$$\ddot{x} - (\varepsilon + \alpha_1 x^2 + \alpha_2 x^4 + \alpha_3 x^6 + \alpha_4 x^8 + \ldots)\dot{x} + x + \beta x^3 = \sqrt{2d}\eta(t) \quad (9)$$

where $\eta(t)$ is a unit additive white Gaussian noise term representing the effect of a loudspeaker, d is its amplitude, $\varepsilon$ is a linear growth/damping term, $\alpha_1$, $\alpha_2$, $\alpha_3$, $\alpha_4$, ... are nonlinear system parameters, and $\beta$ is the anisochronicity factor, which controls the shift in oscillation frequency with amplitude. Equation 9 is non-dimensionalized such that the natural frequency is fixed at one for all bifurcation parameters. Also, $\alpha_1$ determines the nature of the Hopf bifurcation.

In order to derive a probabilistic solution of Equation 9, a variation of parameters is performed, where the instantaneous state of the system (x) is transformed into its amplitude (a) and phase ($\phi$) as:

$$x(t) = a(t)\cos(t+\phi(t)) \quad (10)$$

This leads to two equations (Equations 9 and 10) in three unknowns: x(t), a(t) and $\phi$(t). Thus, a third condition that is independent of Equations 9 and 10 can be imposed—assume a convenient condition given as:

$$\dot{x}(t) = -a(t)\sin(t+\phi(t)). \quad (11)$$

It should be noted that so far, no assumptions about a and $\phi$ being slow variables has been made. This transformation simply allows derivation of two first-order differential equations from one second-order differential equation. Its effectiveness, particularly when a and $\phi$ are slow variables, will soon become clear. By (i) differentiating Equation 10 and subtracting Equation 11 from it and (ii) by differentiating Equation 11, the following two equations, respectively, are derived:

$$0 = \dot{a}(t)\cos(t+\phi(t)) - a(t)\dot{\phi}(t)\sin(t+\phi(t)), \quad (12a)$$

$$\ddot{x}(t) = -\dot{a}(t)\sin(t+\phi(t)) - a(t)\cos(t+\phi(t)) - a(t)\dot{\phi}(t)\cos(t+\phi(t)), \quad (12b)$$

Equations 10, 11, and 12 are then substituted into Equation 9 with further use of trigonometric identities (such as $\sin^2(\theta) = \frac{1}{2} - \frac{1}{2}\cos(2\theta)$), to obtain transformed first-order equations in a and $\phi$ as:

$$\dot{a} = \underbrace{\left(\frac{\varepsilon}{2}a + \frac{\alpha_1}{8}a^3 + \frac{\alpha_2}{16}a^5 + \frac{5\alpha_3}{128}a^7 + \frac{7\alpha_4}{256}a^9 + \ldots\right)}_{f_1} + \underbrace{Q_1(a,\Phi)}_{} - \underbrace{\frac{(\sqrt{2d}\sin\Phi)}{g_1}\eta_1}_{} \quad (13a)$$

$$\dot{\phi} = \underbrace{\frac{3\beta}{8}a^2 + Q_2(a,\Phi)}_{f_2} - \underbrace{\left(\frac{\sqrt{2d}}{a}\cos\Phi\right)}_{g_2}\eta_2, \quad (13b)$$

where $\eta_1$ and $\eta_2$ are independent white noise terms and $\Phi(t) = t + \phi(t)$. Lastly, $Q_1(a,\Phi)$ and $Q_2(a,\Phi)$ are the sum of all the terms with first-order sine and cosine components (i.e. in the form of $a^{n_1} \cos n_2 \Phi$, where $n_1$ and $n_2$ are integers). Up to this point, the equations are exact, but, in the averaging procedure to follow, it is assumed that a and $\phi$ are slow variables, implying that terms of the form $\int_0^{2\pi} a^{n_1} \cos n_2 \Phi$ become zero. Therefore, after time-averaging and for d=0 (no noise), Equation 13a has the same form as the Stuart-Landau equation, which justifies the choice of the governing equation for x(t). Equation 13 contains deterministic parts ($f_1$, $f_2$) and stochastic parts ($g_1$, $g_2$). When stochastically averaged, Equation 13 transforms into a stochastic differential equation for a, which can be written in Itô sense as:

$$da = mdt + \sigma dW \quad (14a)$$

$$m = T^{av}\{f_1\} + T^{av}\left\{\int_{-\infty}^{0}\left(\frac{\partial g_1(s)}{\partial a}g_1(s+\tau) + \frac{\partial g_1(s)}{\partial \phi}g_2(s+\tau)\right)\langle\eta(s)\eta(s+\tau)\rangle d\tau\right\} \quad (14b)$$
$$= \left(\frac{\varepsilon}{2}a + \frac{\alpha_1}{8}a^3 + \frac{\alpha_2}{16}a^5 + \frac{5\alpha_3}{128}a^7 + \frac{7\alpha_4}{256}a^9 + \ldots\right) + \frac{d}{2a},$$

$$\sigma^2 = T^{av}\left\{\int_{-\infty}^{\infty} g_1(s)g_1(s+\tau)\langle\eta(s)\eta(s+\tau)\rangle d\tau\right\} = d \quad (14c)$$

where dW is a unit Wiener process, $T^{av}$ denotes the time average of the functions, and m and σ represent the drift and diffusion terms of a, respectively. Finally, the equation for a is transformed into equations for the probability density function of a, yielding the Fokker-Planck equation:

$$\frac{\partial}{\partial t}P(a,t) = -\frac{\partial}{\partial a}[m(a,t)P(a,t)] + \frac{\partial^2}{\partial a^2}\left[\frac{\sigma^2(a,t)}{2}P(a,t)\right], \quad (15)$$

$$P(a) = Ca\exp\left[\frac{a^2}{d}\left(\frac{\varepsilon}{2} + \frac{\alpha_1}{16}a^2 + \frac{\alpha_2}{48}a^4 + \frac{5\alpha_3}{512}a^6 + \frac{7\alpha_4}{1280}a^8 + \ldots\right)\right]. \quad (16)$$

Here P(a,t) denotes the probability that the oscillation amplitude has a value of a at a given time t, P(a) is its stationary solution, and C is a normalization constant. These equations are independent of the anisochronicity factor β.

One of the key challenges in SI is modelling the effect of an actuator on an experimental system. This is because the way in which an actuator input, e.g. the loudspeaker voltage (V), is fed into a system, via the noise amplitude (d), is unique to that particular system.

In accordance with the methods and frameworks of the present embodiments, a relationship between V and d is derived based on experiments and with only two assumptions: (i) a power-law relationship exists between V and d, such that $d = b + kV^n$, where b is the intrinsic amplitude of background noise, k is the proportionality constant, and n is the exponent; and (ii) b<<d. Thus, the relationship can be written:

$$\ln\left(\frac{d}{c}\right) \approx n\ln V + \ln\left(\frac{k}{c}\right), \quad (17)$$

where c is the absolute value of one of the system parameters ($|\varepsilon|$, $|\alpha_1|$, ...). The logarithm of Equation 16 gives a ratio between d and one of the system parameters (ε, $\alpha_1$, ...) at each value of V (see the matrix in Equation 19, below). Therefore, n can be obtained by plotting ln $$\left(\frac{d}{c}\right)$$

against ln V and, specifically, by calculating the slope. The y-intercept directly gives ln $$\left(\frac{k}{c}\right),$$

but neither k nor c is known at this stage.

To find k and b, information in the spectral domain is used. An equation for the jet spectrum ($S_u$) can be derived:

$$\int_{-\infty}^{\infty} S_u(\omega)d\omega = \frac{2d}{\Delta_\omega} = \frac{2(b+kV^n)}{\Delta_\omega}, \quad (18)$$

where $\Delta_\omega$ is the half-width at half-maximum when a Lorentzian curve is fitted to $S_u$. The coefficients k and b are then extracted from the y-intercept and gradient of the data, respectively, to obtain the relationship between the input loudspeaker voltage and the noise amplitude obtained.

For the input-output SI, the model coefficients (ε, $\alpha_1$, ... ) can be found by fitting polynomials to Equation 16 with the measured probability density function of the amplitude (P(a)). More specifically, the model coefficients are found via a linear least-squares fitting solution of the following matrix problem:

$$\begin{bmatrix} \ln P(a_{b1}) - \ln(a_{b1}) \\ \ln P(a_{b2}) - \ln(a_{b2}) \\ \vdots \\ \ln P(a_{bN}) - \ln(a_{bN}) \end{bmatrix} = \begin{bmatrix} 1 & a_{b1}^2 & a_{b1}^4 & a_{b1}^6 & \ldots \\ 1 & a_{b2}^2 & a_{b2}^4 & a_{b2}^6 & \ldots \\ \vdots & \vdots & \vdots & \vdots \\ 1 & a_{bN}^2 & a_{bN}^4 & a_{bN}^6 & \ldots \end{bmatrix} \begin{bmatrix} \ln C \\ \frac{\varepsilon}{2d} \\ \frac{\alpha_1}{16d} \\ \frac{\alpha_2}{48d} \\ \vdots \end{bmatrix} \quad (19)$$

where $a_{b1}$, $a_{b2}$, ..., $a_{bN}$ are uniformly distributed bins of a. For a given bifurcation parameter, multiple experiments are repeated for different levels of d. The final values of the model coefficients are determined by averaging across all levels and sets of d at each bifurcation parameter.

The order of nonlinearity in the system is determined based on the number of nonlinear terms required to reproduce the measured $P(a)$. This is achieved by adding successively higher-order nonlinear terms to Equation 9 until the rank of the matrix in Equation 19 becomes deficient.

In accordance with the present embodiments, the super/subcritical nature of the Hopf bifurcation can be determined by examining the probability density function $P(a)$. If $P(a)$ shows two local maxima with respect to a at intermediate noise amplitudes d (a feature called bimodality), then the system is undergoing a subcritical Hopf bifurcation. However, if $P(a)$ is unimodal, exhibiting only one peak at every value of d, then the system is undergoing a supercritical Hopf bifurcation. To model the bimodality, a condition for the amplitude ($a_m$) at which the extrema of $P(a)$ occurs is derived:

$$d + \varepsilon a_m^2 + \frac{\alpha_1}{4}a_m^4 + \frac{\alpha_2}{8}a_m^6 + \frac{5\alpha_3}{64}a_m^8 + \frac{7\alpha_4}{128}a_m^{10} + \ldots = 0. \tag{20}$$

For bimodality to exist, there must be two positive solutions of $a_m^2$ at some values of d. For this to occur, the model must have nonlinear terms up to at least quintic order ($a_2$).

The main motivation for SI is to be able to predict dynamic bifurcations (i.e. the Hopf and saddle-node points) and, hence, the stability boundaries. To predict the bifurcation points, the calculated model coefficients are extrapolated to a higher bifurcation parameter. A linear regression for $\varepsilon$ is used. For the higher-order coefficients ($\alpha_n$), a power-law fit is used $\alpha_n \propto (p_b - m_1)^{-m_2}$, where $m_1$ and $m_2$ are positive constants obtained from least-square fitting of the experimental data, and $p_b$ is a bifurcation parameter. With the extrapolated coefficients, we reconstruct the bifurcation diagram by solving the noise-free Stuart-Landau equation (i.e., Equation 13a without the effect of noise, d=0). The bifurcation point and the post-bifurcation limit-cycle amplitude are obtained from this reconstructed bifurcation diagram.

As with input-output SI (Equation 9), the VDP-type oscillator model is also used for output-only SI. However, unlike with input-output SI where the frequency ($\omega$=1) is normalized, the frequency component is treated differently in the output-only framework. This is because output-only SI is usually applied to systems with high levels of intrinsic noise. Owing to the strong noise, the dominant oscillation mode of such systems is relatively weak, especially in the fixed-point regime, prior to the bifurcation. Given the one-mode approximation, such 'noisy' systems generally require band-pass filtering around the main oscillation frequency ($\omega$) prior to SI, and $\omega$ is considered in the system model:

$$\ddot{x} - (\varepsilon + \alpha_1 x^2 + \alpha_2 x^4 + \ldots)\dot{x} + \omega^2 x = \sqrt{2d}\eta, \tag{21a}$$

$$x = a \cos(\omega t + \phi), \tag{21b}$$

where $\omega$ is the oscillation frequency. Using the mathematical transformation depicted in Equations 9 to 11, two equations for the amplitude and the phase are obtained:

$$\dot{a} = \left(\frac{\varepsilon}{2}a + \frac{\alpha_1}{8}a^3 + \ldots\right) + Q_1(\Phi) - \left(\frac{\sqrt{2d}}{\omega}\sin\Phi\right)\eta, \tag{22a}$$

$$\dot{\phi} = Q_2(\Phi) - \left(\frac{\sqrt{2d}}{\omega a}\cos\Phi\right)\eta, \tag{22b}$$

where $\Phi = t + \phi$, and $Q_1(\Phi)$ and $Q_2(\Phi)$ are the sum of all the terms with first-order cosine components, which become zero when time averaged under the assumption that a and $\phi$ vary much more slowly than the oscillations themselves. For finite noise (d>0), the Equations 22a and 22b can be stochastically averaged, yielding the Fokker-Planck equation:

$$\frac{\partial}{\partial t}P(a,t) = -\frac{\partial}{\partial a}[D^{(1)}P(a,t)] + \frac{\partial^2}{\partial a^2}[D^{(2)}P(a,t)], \tag{23a}$$

$$D^{(1)} = \left(\frac{\varepsilon}{2}a + \frac{\alpha_1}{8}a^3 + \ldots\right) + \frac{d}{2\omega^2 a}, \quad D^{(2)} = \frac{d}{2\omega^2}, \tag{23b}$$

where $P(a,t)$ is the transitional PDF of a at time t, and $D^{(1)}$ and $D^{(2)}$ represent the drift and diffusion terms, respectively. In input-output SI, the stationary Fokker-Planck equation is derived from the Equations 23a and 23b to obtain the unknown coefficients ($\varepsilon, \alpha_1, \ldots$). These coefficients can advantageously be obtained because information about the input noise amplitude (d) had been obtained via an actuator model. However, in output-only SI, no such information about the input noise has been obtained because only intrinsic noise is used. Therefore, the drift and diffusion terms are evaluated separately in the transitional PDF of the system. Specifically, these terms can be estimated from the time correlation of the output signal:

$$D^{(n)} = \lim_{\tau \to 0} D_\tau^{(n)}, \tag{24a}$$

$$D_\tau^{(n)} = \frac{1}{n!\tau}\int_0^\infty (A-a)^n P(A, t+\tau|a, t)dA, \tag{24b}$$

where $P(A, t+\tau|a,t)$ is the conditional probability of the amplitude being A at time $t+\tau$ when the amplitude is a at time t. The advantage of calculating the drift and diffusion terms from the Equations 24a and 24b, respectively, is that the mathematical form of $D_\tau^{(n)}$ need not be pre-specified. Thus, the order of nonlinearity, which depends on the higher-order terms of Equation 23b, can be extracted via polynomial regression. Specifically, by combining Equations 23b, 24a and 24b, the polynomial order can be determined by adding successively higher-order terms to Equation 23b until the rank becomes deficient.

In experiments, noise is never perfectly white. This causes finite-time effects, giving rise to discrepancies between the actual $D_\tau^{(n)}$ and the experimentally measured values. In particular, the band-pass filtering worsens the finite-time effect. This effect, however, can be reduced by optimizing the VDP coefficients by minimizing the difference between the coefficient-based approximate solution and the experimental estimation of the Fokker-Planck equation. An approximate solution to Equation 23a can be obtained by solving the adjoint Fokker-Planck equation:

$$\frac{\partial}{\partial t}P^\dagger(A,t) = D^{(1)}\frac{\partial}{\partial A}P^\dagger(A,t) + D^{(2)}\frac{\partial^2}{\partial A^2}P^\dagger(A,t). \tag{25}$$

Given some initial conditions, the solution of Equation 25 at A=a and t=$\tau$ can be related to Equations 24a and 24b as follows:

$$P^\dagger(A,0) = (A-a)^n, \tag{26a}$$

$$P^\dagger(a,\tau) = n!\tau D_\tau^{(n)}(a). \tag{26b}$$

Thus, Equation 25 can be numerically solved using the initial coefficients, and $D_\tau^{(n)}$ can be computed from Equation 26b. The PDF-weighted error (E) between the experimental estimation and the analytical (coefficient-based) $D_\tau^{(n)}$ can then be computed by comparing Equations 24a/b and Equations 26a/b:

$$E = \frac{1}{2N_\tau N_a} \sum_{n=1}^{2} \sum_{i=1}^{N_a} \sum_{j=1}^{N_\tau} P_{i,j}\left(\bar{v}_{\tau_i}^{(n)}(a_i) - D_{\tau_j}^{(n)}(a_i;[\varepsilon,\alpha,d])\right), \quad (27)$$

where $N_a$ and $N_\tau$ are the number of amplitude and time-shift values used in the optimization, and P is the experimentally measured PDF at a=i and $\tau$=j. The term $\bar{v}_{\tau_i}^{(n)}$ is an experimental estimate of the drift n=1 or diffusion n=2 term, and $D_{\tau_j}^{(n)}(a_i; [\varepsilon, \alpha, d])$ is computed numerically from Equations 25 and 26a/b using finite difference. In the optimization, E is minimized by modifying $[\varepsilon, \alpha_1, d]$ via the Nelder-Mead simplex algorithm. This algorithm does not require a derivative of the function.

To predict the bifurcation points and the post-bifurcation limit-cycle amplitude in accordance with the methods and frameworks of the present embodiments, the model coefficients are extrapolated as described hereinabove. Specifically, a linear fit for $\varepsilon$ and a power-law fit for the higher-order ($\alpha_n$) coefficients are used. With the extrapolated coefficients, the bifurcation diagram can be reconstructed by solving the Stuart-Landau equation. The bifurcation point and the post-bifurcation limit-cycle amplitude can then be obtained from the reconstructed bifurcation plot.

In systems with high intrinsic noise, the bifurcation diagram obtained from the noise-free Stuart-Landau equation might not fully capture the noisy dynamics. In this scenario, the probabilistic bifurcation diagram can be determined by solving the stationary Fokker-Planck equation, which takes into account the effect of noise:

$$P(a) = Ca\exp\left[\frac{\omega^2 a^2}{d}\left(\frac{\varepsilon}{2} + \frac{\alpha_1}{16}a^2\right)\right], \quad (28)$$

where P(a) is the stationary PDF of a, and C is a normalization constant.

Hereinafter, the methods and frameworks in accordance with the present embodiments are verified by conducting SI experiments on three different systems: a laminar hydrodynamic system such as a low-density jet, a laminar thermoacoustic system such as a flame-driven Rijke tube, and a turbulent thermoacoustic system such as a gas-turbine combustor. Input-output SI is used for the first two systems, while output-only SI is used for the third system.

Case Study 1: Input-Output SI of a Hydrodynamic System

Low-density jets are central to many natural and industrial processes. Under certain conditions, they can develop global oscillations at a limit cycle, behaving as a prototypical example of a self-excited hydrodynamic oscillator. In this Case Study 1, system identification (SI) of a low-density jet is performed in accordance with the methods and frameworks of the present embodiments using measurements of its noise-induced dynamics in the unconditionally stable regime prior to both the Hopf and saddle-node points. It can be shown that the methods and frameworks in accordance with the present embodiments enable prediction of (i) the order of nonlinearity, (ii) the locations and types of the bifurcation points (and hence the stability boundaries), and (iii) the resulting limit-cycle oscillations. The only assumption made about the system is that it obeys a Stuart-Landau equation in the vicinity of the Hopf point, thus making the methods and frameworks advantageously applicable to a variety of hydrodynamic systems.

Low-density jets have a role in industrial processes such as fuel injection and plasma spraying. Under certain conditions, such jets can develop global hydrodynamic instability, leading to self-excited oscillations at a limit cycle. On the one hand, such oscillations can be beneficial in situations where mixing is desired. On the other hand, they can be detrimental in situations where they excite unwanted acoustic or structural resonances. Therefore, it is vital to be able to predict the onset of global hydrodynamic instability as well as the frequency and amplitude of the resulting limit-cycle oscillations (LCOs).

It has been shown that a low-density jet becomes globally unstable via a Hopf bifurcation: after a critical point (the Hopf point), the jet becomes unstable to infinitesimal perturbations and transitions to a self-excited state characterized by LCOs. Near the Hopf point, the growth rate is small, implying that the oscillation amplitude (a) evolves much more slowly than the oscillation frequency (co). The amplitude evolution in this specific regime can be modeled with the Stuart-Landau equation:

$$\frac{da}{dt} = k_1 a + k_2 a^3 + \ldots, \quad (29)$$

where t is time, $k_1$ is a linear driving/damping parameter, and $k_2$ is a nonlinear parameter. The Hopf point is at $k_1$=0, after which ($k_1$>0) the system becomes linearly unstable.

The Hopf bifurcation in low-density jets is usually considered to be supercritical, i.e. LCOs cannot occur before the Hopf point ($k_1$<0). Therefore, the linear parameter ($k_1$) alone determines the stability boundaries of the system. However, a hysteretic regime has been observed in which LCOs can occur even when $k_1$<0. This led to the establishment that the Hopf bifurcation in low-density jets can also be subcritical. In a system with a subcritical Hopf bifurcation, a finite-amplitude perturbation can trigger the system to limit-cycle oscillations (LCOs) via contributions from the nonlinear terms (such as $k_2 a^3$) even when $k_1$<0. This regime, where LCOs can occur despite the system being linearly stable, is called the bistable regime.

An important implication from the existence of a subcritical bifurcation in a system is that the nonlinear terms need to be calculated before the stability boundaries can be determined. The challenge, however, is that existing methods applied to jets and wakes can only calculate the nonlinear terms from measurements of the system dynamics after the emergence of LCOs. In other words, conventional methods can only describe the system behavior via post-processing which, while useful, lacks predictive capabilities, particularly for nonlinearities.

In most fluid dynamical systems, it is important to know where the bifurcation points are as they determine the stability boundaries. The most direct way of finding the bifurcation points is to solve the time-dependent Navier-Stokes equations and determine the parameter value (e.g., the Reynolds number, Re) at which the flow undergoes a qualitative change in behavior. Alternatively, one can obtain steady solutions of the system at a lower computational cost, and then solve for the eigenvalues of its Jacobian matrix. However, if applied to systems with complex geometries or boundaries, such conventional direct methods can be expensive and unreliable, as it is often difficult to define the boundary conditions with sufficient accuracy to produce meaningful numerical solutions. In such cases, one needs to first identify the system using the data available and then determine its bifurcation points. System identification (SI) methods for this purpose can be divided into two classes: (i) purely data-driven methods and (ii) model-based methods.

In purely data-driven methods, the governing equations of a physical system are found exclusively from experimental data, without the need to assume a system model a priori. For example, symbolic regression has been used to identify the nonlinear differential equations governing a variety of physical systems, ranging from simple harmonic oscillators to chaotic double pendula. In that procedure, experimental data is fitted to simple mathematical building blocks based on Hamiltonians and Lagrangians. New equations are then added to these via genetic programming. Although useful for simple systems, symbolic regression becomes impractical for systems containing a large number of degrees of freedom. To overcome this problem, it has been recognized that the key dynamics of most physical systems are usually simple enough to be described by just a few leading terms. This makes it possible to use sparsity-promoting tools and machine learning to identify low-dimensional models of physical systems at a reduced computational cost. Recently, machine learning has also been used to determine the low-dimensional equations governing low-Re turbulence in plane Couette flow, enabling the entire bifurcation cascade to be reproduced and studied.

Purely data-driven methods for SI are useful for their role in explaining many naturally occurring phenomena for which there is an abundance of experimental data but nearly no knowledge of the governing equations. In engineering situations, however, collecting experimental data is usually expensive. Yet, there is often some knowledge of the underlying system dynamics. So, for such situations, a model-based method may be more suitable.

In model-based methods, an appropriate low-dimensional model is assumed for the system, and then experimental data is used to determine the parameter values of the model and their variations with the physical parameters of the system. For example, Equation 29 can be assumed to be a low-dimensional model of a jet or wake in the vicinity of a Hopf bifurcation. Variations in $k_1$ and $k_2$ with Re can then be extracted from experimental data. Conventional methods demonstrating such extraction, however, are limited to nearly noise-free measurements and to systems with a supercritical Hopf bifurcation.

Recently, the aforementioned SI methods have been extended to exploit the influence of noise from background turbulence in the flow field of a thermoacoustic system. In these methods, the Stuart-Landau equation has been replaced with its corresponding Fokker-Planck equation, yielding expressions for the probability density function, which is equivalent to the long-time average of the noise-affected measurements. This method has been further extended to enable SI of a laboratory-scale combustor undergoing a subcritical Hopf bifurcation. However, to be able to determine the nonlinear terms, all of these conventional SI methods require at least some data from the LCO regime. Consequently, these methods cannot predict the nature of a bifurcation or the resulting LCO dynamics. In fact, in most of these conventional methods, the nonlinear terms are ignored in the regime before the Hopf point ($k_1$<0). By contrast, it has been shown from the noise-induced dynamics of a low-density jet that the nonlinear terms are active even before the stability boundaries are reached, i.e. in the unconditionally stable regime, where the system is stable to infinitesimal as well as finite-amplitude perturbations.

The effect of noise on oscillatory systems reveals that the spectra of the noise-induced dynamics contain precursors capable of forecasting impending nonlinear instabilities. In particular, it was found that the system response to noise becomes more coherent (or less noisy) on approach to the Hopf point. For example, for the FitzHugh-Nagumo system it has been found that the coherence in the noise-induced dynamics first increases, reaches a maximum, and then decreases as the noise amplitude increases. This phenomenon has been termed coherence resonance. Coherence resonance has been defined in terms of the coherence factor and it has been shown that systems with Hopf bifurcations generally exhibit some degree of coherence resonance.

For example, coherence resonance has been reported in two different fluid dynamical systems: a thermoacoustic oscillator and a low-density jet. In addition, coherence resonance has been phenomenologically modelled in a thermoacoustic system, enabling the noise-induced dynamics arising from supercritical and subcritical Hopf bifurcations to be explored in detail. Moreover, the use of coherence resonance has been experimentally demonstrated to identify the different types of Hopf bifurcation in a low-density jet via the noise-induced dynamics in only the unconditionally stable regime. However, information obtained in this specific regime has yet to be exploited for SI of any experimental system—fluid dynamical or otherwise.

In accordance with the present embodiments, methods and SI frameworks have been developed that use data from only the unconditionally stable regime (i.e. pre-bifurcation regime) to predict the nonlinear behavior of a low-density jet in the vicinity of its Hopf bifurcation. Specifically, the methods and SI frameworks in accordance with the present embodiments predict (i) the order of nonlinearity, (ii) the locations and types of the bifurcation points (and hence the stability boundaries), and (iii) the resulting LCO dynamics without having to operate the system in the potentially dangerous linearly unstable (limit cycle) regime or the bistable regime.

Figure 10:
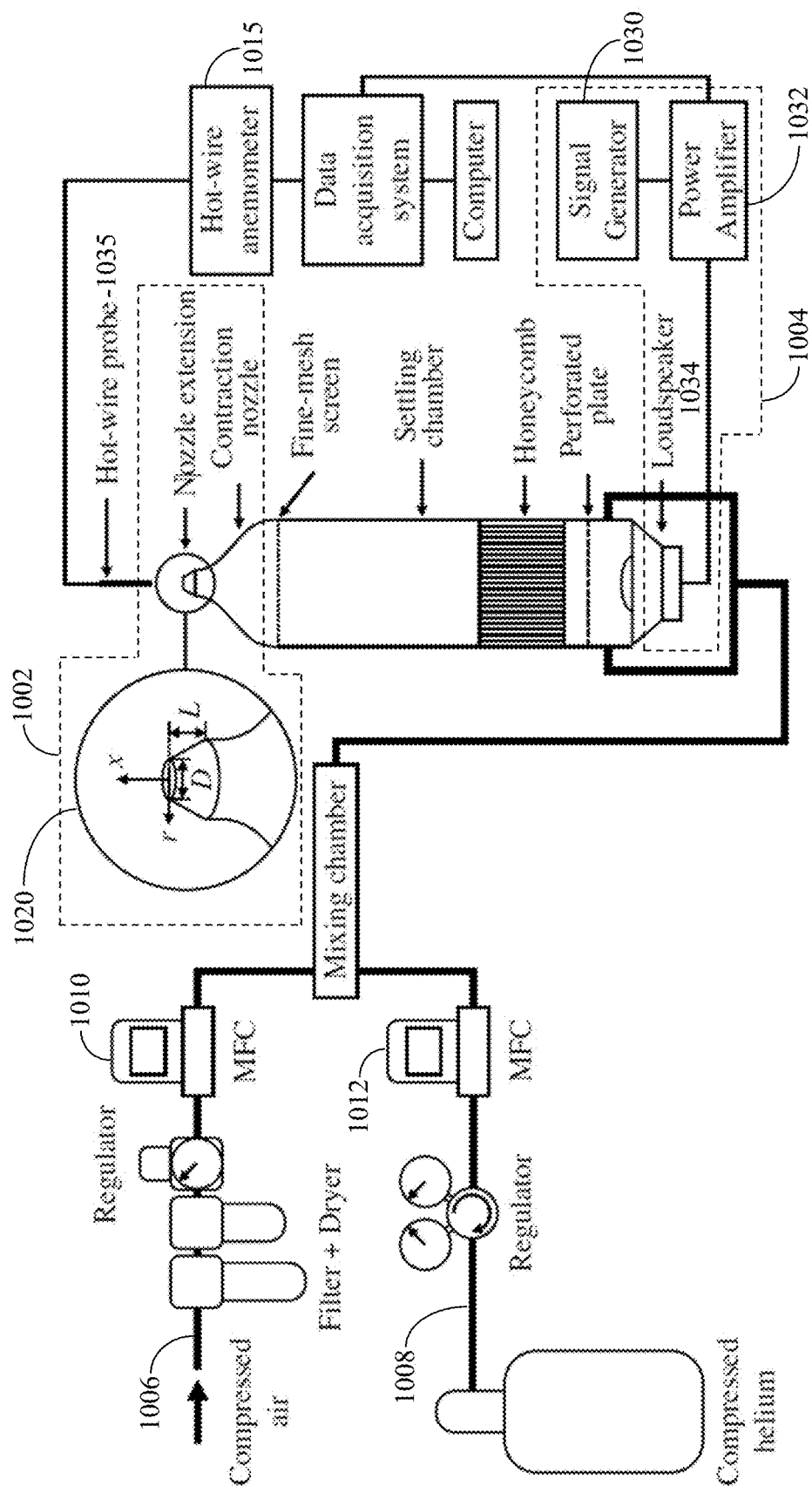
FIG. 10 depicts a schematic illustration of a first experimental setup used to produce a low-density jet perturbed by external noise for examination by system identification (SI) in accordance with present embodiments.

Referring to FIG. 10, a schematic illustration 1000 depicts an experimental setup used to produce a low-density jet perturbed by external noise in accordance with the present embodiments. A laminar helium-air jet discharging into quiescent ambient air is perturbed by external noise and the setup includes an axisymmetric nozzle assembly 1002, an acoustic forcing system 1004, gas supply lines 1006, 1008 coupled to mass flow controllers (MFCs) 1010, 1012, and a hot-wire anemometer 1015. There are three main independent control parameters governing the stability boundaries of the jet and its LCO dynamics. These control parameters are (i) the jet-to-ambient density ratio, $S=\rho_j/\rho\infty$; (ii) the aspect ratio of the nozzle tip, L/D, (seen in the inset 1020) which controls the thickness of the initial shear layer; and (iii) the jet Reynolds number, $Re=\rho_j U_j D/\mu_j$, where $U_j$ is the jet centerline velocity, D is the nozzle exit diameter, and $\mu_j$ is the dynamic viscosity of the jet fluid. In this invention, we keep the first two parameters fixed and vary only Re.

The acoustic forcing system 1004 consists of three components: (i) a signal generator 1030 such as a Keysight 33512B manufactured by Keysight Technologies of California, USA, (ii) a power amplifier 1032 such as an Alesis RA150 manufactured by Alesis of Rhode Island, USA, and (iii) a loudspeaker 1034 such as a FaitalPRO 3FE25 manufactured by Faital S.p.A. of Milan, Italy. The signal generator 1030 produces Gaussian noise with a bandwidth of 0-20

MHz. The upper frequency limit of the noise (20 MHz) is four orders of magnitude higher than the natural global frequency of the jet. Therefore, the noise felt by the jet is essentially white. The noise amplitude is controlled by regulating the input voltage (V) into the loudspeaker 1034 with the power amplifier 1032. The noise-induced dynamics of the jet is measured in terms of the local streamwise velocity in the potential core, using a hot-wire probe 1035 positioned on the jet centerline, 1.5D downstream from the jet exit. The output voltage from the hot-wire probe 1035 is digitized at a frequency of 32768 Hz.

Figure 11A:
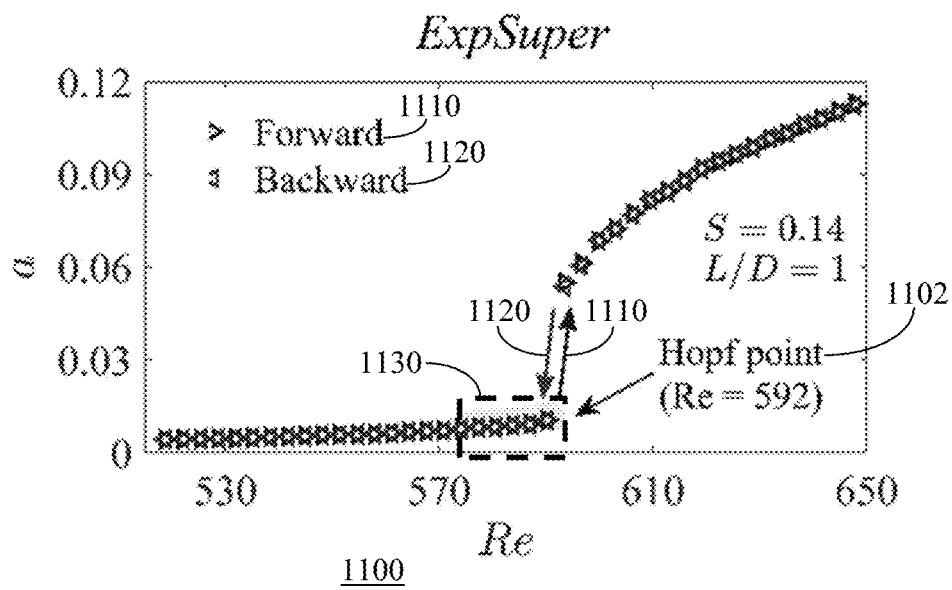
Figure 11B:
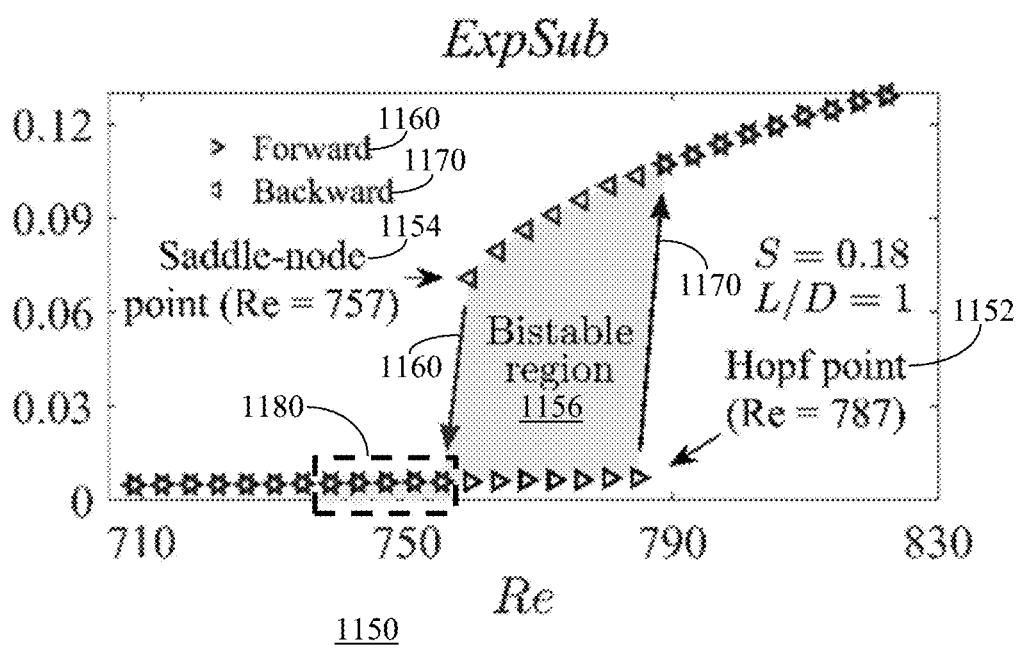

Referring to FIGS. 11A and 11B, bifurcation diagrams 1100, 1150 are depicted for two representative flow conditions cases: ExpSuper and ExpSub, respectively. In the bifurcation diagram 1100 where S=0.14 and L/D=1, the Hopf point 1102 below which LCOs are not observed is at Re=592. Thus, this condition is experimentally determined to be supercritical and is called ExpSuper herein. In the bifurcation diagram 1150 where S=0.18 and L/D=1, the Hopf point 1152 is at Re=787, below which LCOs are observed down to Re=757, which is a saddle-node point 1154 with a bistable region 1156 defined between the Hopf point 1152 and the saddle-node point 1154. Thus, this condition is experimentally determined to be subcritical and is called ExpSub here. The terms 'forward' 1110, 1160 and 'backward' 1120, 1170 refer to data collected by increasing and decreasing Re, respectively. In accordance with the methods and frameworks of the present embodiments, the data used for SI is collected exclusively in the pre-bifurcation unconditionally stable regimes 1130, 1180.

For the system identification of the low-density jet, we use the model discussed hereinabove in relation to Equation 9, reproduced as Equation 30:

$$\ddot{x} - (\varepsilon + \alpha_1 x^2 + \alpha_2 x^4 + \alpha_3 x^6 + \alpha_4 x^8 + \ldots)\dot{x} + x + \beta x^3 = \sqrt{2d}\eta(t). \quad (30)$$

Equation 30 is non-dimensionalized such that (i) the natural frequency is fixed at 1 for all Re and (ii) $x=u'/\bar{u}$, where u' is the measured velocity fluctuation and $\bar{u}$ is its time average. Here $\alpha_1$ is a counterpart to $k_2$ in Equation 29 and determines the nature of the Hopf bifurcation.

For the input-output SI, the effect of an actuator on the jet is modeled using the actuator model in accordance with the methods and frameworks of the present embodiments as discussed hereinabove. Specifically, two assumptions are set: (i) a power-law relationship exists between V and d, such that $d=b+kV^n$, where b is the intrinsic amplitude of background noise, k is the proportionality constant, and n is the exponent; and (ii) b<<d.

$$\ln\left(\frac{d}{c}\right) \approx n \ln V + \ln\left(\frac{k}{c}\right). \quad (31)$$

Figure 12A:
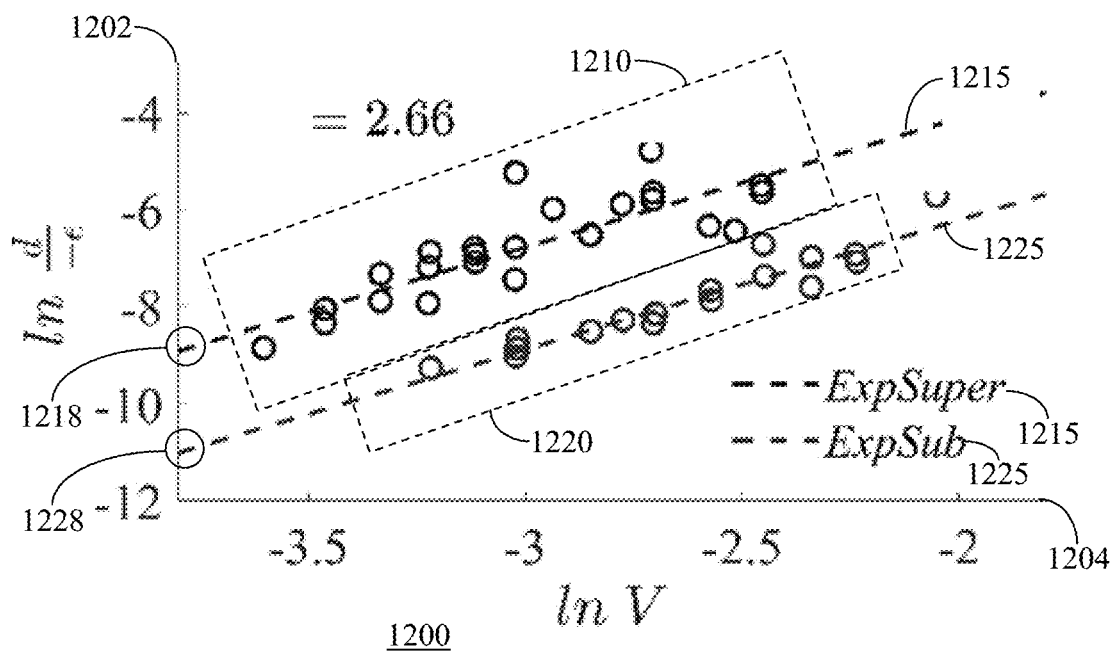
Figure 12B:
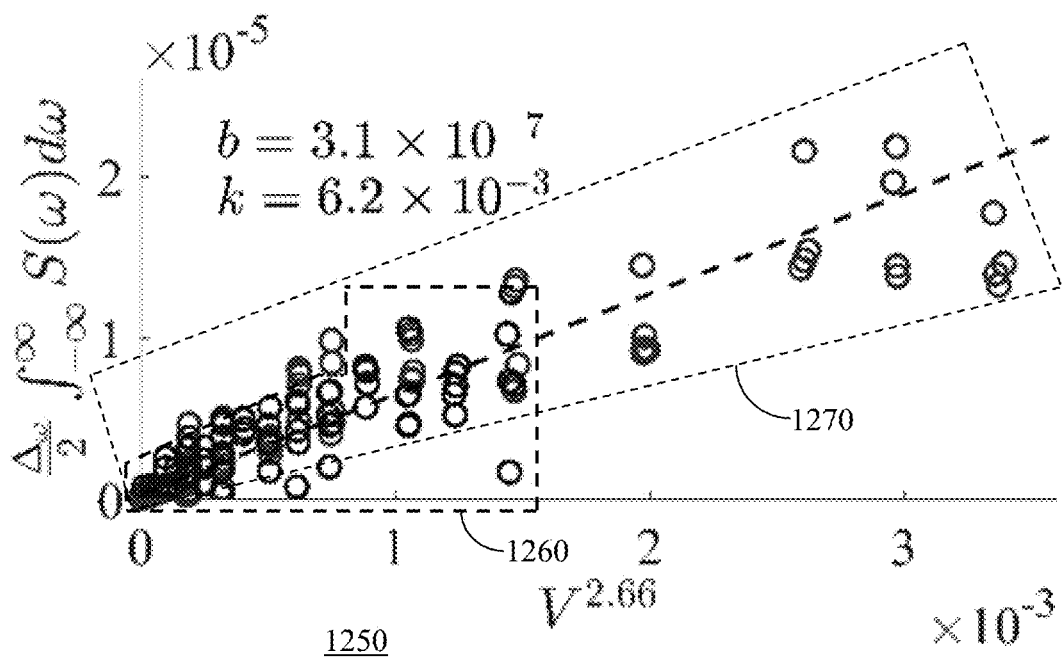

Referring to FIGS. 12A and 12B, graphs 1200, 1250 model the actuator to determine experimental data (circular markers) and linear fits (dashed lines) for various variables in accordance with the present embodiments. First, $c=|\varepsilon|$ is chosen based on its smallest variance in multiple experimental replications and ln $$\left(\frac{d}{|\varepsilon|}\right)$$

1202 is plotted against ln V 1204 in the graph 1200 to determine a variable n. The ExpSuper data 1210 and the ExpSub data 1220 fit well with to linear plots 1215, 1225, respectively, with a common slope of n=2.66. The y-intercepts 1218, 1228 directly give ln $$\left(\frac{k}{|\varepsilon|}\right),$$

but neither k nor e is known at this stage.

As a next step, the variable k is found from the y-intercept of the data and the variable b is found from the gradient of the data in the graph 1250. Thus, the relationship between the input loudspeaker voltage V from the power amplifier 1032 (FIG. 10) and the amplitude of the noise from the loudspeaker 1034 is $d=(3.1\times10^{-7})+(6.2\times10^{-3})V^{2.66}$. The fact that both the ExpSuper data 1260 and the ExpSub data 1270 fit this power-law model and that b is indeed very small justifies the modelling assumptions for the actuator.

Figure 13A:
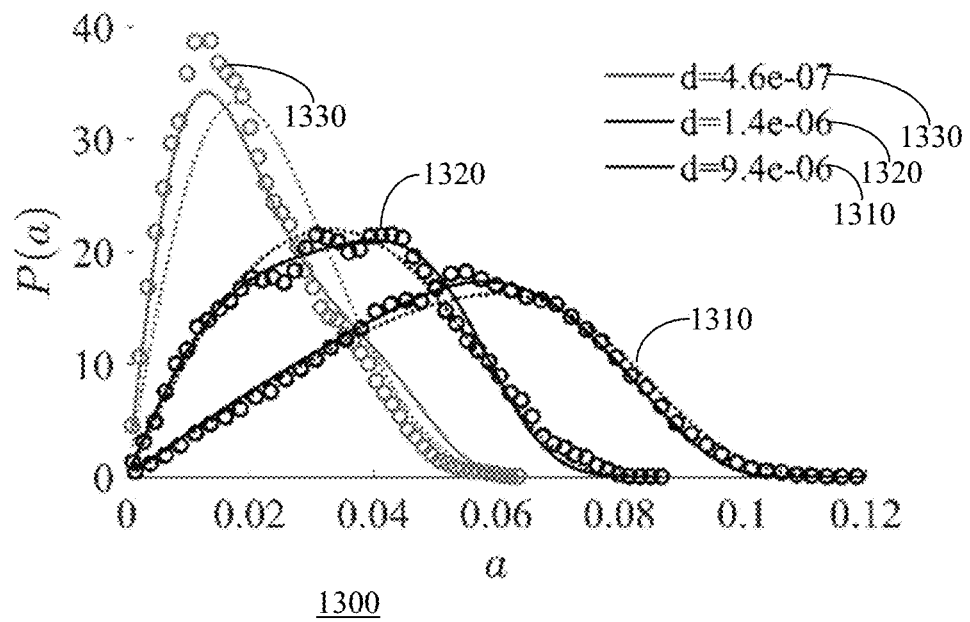
Figure 13B:
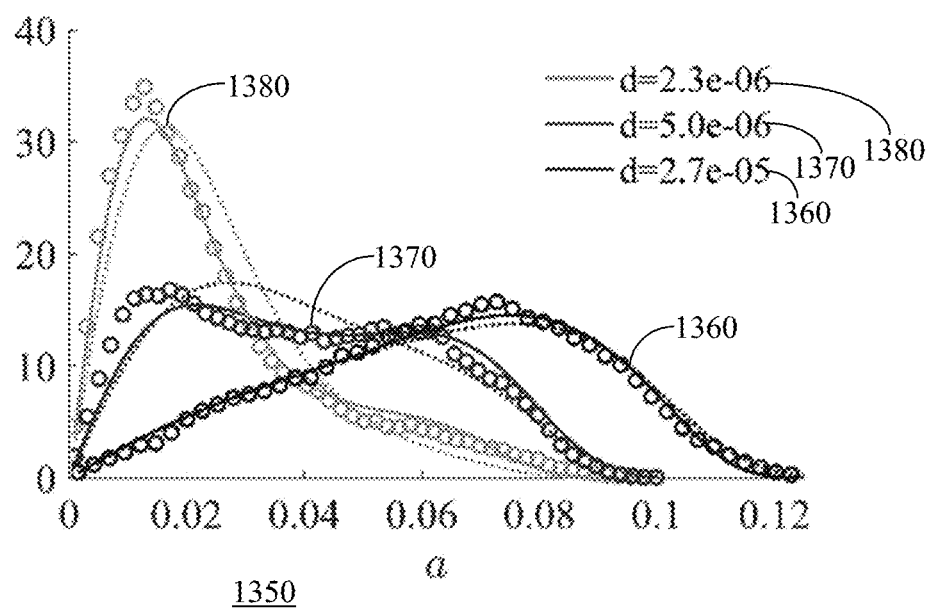

Referring to FIGS. 13A and 13B, graphs 1300, 1350 depict probability density function of the velocity fluctuation amplitude P(a) in the jet under increasing noise amplitudes in accordance with the present embodiments. The graph 1300 depicts the probability density function of the velocity fluctuation amplitude P(a) at increasing noise amplitudes for ExpSuper data where Re=584, and the graph 1350 depicts the probability density function of the velocity fluctuation amplitude P(a) at increasing noise amplitudes for ExpSub data where Re=755. The model coefficients ($\varepsilon$, $\alpha_1$, ...) are found by fitting polynomials to Equation 19 with the measured P(a) as described hereinabove.

At each Re, there are twenty and nineteen different levels of d in ExpSuper and ExpSub, respectively. For each value of d, there are five sets of data. In the graphs 1300, 1350, the markers represent experimental data and the dashed and solid lines are numerical estimates. The final values of the model coefficients are determined by averaging across all levels and sets of d at each Re. In this averaging procedure, outliers are excluded by discarding data points within 20% of the extrema. The graphs 1300, 1350 show that the ability of the model to reproduce P(a) improves as the number of nonlinear terms in the model increases.

The order of nonlinearity in the system is determined based on the number of nonlinear terms required to reproduce the measured P(a). This is achieved by adding successively higher-order nonlinear terms to Equation 9 until the rank of the matrix in Equation 19 becomes deficient. The graph 1350 shows that, at an intermediate noise amplitude, two peaks appear in P(a). This behavior is called bimodality and is observed in both ExpSuper and ExpSub. For bimodality to exist, there must be two positive solutions of $a_m^2$ at some values of d in Equation 20. For this to occur, the model must have nonlinear terms up to at least quintic order ($\alpha_2$).

To reproduce P(a), three different models are used. The first model, called N5, has up to fifth-order (quintic) nonlinearity, requiring up to $\alpha_2$, which is the minimum for bimodality. The second and third models have up to ninth-order (called N9; up to $\alpha_4$) and thirteenth-order (called N13; up to $\alpha_6$) nonlinearity, respectively. Different values of d 1310, 1320, 1330 in the ExpSuper data are plotted in the graph 1300, while different values of d 1360, 1370, 1380 in the ExpSub data are plotted in the graph 1350. In the graphs 1300, 1350, the dashed lines are numerical estimates from the N5 model (i.e., up to $\alpha_2$, quintic order) and the solid lines are numerical estimates from the N9 model (i.e., up to $\alpha_4$, nonic order).

Table 1 below lists the coefficients for the three models. It can be seen that when going from N5 to N9, the coefficients change significantly—by an order of magnitude in many cases. However, when going from N9 to N13, only a small change in the coefficients is observed, with $\alpha_5$ and $\alpha_6$ being negligible. In the graphs 1300, 1350, it is observed that the N9 model (solid lines) reproduces P(a) satisfactorily. Thus, it can be concluded that the nonlinearity in this system is up to ninth order.

Figure 15A:
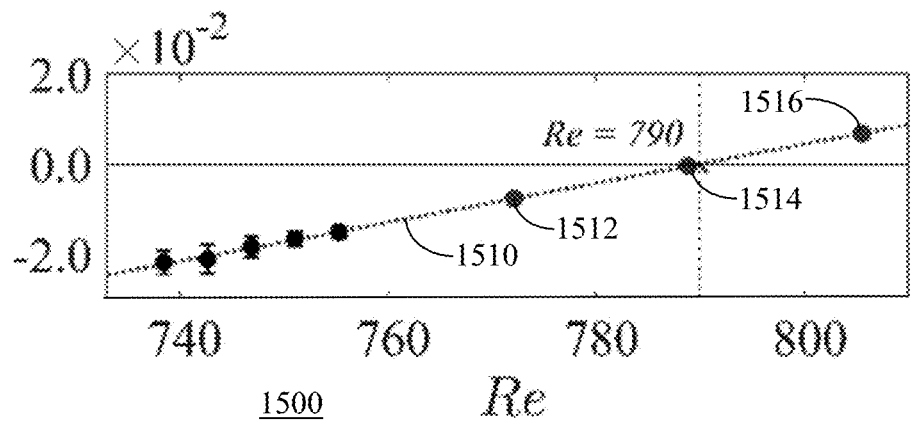
Figure 15B:
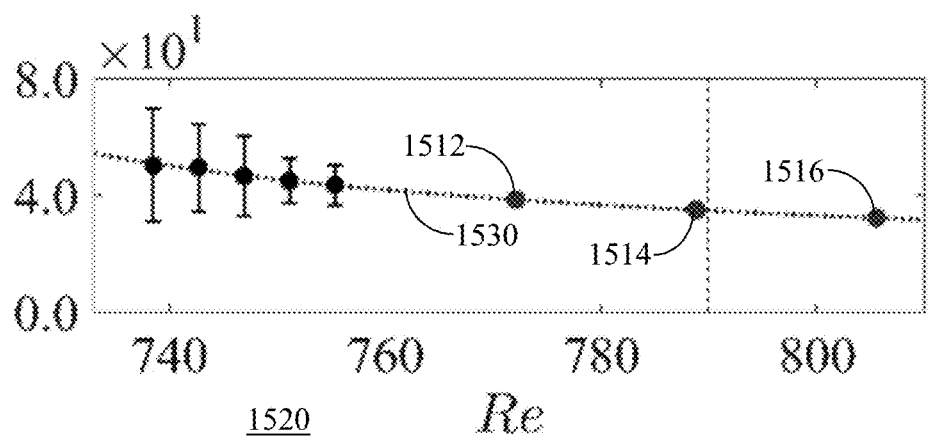
Figure 15C:
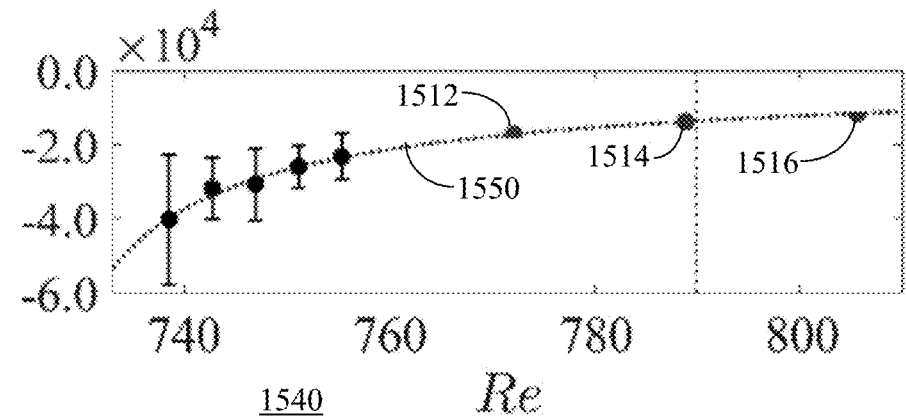
Figure 15D:
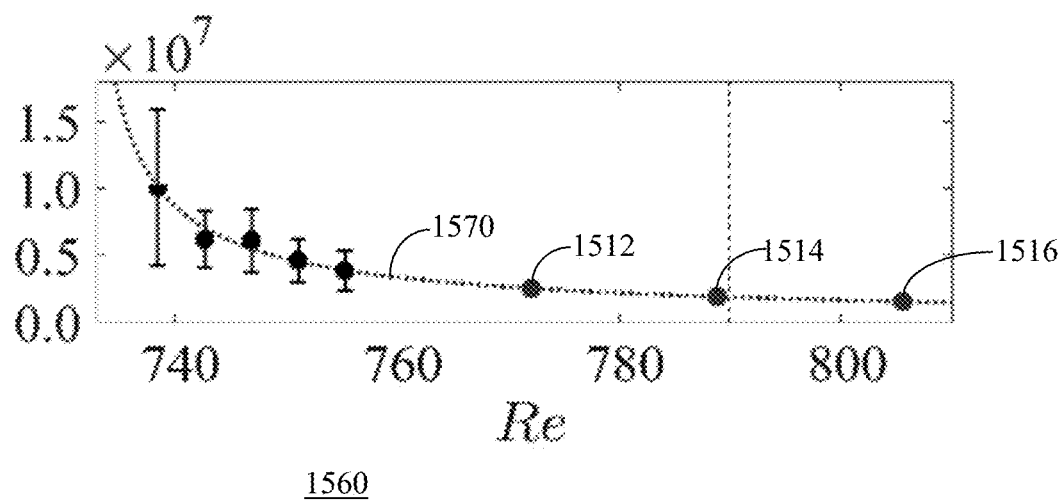
Figure 15E:
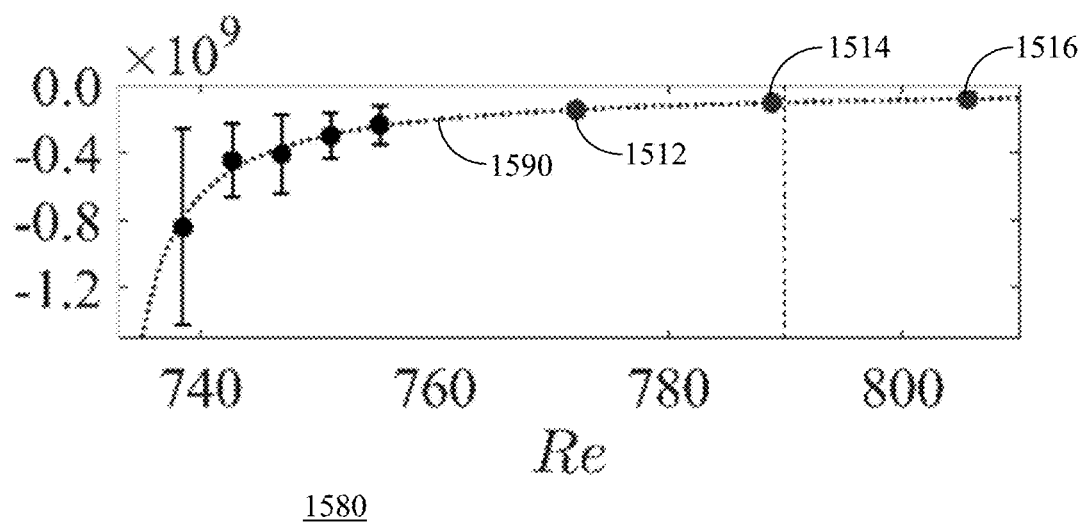

Referring to FIG. 15, comprising FIGS. 15A to 15E, graphs 1500, 1520, 1540, 1560, 1580 are depicted of model coefficient predictions for ε (the graph 1500 (FIG. 15A)), $a_1$ (the graph 1520 (FIG. 15B)), $a_2$ (the graph 1540 (FIG. 15C)), $a_3$ (the graph 1560 (FIG. 15D)), and $a_4$ (the graph 1580 (FIG. 15E)) with respect to Re for the ExpSub data. The markers with error bars in the graphs 1500, 1520, 1540, 1560, 1580 are the experimental data. In FIG. 15A, the dotted line 1510 is a linear fit of the experimental data for the model

TABLE 1

| | | Re for ExpSuper | | | | | Re for ExpSub | | | | |
|---|---|---|---|---|---|---|---|---|---|---|---|
| Coef. | Model | 577.4 | 580.5 | 583.8 | 587.0 | 590.3 | 738.5 | 742.7 | 746.9 | 751.1 | 755.3 |
| ε | N5 | −2.4E−3 | −2.2E−3 | −1.5E−3 | −1.0E−3 | −7.4E−4 | −1.7E−2 | −1.4E−2 | −1.3E−2 | −1.1E−2 | −9.1E−3 |
| | N9 | −4.0E−3 | −3.6E−3 | −3.3E−3 | −2.7E−3 | −2.1E−3 | −2.2E−2 | −2.1E−2 | −1.8E−2 | −1.7E−2 | −1.5E−2 |
| | N13 | −4.0E−3 | −3.6E−3 | −3.0E−3 | −2.8E−3 | −2.2E−3 | −2.2E−2 | −2.0E−2 | −1.8E−2 | −1.6E−2 | −1.5E−2 |
| $\alpha_1$ | N5 | 8.1E−1 | 1.8E+0 | 1.5E+0 | 1.8E+0 | 2.1E+0 | 1.4E+1 | 1.4E+1 | 1.1E+1 | 1.4E+1 | 1.3E+1 |
| | N9 | 1.6E+1 | 1.6E+1 | 1.5E+1 | 1.5E+1 | 1.5E+1 | 5.0E+1 | 4.9E+1 | 4.7E+1 | 4.5E+1 | 4.3E+1 |
| | N13 | 1.6E+1 | 1.6E+1 | 1.3E+1 | 1.5E+1 | 1.5E+1 | 4.9E+1 | 4.5E+1 | 4.5E+1 | 4.1E+1 | 4.4E+1 |
| $\alpha_2$ | N5 | −1.5E+3 | −1.8E+3 | −1.5E+3 | −1.5E+3 | −1.5E+3 | −5.9E+3 | −6.1E+3 | −4.2E+3 | −4.5E+3 | −3.5E+3 |
| | N9 | −1.8E+4 | −1.6E+4 | −1.4E+4 | −1.3E+4 | −1.2E+4 | −4.0E+4 | −3.2E+4 | −3.1E+4 | −2.6E+4 | −2.3E+4 |
| | N13 | −1.8E+4 | −1.6E+4 | −1.4E+4 | −1.3E+4 | −1.2E+4 | −3.9E+4 | −3.0E+4 | −3.0E+4 | −2.5E+4 | −2.3E+4 |
| $\alpha_3$ | N9 | 5.3E+6 | 4.2E+6 | 3.5E+6 | 3.0E+6 | 2.4E+6 | 1.0E+7 | 6.2E+6 | 6.1E+6 | 4.6E+6 | 3.9E+6 |
| | N13 | 5.1E+6 | 4.1E+6 | 3.5E+6 | 3.2E+6 | 2.4E+6 | 9.7E+6 | 6.2E+6 | 6.1E+6 | 4.6E+6 | 3.4E+6 |
| $\alpha_4$ | N9 | −5.1E+8 | −3.8E+8 | −2.9E+8 | −2.2E+8 | −1.6E+8 | −8.4E+8 | −4.5E+8 | −4.1E+8 | −3.0E+8 | −2.4E+8 |
| | N13 | −4.9E+8 | −3.6E+8 | −3.1E+8 | −2.4E+8 | −1.6E+8 | −8.0E+8 | −4.7E+8 | −4.1E+8 | −2.9E+8 | −1.8E+8 |
| $\alpha_5/\alpha_6$ | N13 | 0.0E+0 | 0.0E+0 | 0.0E+0 | 0.0E+0 | 0.0E+0 | 0.0E+0 | 0.0E+0 | 0.0E+0 | 0.0E+0 | 0.0E+0 |

As can be seen from the model coefficients for ExpSub and ExpSuper in the Table 1 and the models N5, N9 and N13, which have up to $\alpha_2$, $\alpha_4$ and $\alpha_6$ terms, respectively, increasing the order of nonlinearity above the nonic term ($\alpha_4$) does not further improve the agreement with the experimental data.

A main motivation for system identification (SI) in accordance with the methods and frameworks of the present embodiments is to be able to predict dynamic bifurcations (i.e., the Hopf and saddle-node points) and, hence, the stability boundaries of the system. In addition, stochastic P-bifurcations, i.e., when the system switches from unimodal to bimodal behavior, can also be predicted. Stochastic P-bifurcations are important for determining the dynamic bifurcations of noisy systems.

To predict the bifurcation points, we extrapolate the model coefficients calculated hereinabove are extrapolated to higher Re, as shown in FIGS. 14 and 15. As discussed, a linear regression is used for ε, and a power-law fit is used for $\alpha_n$: $\alpha_n \propto (\text{Re}-m_1)^{-m_2}$, where $m_1$ and $m_2$ are positive constants obtained from least-square fitting of the experimental data.

Figure 14A:
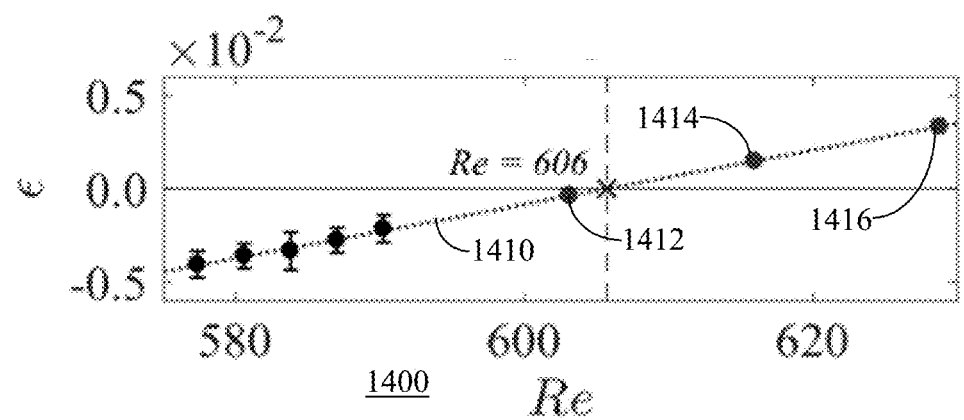
Figure 14B:
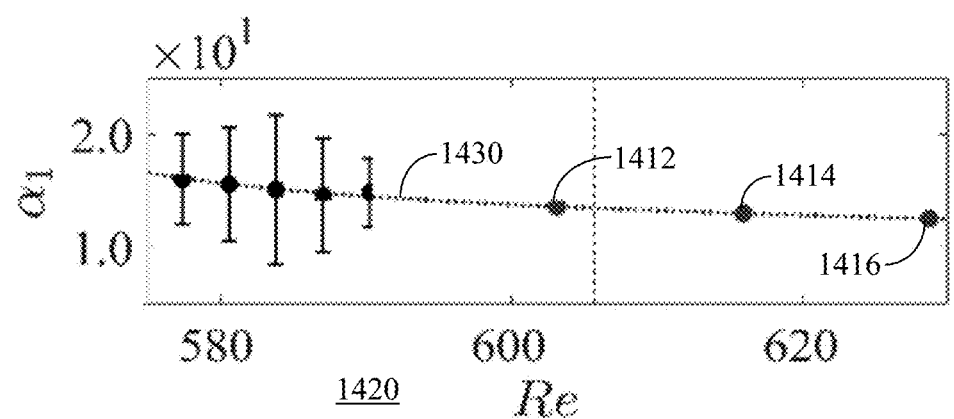
FIG. 14B depicts model coefficients with respect to Re for the ExpSuper data in accordance with the present embodiments, wherein 14B is a graph of power-law fits of experimental data.
Figure 14C:
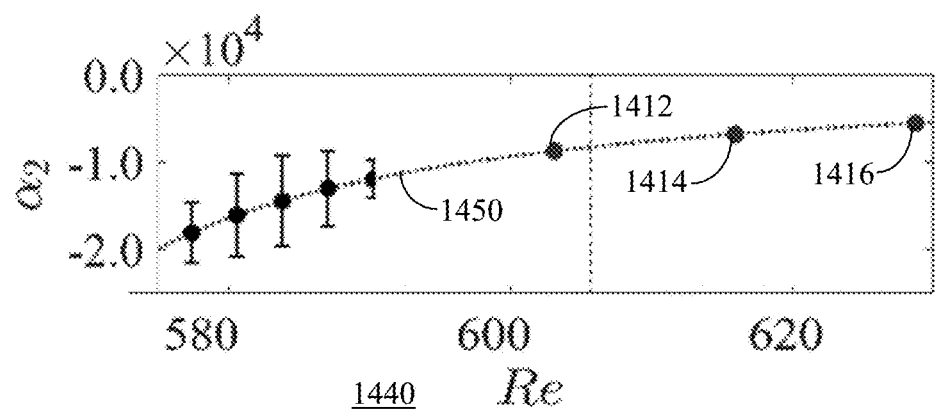
FIG. 14C depicts model coefficients with respect to Re for the ExpSuper data in accordance with the present embodiments, wherein 14C is a graph of power-law fits of experimental data.
Figure 14D:
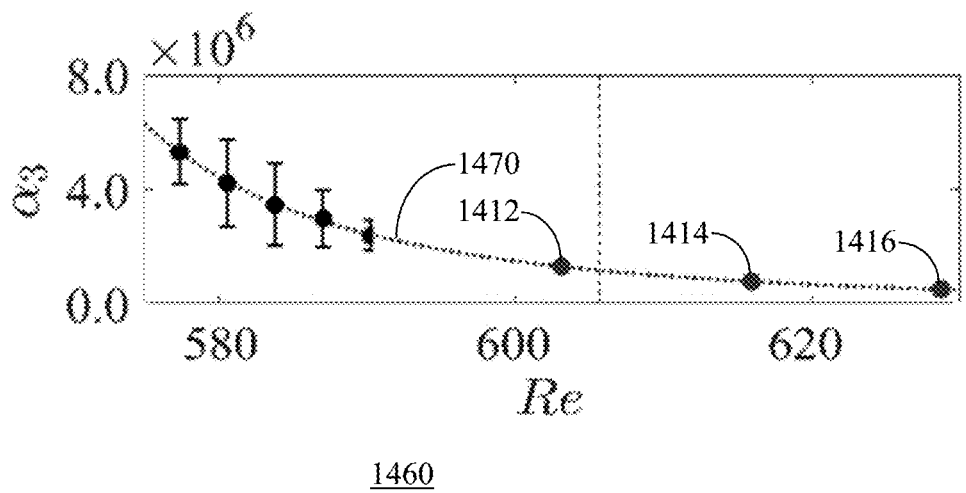
FIG. 14D depicts model coefficients with respect to Re for the ExpSuper data in accordance with the present embodiments, wherein 14D is a graph of power-law fits of experimental data.
Figure 14E:
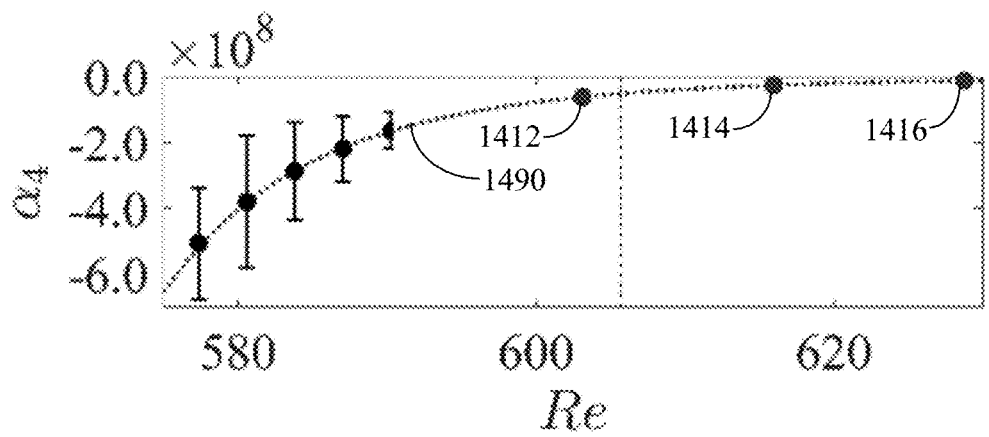
FIG. 14E depicts model coefficients with respect to Re for the ExpSuper data in accordance with the present embodiments, wherein 14E is a graph of power-law fits of experimental data.

Referring to FIG. 14, comprising FIGS. 14A to 14E, graphs 1400, 1420, 1440, 1460, 1480 are depicted of model coefficient predictions for ε (the graph 1400 (FIG. 14A)), $a_1$ (the graph 1420 (FIG. 14B)), $a_2$ (the graph 1440 (FIG. 14C)), $a_3$ (the graph 1460 (FIG. 14D)), and $a_4$ (the graph 1480 (FIG. 14E)) with respect to Re for the ExpSuper data. The markers in the graphs 1400, 1420, 1440, 1460, 1480 are the experimental data, with the error bars showing the standard deviation of the data points collected over repeated experiments. In FIG. 14A, the dotted line 1410 is a linear fit of the experimental data for the model coefficient ε. The dotted lines 1430, 1450, 1470, 1490 in FIGS. 14B to 14E, respectively, are power-law fits of the experimental data for the model coefficients $a_1$, $a_2$, $a_3$, and $a_4$, respectively. The markers 1412, 1414, 1416 are extrapolated points for ExpSuper at Re values of 603, 616, 629 and for ExpSub (Re=772, 789, 806).

coefficient ε. The dotted lines 1530, 1550, 1570, 1590 in FIGS. 15B to 15E, respectively, are power-law fits of the experimental data for the model coefficients $a_1$, $a_2$, $a_3$, and $a_4$, respectively. The markers 1512, 1514, 1516 in FIGS. 15A to 15E are extrapolated points for ExpSub at Re values of 772, 789, and 806.

Figure 16A:
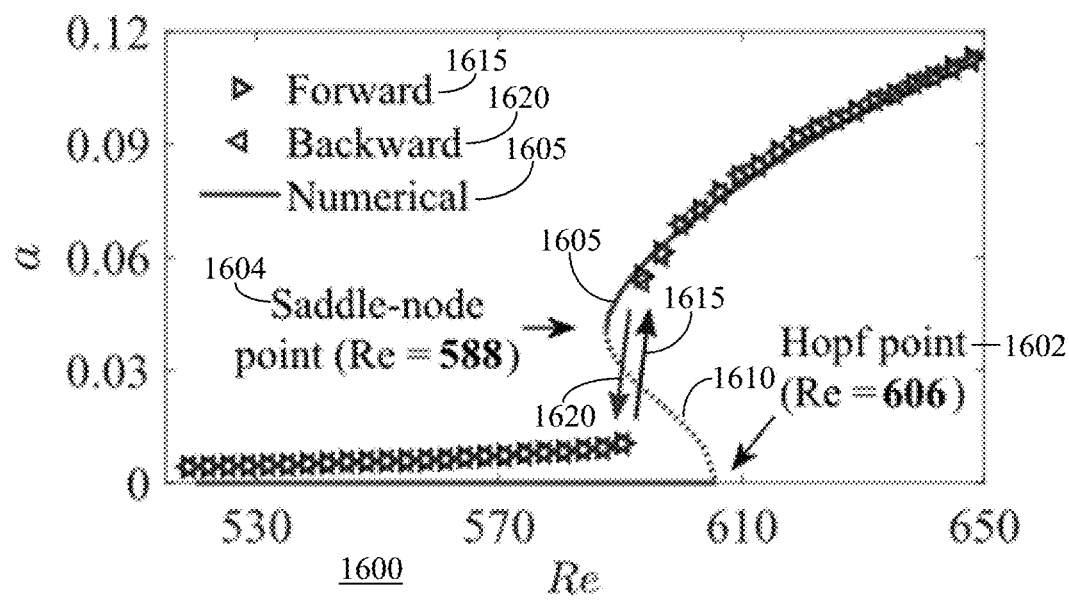
Figure 16B:
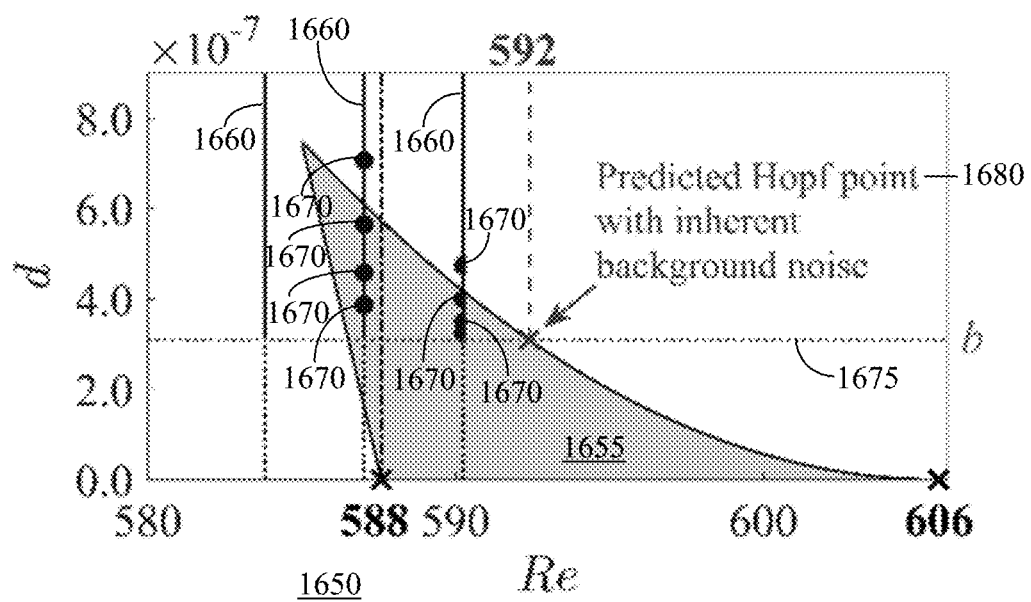

From the extrapolated coefficients, dynamic and stochastic bifurcation plots can be generated for ExpSuper and ExpSub. Referring to FIGS. 16A and 16B, graphs 1600, 1650 depict dynamic and P-bifurcation (i.e., stochastic bifurcation) plots of ExpSuper data in accordance with the present embodiments. The dynamic bifurcation plot 1600 depicts a Hopf point 1602 and a saddle-node point 1604 and includes a solid line 1605 to denote a stable solution as calculated from the model and a dotted line 1610 to denote an unstable solution as calculated from the model. A 'forward' arrow 1615 and a 'backward' arrow 1620 refer to data collected by increasing and decreasing Re, respectively.

The stochastic bifurcation plot 1650 includes a grey area 1655 which denotes a bimodal regime calculated from the model. Vertical lines 1660 denote where the experiments were conducted and circular markers 1670 denote where bimodality is observed experimentally. A horizontal line 1675 denotes an intrinsic amplitude of the background noise and the Hopf point 1680 can be predicted where the horizontal line intersects with a high Re boundary of the bimodal regime 1655.

Figure 17A:
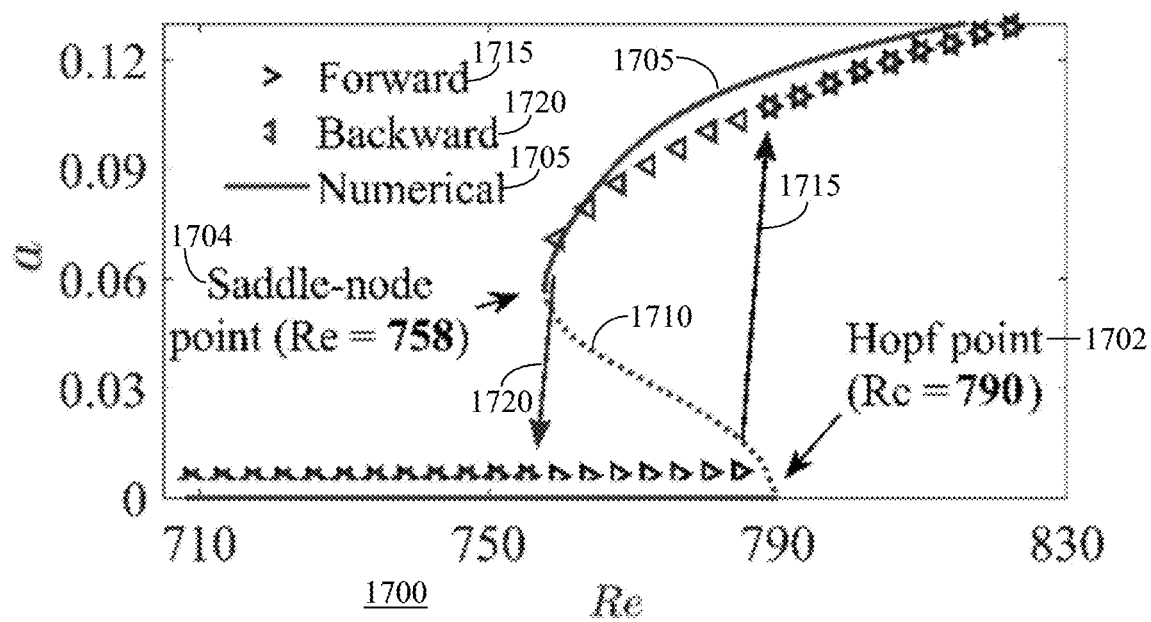
Figure 17B:
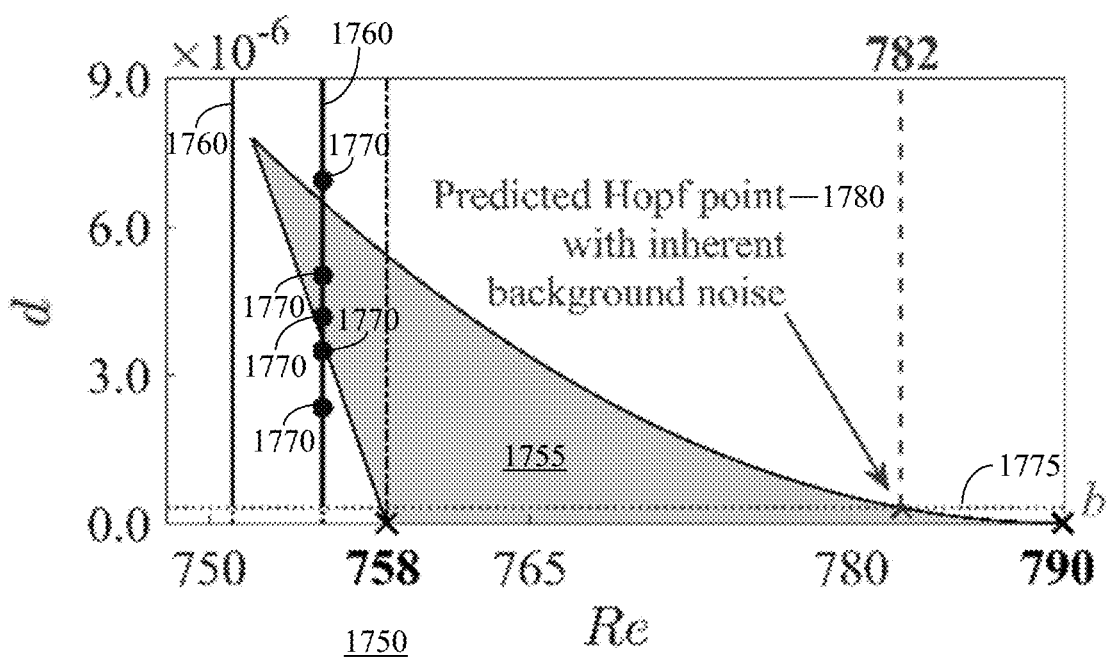

Similarly, FIGS. 17A and 17B depict graphs 1700, 1750 which depict dynamic and P-bifurcation (i.e., stochastic bifurcation) plots of ExpSub data in accordance with the present embodiments. The dynamic bifurcation plot 1700 depicts a Hopf point 1702 and a saddle-node point 1704 and includes a solid line 1705 to denote a stable solution as calculated from the model and a dotted line 1710 to denote an unstable solution as calculated from the model. A 'forward' arrow 1715 and a 'backward' arrow 1720 refer to data collected by increasing and decreasing Re, respectively.

The stochastic bifurcation plot 1750 includes a grey area 1755 which denotes a bimodal regime calculated from the model. Vertical lines 1760 denote where the experiments were conducted and circular markers 1770 denote where bimodality is observed experimentally. A horizontal line 1775 denotes an intrinsic amplitude of the background noise and the Hopf point 1780 can be predicted where the horizontal line intersects with a high Re boundary of the bimodal regime 1755.

As mentioned above, a main motivation for SI in accordance with the methods and frameworks of the present embodiments is to be able to predict dynamic bifurcations (i.e., the Hopf and saddle-node points) and, hence, the stability boundaries of the system as well as stochastic P-bifurcations (i.e., when the system switches from unimodal to bimodal behavior). The dynamic bifurcation plots are generated by solving Equation 13a without the effect of noise, whereas the stochastic bifurcation plots are generated by finding solutions of Equation 20 that have two positive $a_m^2$.

The dynamic bifurcation plots 1600, 1700 show that, without noise (d=0), the numerically predicted Hopf points 1602, 1702 and saddle-node points 1604, 1704 are, respectively, at Re=606 and 588 for ExpSuper, and at Re=790 and 758 for ExpSub. The model correctly identifies ExpSub to be a subcritical bifurcation but, curiously, it identifies ExpSuper to be a subcritical bifurcation as well, which might seem to contradict the experiments. However, a careful examination of the experimental data in the dynamic bifurcation plot 1600 shows a marked jump in the oscillation amplitude at the bifurcation point 1602. This jump likely occurs because the Hopf point 1602 and the saddle-node point 1604 have either collided or moved so close to each other as to be indistinguishable within the limits of experimental uncertainty. This interpretation of supercritical-like behavior can also explain previous observations of a similar amplitude jump in previous low-density jet experiments. Moreover, the presence of background noise shrinks the hysteretic bistable region by triggering LCOs.

Bimodality is usually associated with subcritical Hopf bifurcations. As shown in the stochastic bifurcation plots 1650, 1750, the bimodality 1655, 1755 exists between the Hopf point and the saddle-node point, even for infinitesimally weak noise. Bimodality represents a tendency of a system to switch between a zero-amplitude state and a LCO state in the bistable regime. In the presence of finite-amplitude noise, this tendency can be observed even before the system reaches the saddle-node point. This is seen in the experiment data 1670, 1770 and is well predicted by the model in accordance with the present embodiments. Background noise, however, can shrink the bimodal region 1655, 1755 by triggering LCOs. In the stochastic bifurcation plots 1650, 1750, this shrinkage can be seen as a tapering of the bimodal regions 1655, 1755 above the intrinsic amplitude of the background noise, b (i.e., the lines 1675, 1775). Therefore, for an accurate comparison between the predicted and experimentally observed bifurcation points, the effect of noise must be accounted for. This is done by locating the points 1680, 1780 at which the lines 1675, 1775 (i.e., b) intersect the bimodal regions 1655, 1755. For ExpSuper (i.e., in the stochastic bifurcation plot 1650), this gives a predicted Hopf point of Re=592, which matches exactly with the experimentally observed value at Re=592 in the bifurcation diagram 1100 (FIG. 11A). As mentioned earlier, the absence of a bistable region can be understood because it is exceedingly small. For ExpSub (i.e., in the stochastic bifurcation plot 1750), the intersection of the line 1775 (i.e., b) and the bimodal region 1775 gives predicted Hopf and saddle-node points of Re=782 and 758, respectively, which also matches well with the experimentally observed values at Re=787 and 757 in the bifurcation diagram 1150 (FIG. 11B).

Figure 18A:
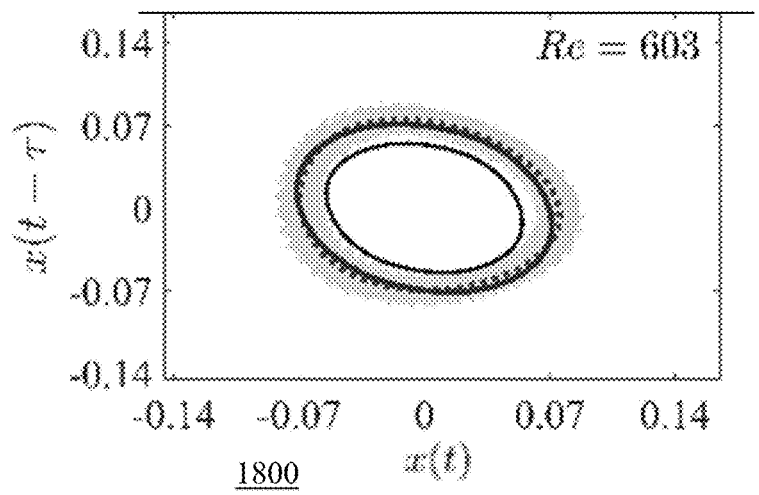
FIG. 18A depicts a phase portrait of limit-cycle oscillations (LCOs) for the ExpSuper data.
Figure 18B:
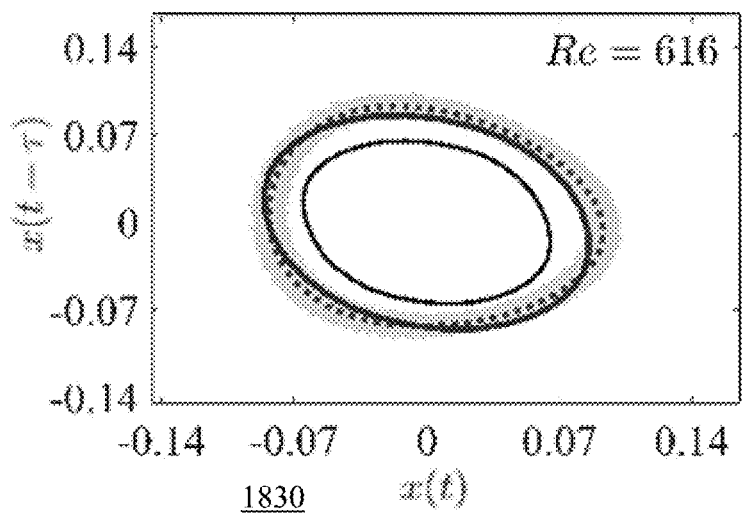
FIG. 18B depicts a phase portrait of limit-cycle oscillations (LCOs) for the ExpSuper data.
Figure 18C:
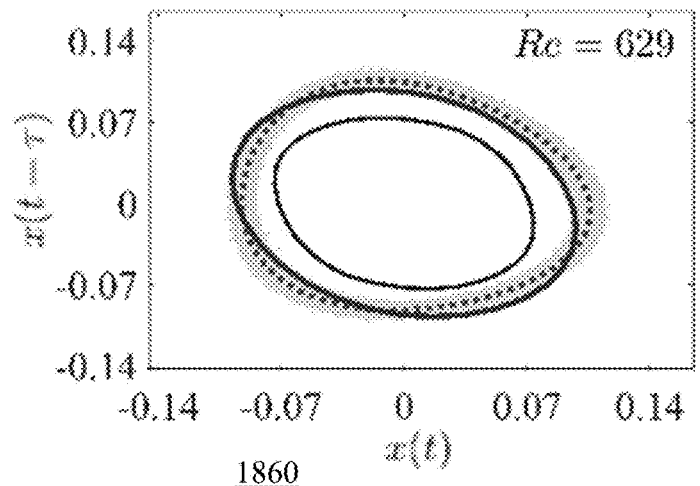
FIG. 18C depicts a phase portrait of limit-cycle oscillations (LCOs) for the ExpSuper data.
Figure 19A:
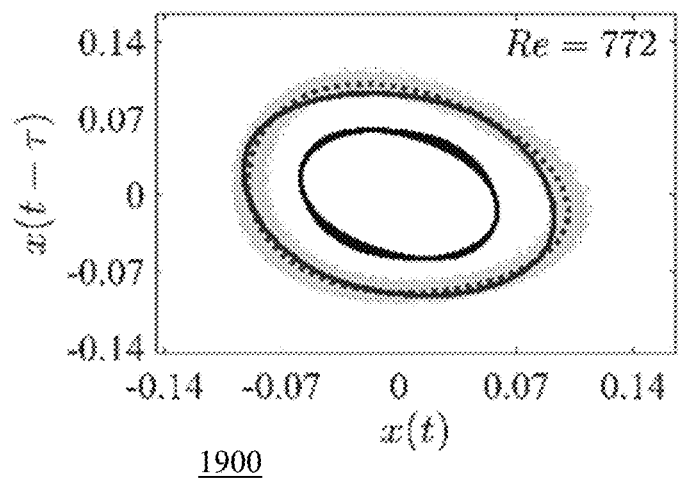
FIG. 19A depicts a phase portrait of limit-cycle oscillations (LCOs) for the ExpSub data.
Figure 19B:
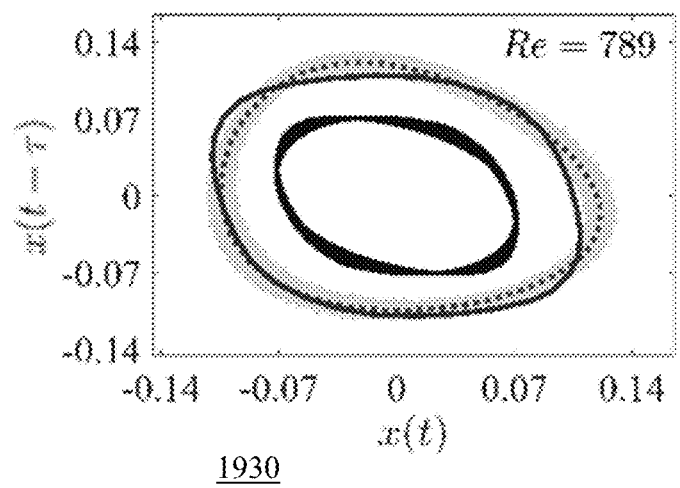
FIG. 19B depicts a phase portrait of limit-cycle oscillations (LCOs) for the ExpSub data.
Figure 19C:
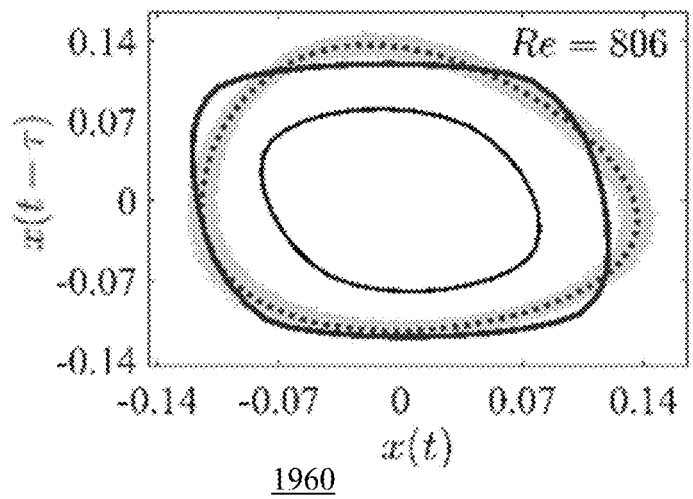
FIG. 19C depicts a phase portrait of limit-cycle oscillations (LCOs) for the ExpSub data.

Next, predicting system dynamics away from the bifurcation points is discussed. The graphs 1800, 1830, 1860 in FIGS. 18A to 18C, respectively, depict phase portraits of the LCOs for ExpSuper at Re=603, 616 and 629. The graphs 1900, 1930, 1960 in FIGS. 19A to 19C, respectively, depict phase portraits of the LCOs for ExpSub at Re=772, 789 and 806. These are compared with the corresponding LCOs from the experiments It has been shown that the dynamical properties of a system containing many degrees of freedom can be represented by just a single scalar time series with an appropriately chosen time delay ($\tau$). In the graphs 1800, 1830, 1860, 1900, 1930, 1960 the phase portraits are shown in two dimensions with $\tau$ calculated using a conventional average mutual information method. The comparison between the experimental and numerical LCOs shows that the N9 model can accurately predict both the amplitude and shape of the LCO orbits. This further highlights the important role that the higher-order nonlinear terms have in determining the system dynamics.

As can be seen from the discussion above, SI of a low-density jet can be performed in accordance with the methods and frameworks of the present embodiments from its noise-induced dynamics, using a low-order oscillator model and its corresponding Fokker-Planck equation. It can be seen that methods and frameworks in accordance with the present embodiments advantageously pioneers achieving SI on an experimental system using noise-induced dynamics in only the unconditionally stable regime, i.e. without having to operate in regimes where LCOs may occur. In addition, it has been shown that the estimated numerical model in accordance with the methods and frameworks of the present embodiments can accurately predict three key system properties: (i) the order of nonlinearity, (ii) the locations and types of the bifurcation points (and hence the stability boundaries), and (iii) the limit-cycle dynamics beyond the bifurcation points.

There are two main implications of the present embodiments that go beyond low-density jets. First, the SI methodology proposed hereinabove should be applicable to many other dynamical systems as the only inherent assumption made about the system is that it obeys the Stuart-Landau equation. This assumption is, in fact, valid in the vicinity of the Hopf point for many dynamical systems—hydrodynamic or otherwise. Consequently, the Stuart-Landau equation has been used in a number of other SI methodologies. However, in those SI methodologies, it has been assumed that the nonlinear terms can only be obtained from data collected during the occurrence of LCOs in the unstable or bistable regime. With the methods and frameworks of the present embodiments, however, it has been shown that data from the noise-induced dynamics in the unconditionally stable regime is itself enough to determine the bifurcation points and to predict the LCO dynamics beyond those points. Thus, the SI methodology in accordance with the present embodiments opens up new pathways for the development of early-warning indicators and active-control strategies against unwanted oscillations in systems operating near a Hopf point. This is particularly useful for the design of systems prone to exhibiting dangerously energetic LCOs, such as thermoacoustic oscillations in gas turbines and rocket engines.

Second, the prediction of system nonlinearity—in particular, the order and signs of the nonlinear terms—can provide physical insight into the system. For plane Poiseuille flow, it has been explained that the physical meaning of a positive $k_2$ term is that the distortion of the fundamental instability mode is dominant over the combination of the distortion of the mean motion and the generation of harmonics. While it is beyond the scope of the present embodiments to perform an equivalent analysis for the low-density jet and extend it to the higher-order terms, no attempt to calculate the high-order nonlinear terms, as shown hereinabove in accordance with the methods and frameworks of the present embodiments, has been previously reported.

It also appears that the assumption that the background noise amplitude is small can be relaxed. In many natural and engineered systems, background noise can be significant, making the development of an actuator model difficult. An instinctive solution is to turn to output-only SI methods, but these are usually only reliable when the input data size is large. This problem can be alleviated through the use of adjoint equations. Furthermore, in the simple axisymmetric jet discussed hereinabove, useful information has only been collected at one spatial location. While this keeps the system size small without adversely affecting the quality of the predictions for the bifurcation points and LCO dynamics, there could be other, more complicated flows for which it is useful to include information about the spatial structure of the global instability mode. In such cases, the use of sparsity-promoting tools and machine learning may be incorporated in this SI framework to deal with the larger data matrices.

Case Study 2: Input-Output SI of a Laminar Thermoacoustic System

Low-NOx gas turbines (i.e., gas turbines with reduced emission of nitrogen oxides such as nitric oxide and nitrogen dioxide) are routinely used to generate electricity and propel aircraft, but they suffer from combustion instabilities. These are violent pressure oscillations that exacerbate noise and pollutant emissions, contributing to global warming and health problems, and costing the power industry more than US$1 billion per year in remedial programs. The implementation of the system identification (SI) strategy in accordance with the methods and frameworks of the present embodiments advantageously lessens the damage caused by thermoacoustic oscillations to the combustor hardware and beneficially facilitates the development of cleaner low-NOx gas turbines, improving public health and helping to fight climate change. In addition to gas turbines, bridges and buildings also suffer from similar instabilties and the methods and frameworks in accordance with the present embodiments work on these systems as well as a variety of other nonlinear dynamics systems.

In accordance with an aspect of the present embodiments, input-output system identification is demonstrated on a prototypical thermoacoustic oscillator (in this case study, a flame-driven Rijke tube) undergoing a supercritical Hopf bifurcation. The methods and frameworks in accordance with the present embodiments can accurately predict the properties of Hopf bifurcation and the limit cycle oscillations beyond bifurcation using only pre-bifurcation data. This case study constitutes experimental demonstration of system identification on a reacting flow using only pre-bifurcation data, advantageously revealing new pathways for development of early warning indicators for nonlinear dynamical systems near a Hopf bifurcation.

Thermoacoustic instability continues to hamper the development of combustion devices such as gas turbines and rocket engines. The underlying cause of this instability is the positive feedback between the heat-release-rate (HRR) oscillations of an unsteady flame and the pressure oscillations of its surrounding combustor. If the HRR oscillations are sufficiently in phase with the pressure oscillations, the former can transfer energy to the latter via a Rayleigh mechanism, leading to self-sustained flow oscillations at one or more of the natural acoustic modes of the system. If severe, such thermoacoustic oscillations can exacerbate vibration, mechanical fatigue, and thermal loading, reducing the reliability of the overall system. This problem is especially concerning in modern gas turbines because the conditions under which such devices must operate to achieve low pollutant emissions are also those that provoke thermoacoustic instability.

Like other self-sustained oscillations, thermoacoustic oscillations often arise via a Hopf bifurcation, making them amenable to a weakly nonlinear analysis near the Hopf point. Such an analysis can be performed with the normal-form equation for a Hopf bifurcation, which, in fluid mechanics, is known as the Stuart-Landau equation:

$$\frac{da}{dt} = k_1 a + k_2 a^3 + \ldots, \tag{32}$$

where a is the complex mode amplitude, $k_1$ is the linear driving/damping coefficient, $k_2$ is a nonlinear coefficient, and t is time. A Hopf bifurcation occurs at $k_1=0$. The Stuart-Landau equation can capture the amplitude evolution of a system near the Hopf point where the growth rate, which controls the amplitude evolution, is still much smaller than the oscillation frequency. Weakly nonlinear analyses based on the Stuart-Landau equation have been used to study hydrodynamic systems and thermoacoustic systems. In this second case study, a weakly nonlinear analysis of a Rijke tube is examined to show that the methods and frameworks in accordance with the present embodiments can reduce the computational cost of investigating oscillatory phenomena near the Hopf bifurcation.

Thermoacoustic systems often exhibit combustion noise, which can arise from direct sources such as the HRR fluctuations of an unsteady flame and from indirect sources such as the acceleration of entropy or vortical inhomogeneities through a nozzle. Conventional research on noise-induced dynamics of thermoacoustic systems has focused primarily on two objectives: (i) to investigate the dynamical effect of noise, such as how it shifts the stability boundaries and how it triggers limit-cycle oscillations in the bistable regime, and (ii) to gather information about the system from its noise-induced dynamics. Such information can then be used to predict the onset of instability, to distinguish between supercritical and subcritical bifurcations, and to extract deterministic quantities.

The noise-induced dynamics of a system can be determined by measuring its response to extrinsic or intrinsic perturbations. In the early years of rocket development, extrinsic perturbations in the form of bomb detonations were used in combustors to determine their stochastic properties and stability boundaries. In recent years, such noise-induced dynamics has been used to forecast the onset of thermoacoustic instability. For example, extrinsic perturbations have been applied to a thermoacoustic system to find its degree of coherence peaks at an intermediate noise amplitude—a phenomenon called coherence resonance. Such dynamics could be a precursor to a Hopf bifurcation. Other metrics capable of forecasting the onset of thermoacoustic instability include the Hurst exponent, ordinal partition transition networks, the phase parameter, sequential horizontal-visibilitygraph motifs, and the autocorrelation function and variance. All of these metrics, however require post-bifurcation behavior and data to predict the properties (e.g., type and location) of a Hopf bifurcation and the resultant limit cycle. In this case study, it is demonstrated that methods and frameworks in accordance with the present embodiments enable prediction of the properties of a Hopf bifurcation and the resultant limit cycle using only pre-bifurcation data and without the need to set ad-hoc instability thresholds.

As discussed previously, system identification (SI) refers to the use of statistical methods to construct mathematical models of dynamical systems from input and/or output data and can be performed as data-driven SI or model-based SI. In data-driven SI, a priori knowledge of the system physics is not required. Instead, a model of the system is found solely from data using techniques such as symbolic regression and machine learning. Data-driven SI is useful when abundant data is available, either from experiments or simulations. However, in practical systems, it is often difficult and costly to acquire sufficient data. In such cases, it may be more efficient to use model-based SI, in which a low-dimensional model is assumed or developed for a system using information about its physics, and then the coefficients of the model are determined from data (e.g., in accordance with the flowchart 600 (FIG. 6)).

In thermoacoustics, most studies relying on the noise-induced dynamics for SI have used a model-based approach. For example, a self-sustained oscillator equation perturbed by additive noise has been used to model the dynamics of a gas-turbine combustor perturbed by its own turbulence. Specifically, stochastic differential equations, based on Fokker-Planck formalism, have been used to extract deterministic quantities from noise-perturbed data. The accuracy of this SI method can be improved by incorporating adjoint-based optimization. In addition, an intrinsic noise source, namely turbulence, was used to extract the system coefficients. This output-only approach is convenient in that like most SI methods, it requires at least some data from the limit-cycle branch.

By contrast, an input-output SI framework has been proposed in which extrinsic noise is fed into the system to enable prediction of its bifurcation properties and limit-cycle amplitudes using data from only the fixed-point branch before the Hopf point itself. This proposed input-output SI framework, however, has only been demonstrated on a simple hydrodynamic system, a low-density jet, which has none of the complexities of a thermoacoustic system such as nonlinear coupling between HRR oscillations and sound waves.

In this case study, the methods and frameworks in accordance with the present embodiments are applied to a prototypical thermoacoustic system, a flame-driven Rijke tube, undergoing a supercritical Hopf bifurcation and are proven to enable accurate prediction of the properties of the Hopf bifurcation and the limit cycle beyond it using nothing more than the noise-perturbed data on the fixed-point branch prior to the Hopf point itself. Crucially, unlike most other forecasting methods, the methods and frameworks in accordance with the present embodiments do not require empirical instability thresholds to be set ad hoc, implying that these novel methods and frameworks can advantageously give objective predictions for a variety of nonlinear dynamical systems.

Figure 20:
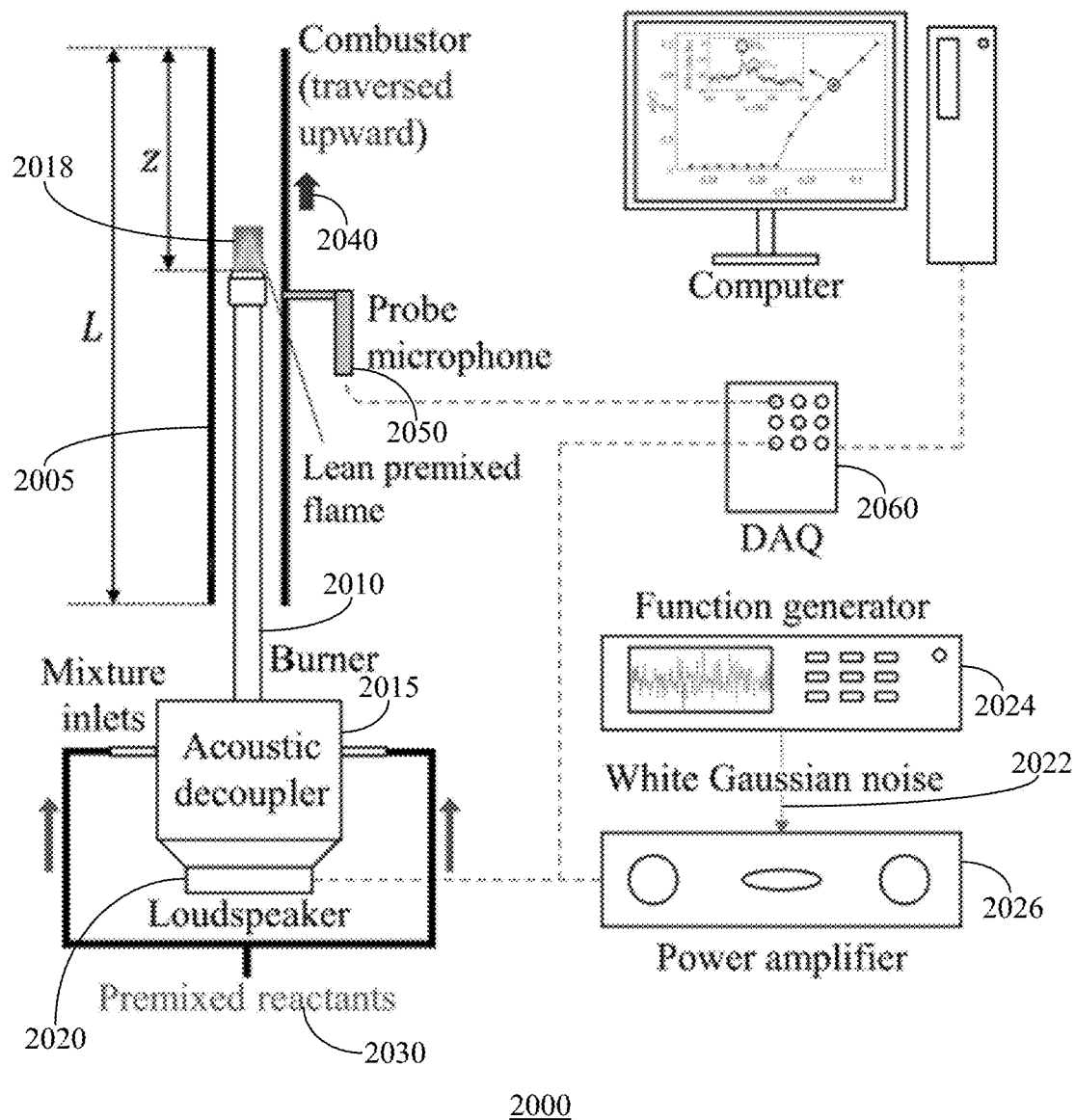
FIG. 20 depicts a schematic illustration of a second experimental setup of a prototypical thermoacoustic system, i.e., a flame-driven Rijke tube, perturbed by extrinsic noise from a loudspeaker for examination of SI in accordance with the present embodiments.

Referring to FIG. 20, a schematic illustration 2000 depicts a prototypical thermoacoustic system perturbed by extrinsic noise from a loudspeaker for examination of SI in accordance with the present embodiments. The thermoacoustic system depicted in the illustration 2000 consists of a vertical tube combustor 2005 containing a laminar conical premixed flame. This system including the vertical tube combustor 2005, which is also known as a flame-driven Rijke tube, can exhibit a variety of nonlinear states and bifurcations, making it an ideal platform for studying thermoacoustic phenomena. The system features a stainless-steel tube burner 2010, the vertical tube combustor 2005, which is a double-open-ended quartz tube combustor, (ID=44 mm; length, L=860 mm) and an acoustic decoupler 2015. In accordance with the demonstrated system, the burner 2010 has an inner diameter of 16.8 mm and a length of 800 mm, the tube combustor 2005 which has an inner diameter of 44 mm and a length (L) of 860 mm, and the acoustic decoupler 2015 has an inner diameter of 180 mm and a length of 200 mm. The flame is stabilized on a copper extension tip 2018 having an inner diameter of 12 mm, a length of 30 mm and ID mounted at the burner outlet. Extrinsic perturbations are applied to the system via a loudspeaker 2020 (a FaitalPRO 6FE100 loudspeaker manufactured by Faital S.p.A. of Milan, Italy) mounted in the acoustic decoupler 2015. The loudspeaker 2020 is driven by a white Gaussian noise signal 2022 from a function generator 2024 (a Keysight 33512B function generator manufactured by Keysight Technologies of California, USA) via a power amplifier 2026 (an Alesis RA150 power amplifier manufactured by Alesis of Rhode Island, USA).

The fuel 2030 used for the flame is liquefied petroleum gas (70% butane, 30% propane). The fuel flow rate is controlled with a rotameter (±2.5%) (not shown), and the air flow rate is controlled with a mass flow controller (an Alicat MCR mass flow controller (±0.2%) manufactured by Alicat Scientific of Arizona, USA) (not shown). In this case study, the system is operated at an equivalence ratio of 0.62 (±3.2%), a bulk reactant velocity of $\bar{u}$=1.6 m/s (±0.2%), and a Reynolds number of Re=1300 (±1.7%) based on $\bar{u}$ and D.

To induce a Hopf bifurcation, the combustor 2005 is traversed upward relative to the stationary burner 2010 as shown by arrow 2040. The non-dimensional flame position (z/L) is defined as the distance (z) from the top of the combustor 2005 to the burner extension tip 2018 normalized by the combustor length (L). To determine the state of the system, the acoustic pressure fluctuation (p') is used, which is measured with a probe microphone 2050 (a GRAS 40SA microphone having ±2.5×10$^{-5}$ Pa sensitivity and manufactured by GRAS Sound and Vibration A/S of Holte, Denmark) mounted 387 mm from the bottom of the combustor 2005. For each test run, eight-second long time traces of p' are collected by a data acquisition system (DAQ) 2060 at a sampling frequency of 32768 Hz, which is more than 150 times the frequency of the incipient limit cycle.

Figure 21A:
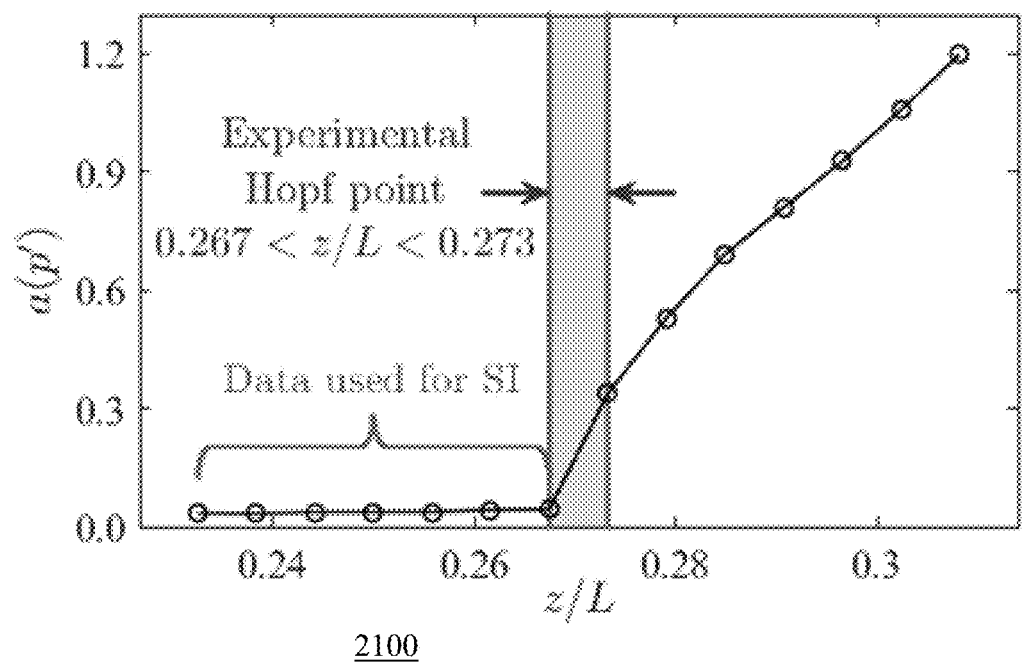
Figure 22:
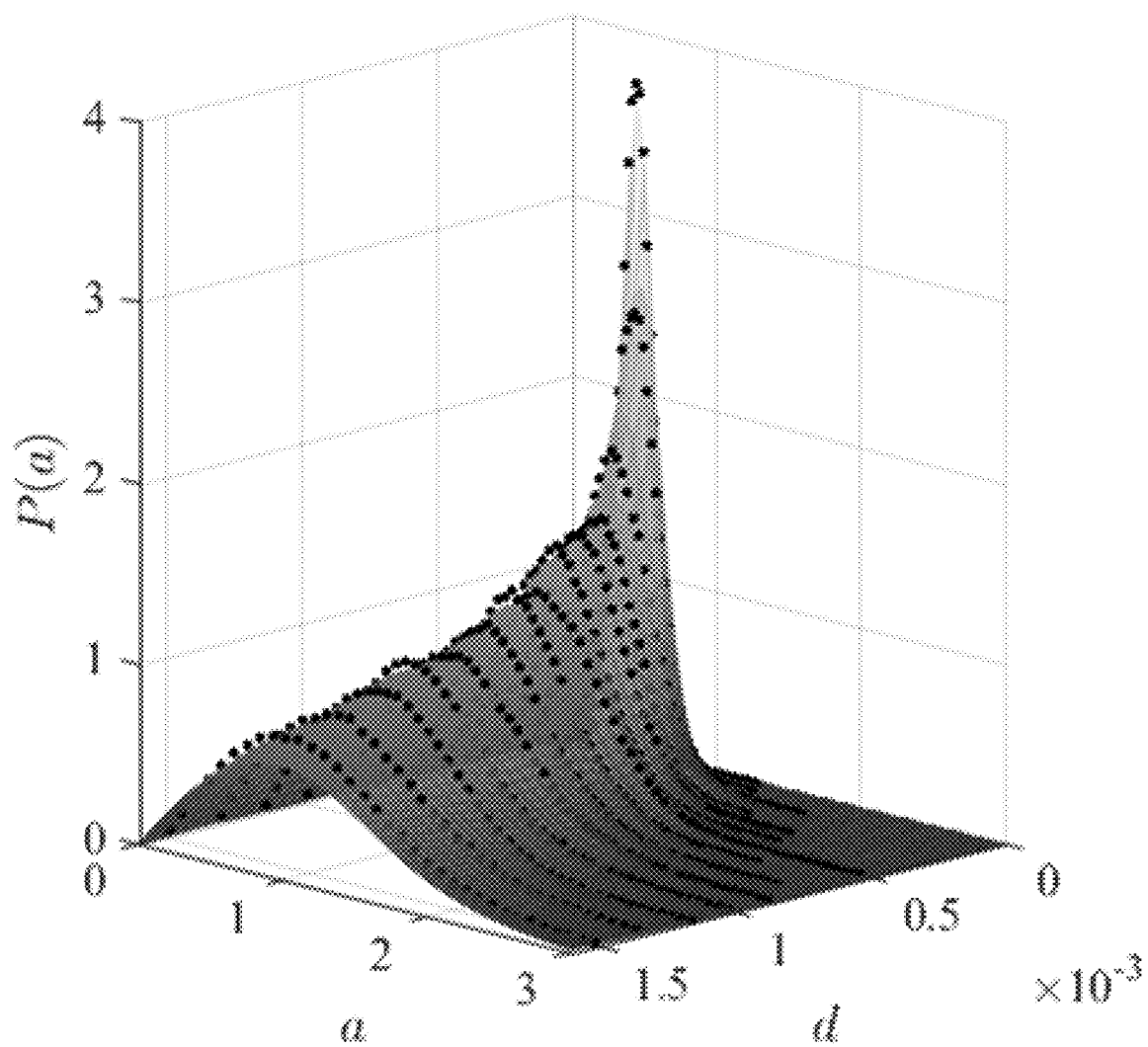
FIG. 22 depicts a three-dimensional graph of an experimental probability density function in accordance with the present embodiments.

A graph 2100 of FIG. 21A depicts a bifurcation diagram of the system, where the horizontal axis 2105 is the normalized flame position (z/L) measured from the top of the combustor 2005. When the flame reaches a position of 0.267<z/L<0.273, the system transitions from a fixed point to a limit cycle via a supercritical Hopf bifurcation. The supercritical nature of the bifurcation is confirmed by examining the probability density function P(a). If P(a) shows two local maxima with respect to a at intermediate noise amplitudes d (a feature called bimodality), then the system is undergoing a subcritical Hopf bifurcation. However, if P(a) is unimodal, exhibiting only one peak at every value of d, then the system is undergoing a supercritical Hopf bifurcation. Referring to FIG. 22, a three-dimensional graph 2200 of an experimental probability density function P(a) (black dots) and its surface interpolation on the fixed-point branch (z/L=0.267) just before the Hopf point shows that there is only one peak for every value of d (i.e., for all the noise amplitudes tested, P(a) is unimodal), confirming that the Hopf bifurcation is indeed supercritical.

Figure 21B:
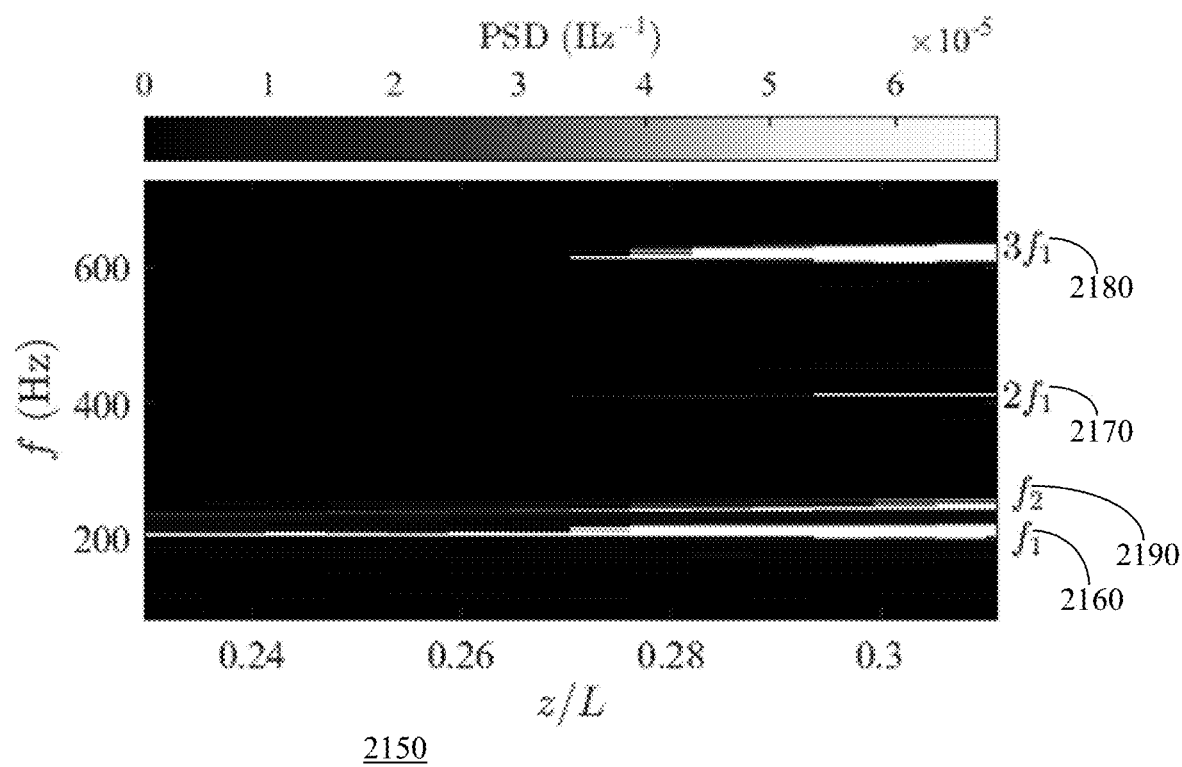

Referring to FIG. 21B, an illustration 2150 depicts a power spectral density (PSD) as a function of the flame position (z/L) in accordance with the present embodiments. Before the Hopf point (z/L<0.267), the PSD contains mostly broadband noise, with slight increases around 200-250 Hz due to incipient modes. Just after the Hopf point (0.273<z/L<0.285), the PSD is dominated by sharp peaks of a primary mode at $f_1$=208 Hz and its higher harmonics 2160, 2170, 2180, indicating a limit cycle. Accompanying this primary mode is a weaker secondary mode 2190 at $f_2$=243 Hz. The secondary mode 2190 is more than a hundred times weaker than the primary mode, so the system dynamics is still dominated by the limit cycle at $f_1$. Further from the Hopf point (z/L>0.285), the secondary mode ($f_2$) 2190 remains relatively unchanged, but the primary mode ($f_1$) 2160 and its higher harmonics ($2f_1$ and $3f_1$) 2170, 2180 continue to grow. This is particularly true for the third harmonic ($3f_1$) 2180, which grows to nearly the same amplitude as the fundamental itself ($f_1$) 2160. The growth of these higher harmonics has a significant influence on the limit-cycle amplitude as discussed hereinbelow.

The thermoacoustic system is modeled with a high-order Duffing-van der Pol (DVDP) oscillator perturbed by additive white Gaussian noise:

$$\ddot{x}-(\varepsilon+\alpha_1 x^2+\alpha_2 x^4+\alpha_3 x^6+\ldots)\dot{x}+x++\beta x^3=\sqrt{2d}\eta(t), \quad (33)$$

where x represents the pressure fluctuation in the combustor (p' in units of Pa).

Figure 23A:
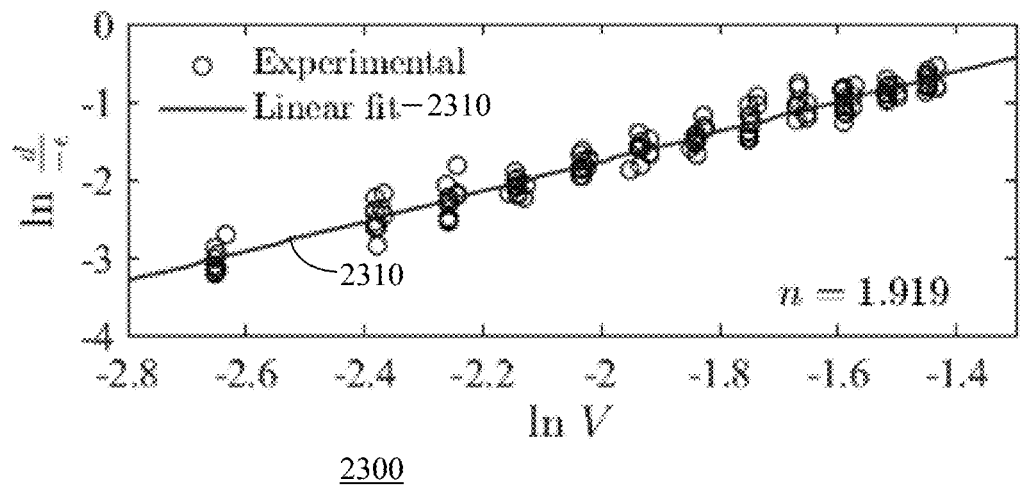
Figure 23B:
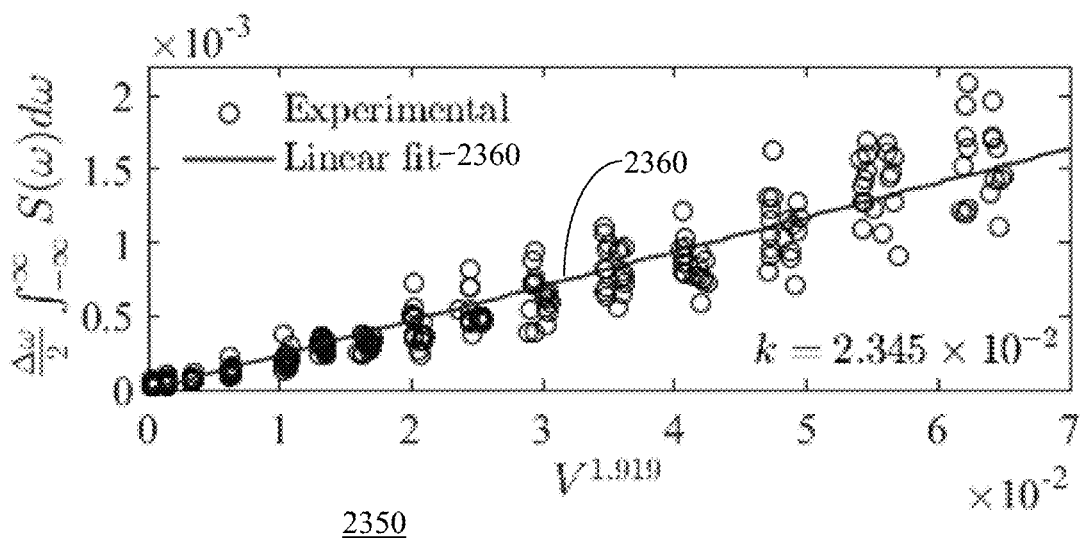
Figure 24:
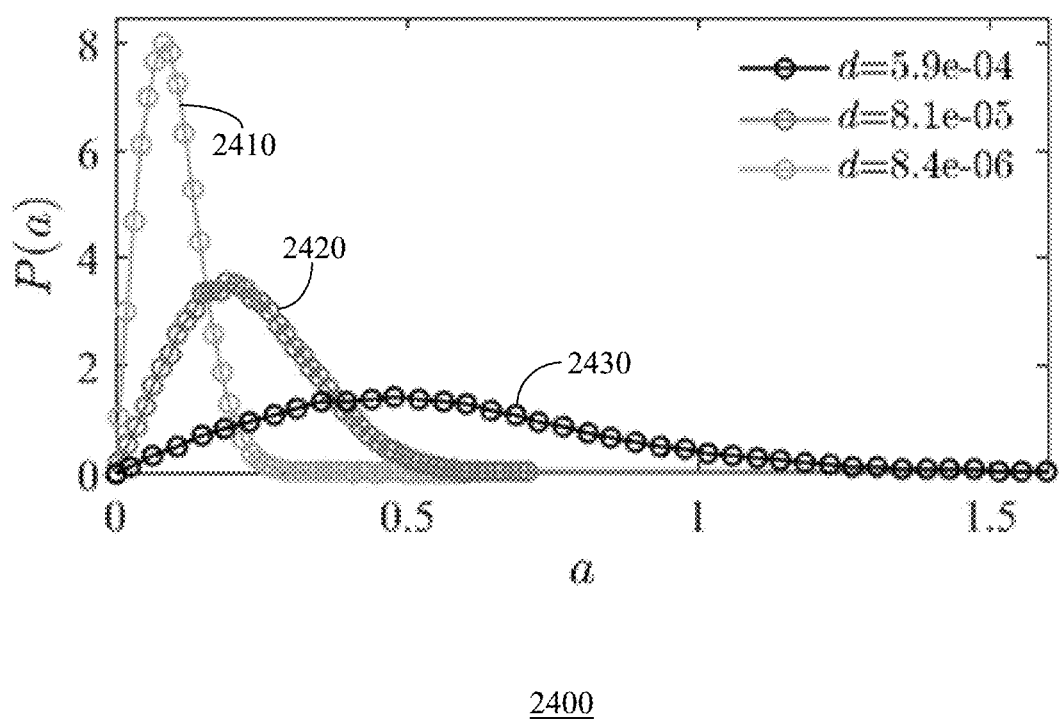
FIG. 24 depicts a graph of a probability density function of the pressure fluctuation amplitude for the system of FIG. 20 on a fixed-point branch for three different noise amplitudes (d) in accordance with the present embodiments.

Using the actuator model, $d=b+kV^n$, discussed above, the relationship $d=(2.345\times10^{-2}) V^{1.919}$ is derived. Referring to FIGS. 23A and 23B, graphs 2300, 2350 depict experimental data. The actuator model coefficients are derived by linear fits of the data where actuator model coefficient n is the gradient of the linear fit 2310 of the graph 2300 and actuator model coefficient k is the gradient of the linear fit 2360 of the graph 2350. Background noise amplitude (b) is negligible as evidenced by the zero vertical intercept of the data in the graph 2350 and, thus, is consistent with the modeling assumptions SI is performed using probability density functions of the pressure fluctuation amplitude on a fixed-point branch (z/L=0.256). Referring to FIG. 24, a graph 2400 depicts a probability density function of the pressure fluctuation amplitude on the fixed-point branch for three different noise amplitudes (d) 2410, 2420, 2430 in accordance with the present embodiments. The order of nonlinearity of the system and the coefficient values are then determined from polynomial regression as discussed hereinabove. At each flame position (z/L), sixteen different noise amplitudes (d) are applied, with three replications performed at each d. The system coefficients at each z/L are then found by averaging the results across all values of d.

Figure 25A:
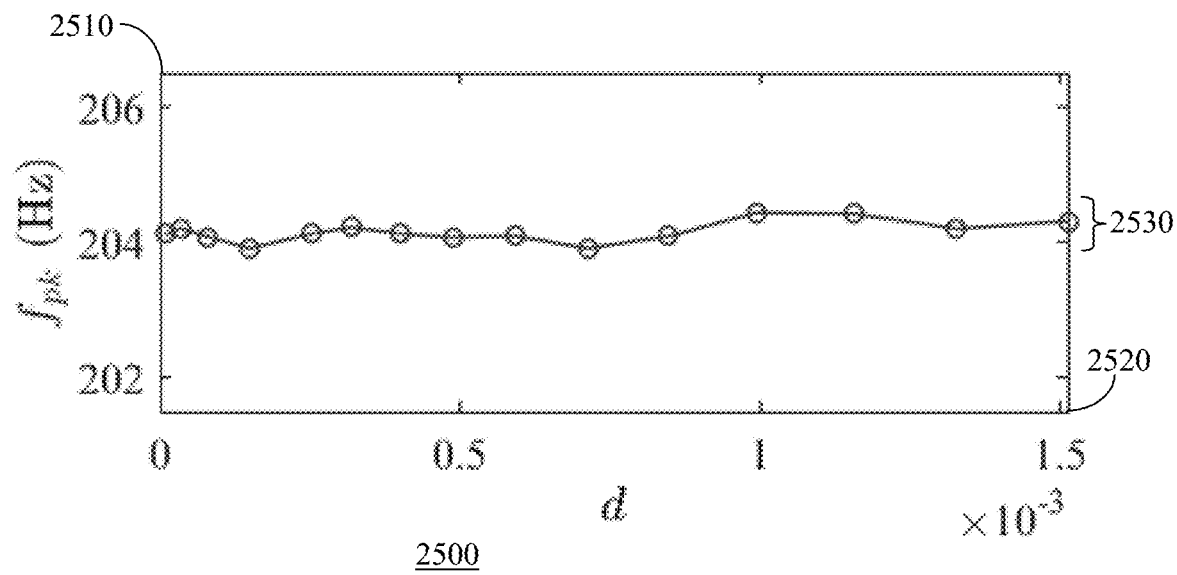
Figure 25B:
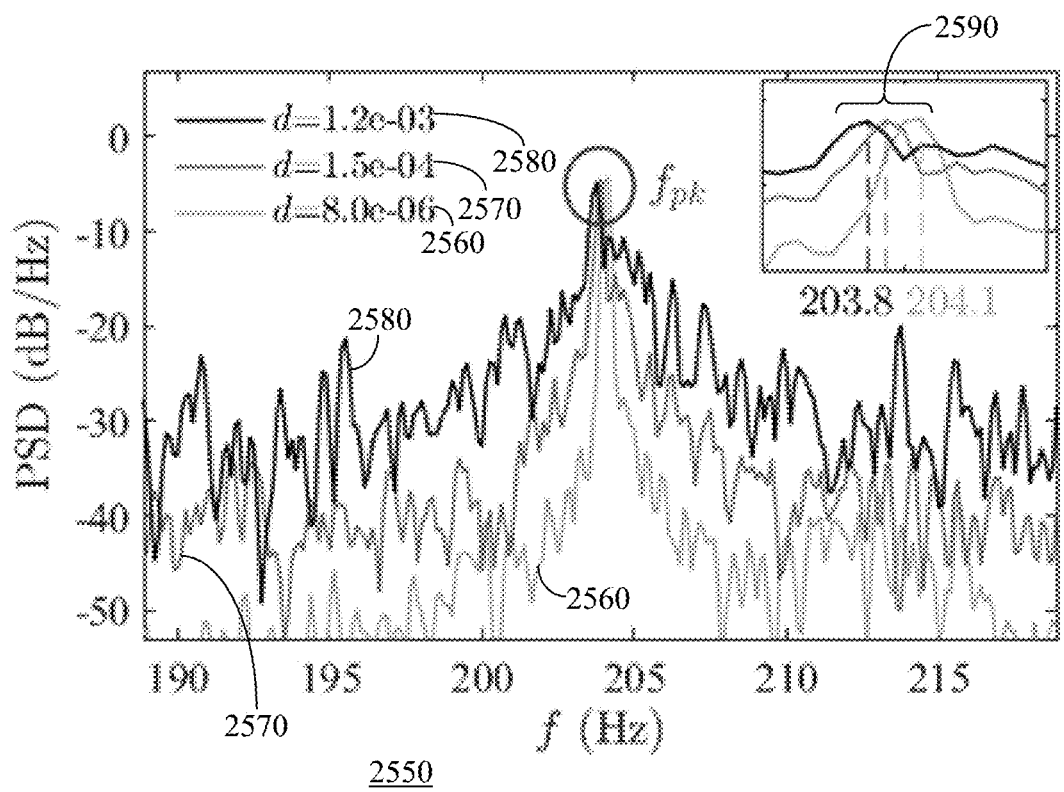
Figure 26A:
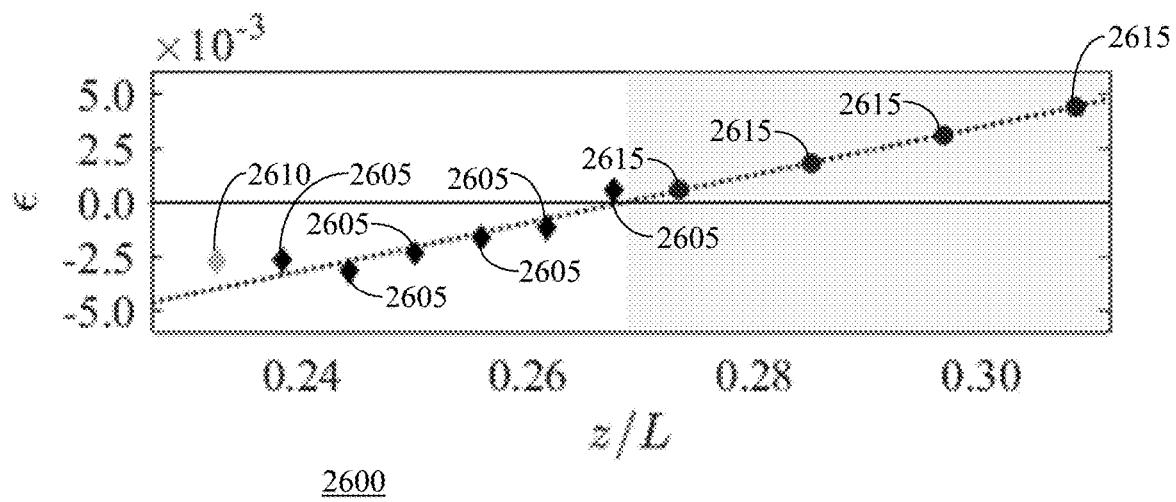
Figure 26B:
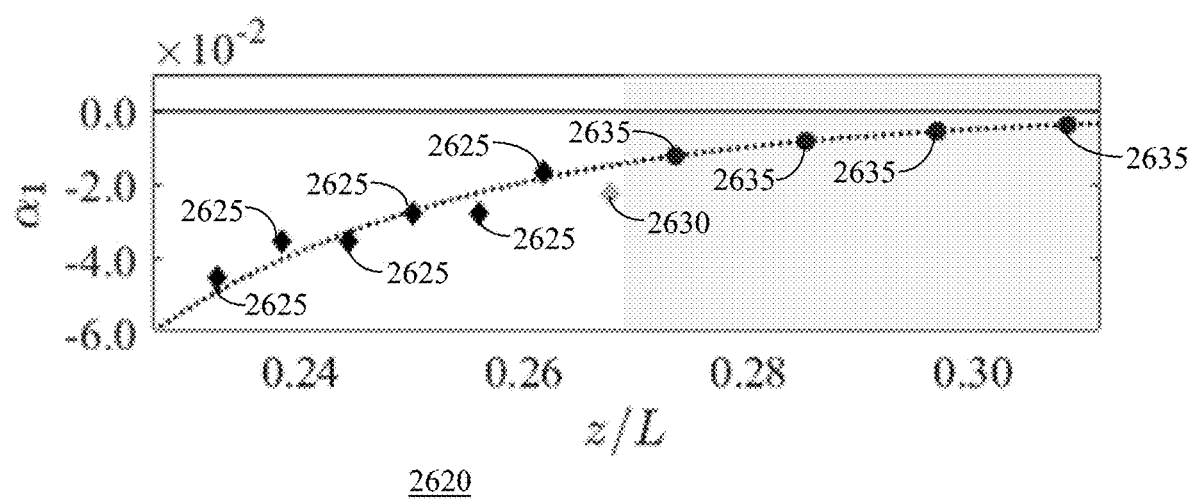
Figure 26C:
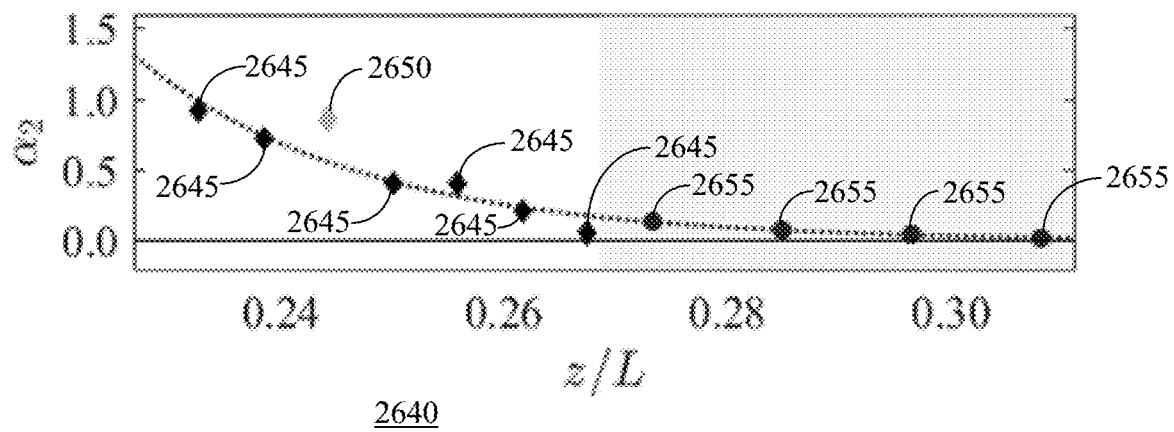
Figure 26D:
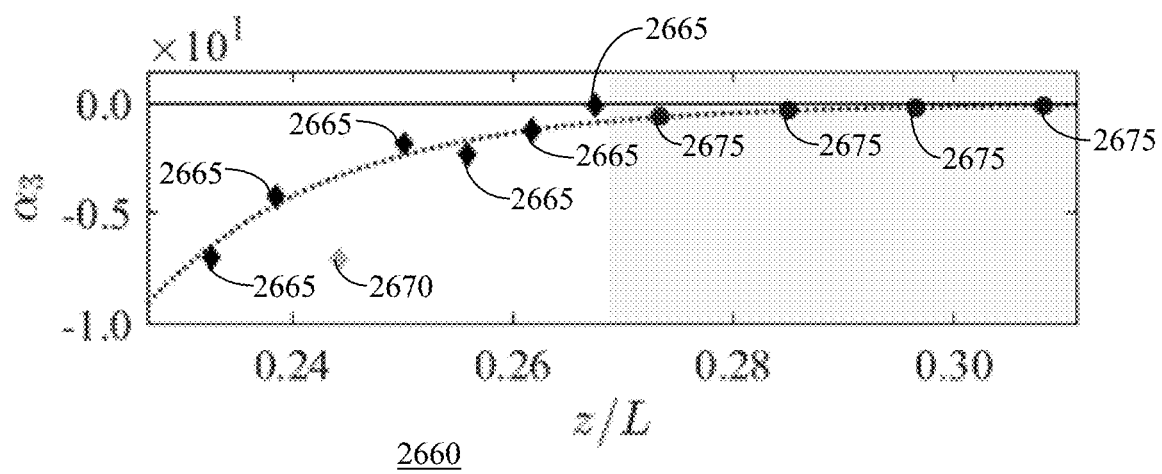

To determine β in Equation 33, anisochronicity of the experimental system in the frequency domain is analyzed. Graphs 2500, 2550 of FIGS. 25A and 25B depict the anisochronicity where the graph 2500 plots peak frequency 2510 as a function of the noise amplitude d 2520 and the graph 2550 is a power spectral density graph at different values 2560, 2570, 2580 of the noise amplitude d on the fixed-point branch (z/L=0.267), just before the Hopf point. The graphs 2500, 2550 show a dominant frequency ($f_{pk}$) shift 2530 2590 of less than 0.3% as d increases, supporting the assumption of a negligible frequency shift and small β.

Referring to FIGS. 26A to 26D, graphs 2600, 2620, 2640, 2660 depict the DVDP coefficients found via SI in accordance with the present embodiments given that the highest nonlinear term of Equation 33 is $(\alpha_3 x^6)\dot{x}$, and the signs of the nonlinear coefficients ($\alpha_1$, $\alpha_2$, $\alpha_3$) remain unchanged across the entire range of z/L. Extrapolation is performed using data 2605, 2625, 2645, 2665 from only the fixed-point branch after the removal of outliers 2610, 2630, 2650, 2670, the outliers being defined as being outside three standard deviations. The extrapolation is performed with a linear model for the linear coefficient (ε) in the graph 2600 and with a power-law model for the nonlinear coefficients ($\alpha_1$, $\alpha_2$, $\alpha_3$) in the graphs 2620, 2640, 2660. The predicted data 2615, 2635, 2655, 2675 are on the limit-cycle branch whose features are examined in FIGS. 28A, 28B, 28C and 28D hereinbelow.

To predict the Hopf point and the resultant limit cycle using data from only the fixed-point branch, a mathematical relationship is defined between z/L and the system coefficients. In a Hopf bifurcation, the linear coefficient ε is known to be linearly proportional to the control parameter. Therefore, ε is linearly extrapolate from within the fixed-point branch (i.e. from the smallest z/L to the largest z/L with negative ε) to the limit-cycle branch. For the nonlinear coefficients ($\alpha_1$, $\alpha_2$, $\alpha_3$), this process is repeated but with a power law, $\alpha_n \propto (z/L-m_1)^{m_2}$, as described hereinabove. The graphs 2600, 2620, 2640, 2660 show that the absolute values of the nonlinear coefficients ($|\alpha_1|$, $|\alpha_2|$, $|\alpha_3|$) decrease with increasing z/L. In particular, the higher the order of the nonlinear coefficients, the faster the nonlinear coefficients decay, confirming that the system is indeed weakly nonlinear near the Hopf point.

Figure 27:
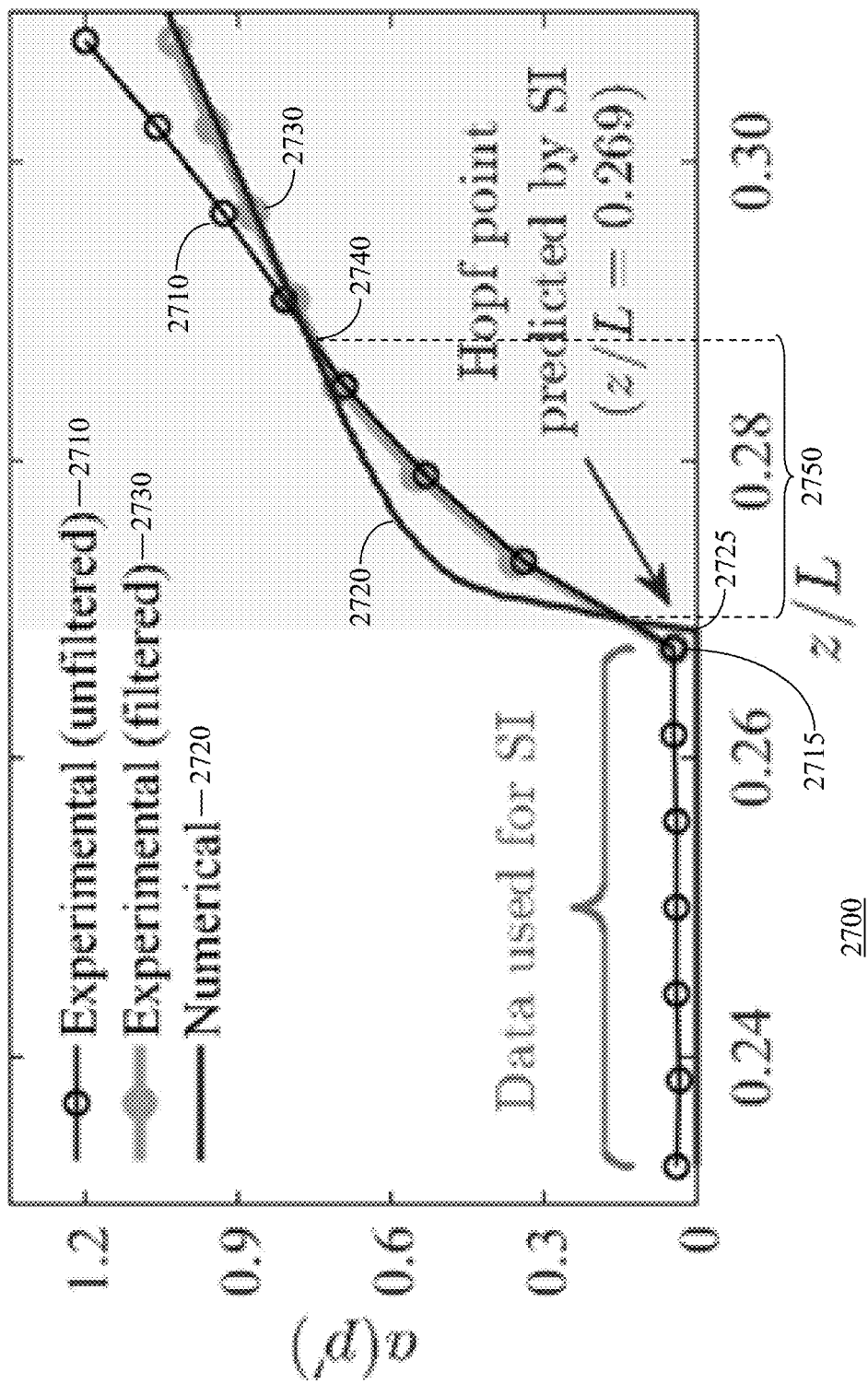
FIG. 27 depicts a graph comparing a bifurcation diagram of experimental data to a bifurcation of the numerical model found via SI in accordance with the present embodiments.
Figure 28A:
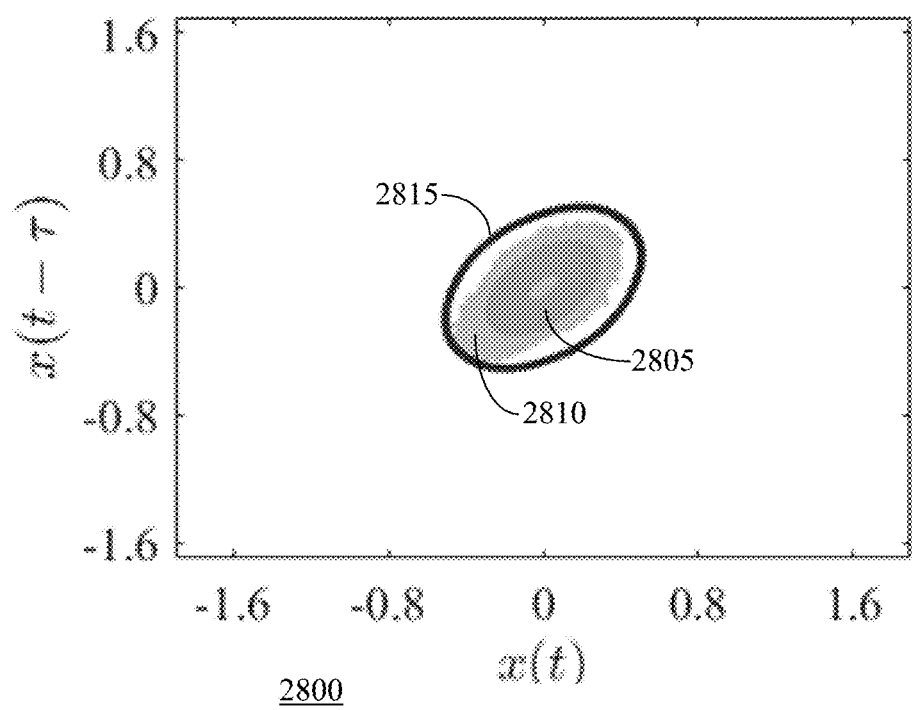
Figure 28B:
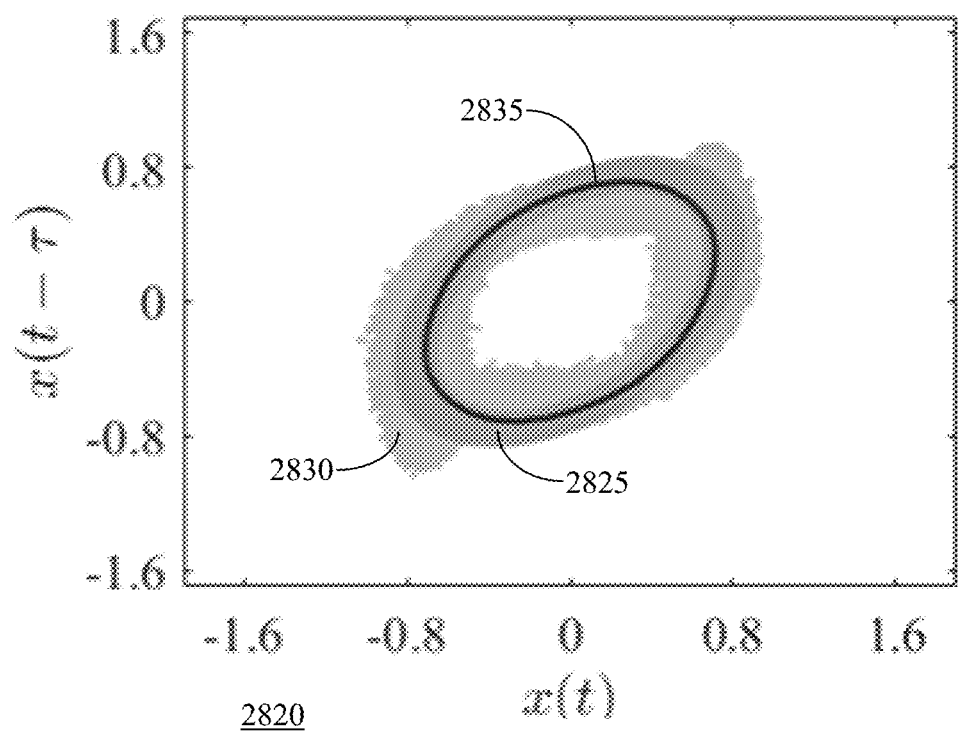
Figure 28C:
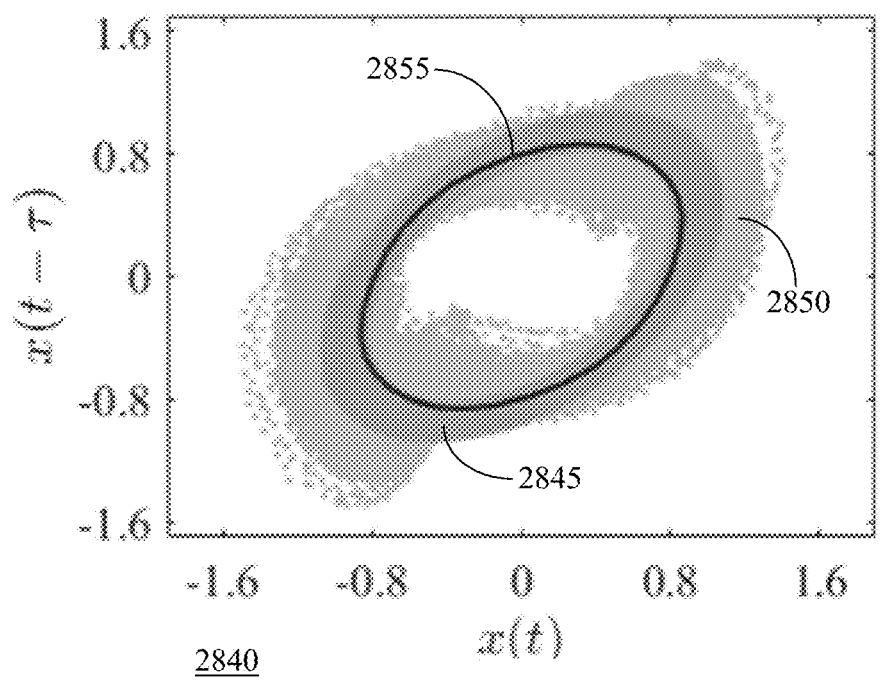
Figure 28D:
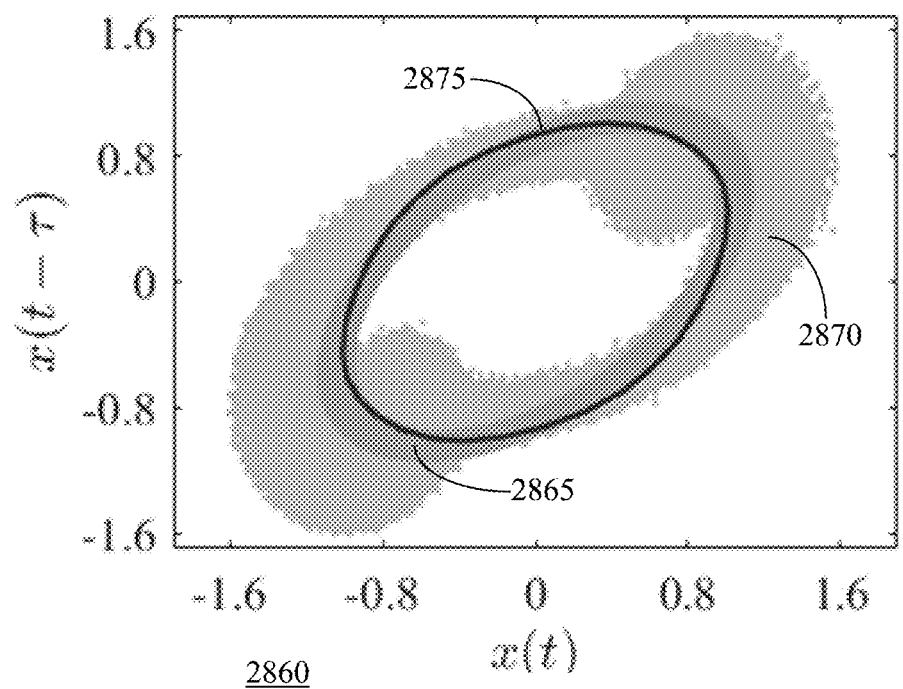

Next, the bifurcation diagram is reconstructed by solving the Stuart-Landau equation with the extrapolated coefficients. FIG. 27 depicts a graph 2700 comparing bifurcation diagrams of the experimental data 2710 to the numerical model 2720 found via SI in accordance with the methods and frameworks of the present embodiments. The numerical model 2720 found via SI predicts that a supercritical Hopf bifurcation 2725 occurs at z/L=0.269, which agrees well with the experimentally observed Hopf point 2715 at 0.267<z/L<0.273. After the Hopf point 2715, 2725, however, the numerical predictions 2720 agree less well with the experimental data 2710. As alluded to earlier, it is speculated that this disagreement is due to the growth of the higher harmonics ($2f_1$ and $3f_1$) with increasing z/L. To test this, the experimental limit-cycle data is bandpass filtered using different filter widths. Improved agreement is found in the filtered results 2730 only when the higher harmonics ($2f_1$ and $3f_1$) are filtered out; no significant difference is found when only the secondary mode ($f_2$) is removed. The improved agreement occurs at a point 2740 (z/L>0.285) far from the Hopf point 2715, 2725, which is consistent with where the harmonics are strongest. The agreement closer to the Hopf point 2715, 2725 than the point (z/L<0.285), however, remains relatively unaffected by the filtering, with the numerical model over-predicting the unfiltered experimental data 2710 and the filtered experimental data 2430. This over-prediction is likely due to nonlinear interactions between the harmonics, which the Stuart-Landau equation cannot capture as it was derived on the basis of weak nonlinearity. In the experiments, there is substantial energy transfer from the fundamental mode ($f_1$) to its higher harmonics ($2f_1$ and $3f_1$). The absence of such energy transfer in the model may explain why it over-predicts the experimental data in the regime 0.273<z/L<0.285 (i.e., the regime 2750). Overall, these findings show that although the presence of strong harmonics affects the limit-cycle predictions, it does not affect the Hopf-point predictions.

Finally, the limit-cycle features of the numerical model are examined using a time-delay embedding technique. This technique enables an attractor to be reconstructed in phase space using just a single scalar time series shifted by an appropriate time delay ($\tau$). A typical choice of z is the first minimum of the average mutual information function. Referring to FIGS. 28A to 28D, graphs 2800, 2820, 2840, 2860 compare phase portraits of experimental data (both unfiltered and bandpass-filtered signals) with phase portraits of the numerical model found via SI in accordance with the method sand frameworks of the present embodiments. The graph 2800 is a comparison of phase portraits between the experimental system and the numerical model found via SI at a position z/L=0.273 on the limit-cycle branch. The graph 2820 is a comparison of phase portraits between the experimental system and the numerical model found via SI at a position z/L=0.285 on the limit-cycle branch. The graph 2840 is a comparison of phase portraits between the experimental system and the numerical model found via SI at a position z/L=0.297 on the limit-cycle branch. The graph 2860 is a comparison of phase portraits between the experimental system and the numerical model found via SI at a position z/L=0.308 on the limit-cycle branch. The experimental data is shown in bandpass-filtered form (blue: $f_1 \pm 10$ Hz) 2805, 2825, 2845, 2865 and in unfiltered form 2810, 2830, 2850, 2870. The numerical data is shown in unfiltered form only 2815, 2835, 2855, 2875.

The Hopf point predicted by the model is at z/L=0.269, which is within the experimentally observed range: 0.267<z/L<0.273. Owing to the presence of higher harmonics ($2f_1$ and $3f_1$), the unfiltered experimental data 2810, 2830, 2850, 2870 is seen to develop ' circular swelling' as z/L increases. The methods and frameworks of the present embodiments, however, cannot predict this feature because it assumes weak nonlinearity and hence weak harmonics. Nevertheless, when the primary mode is isolated via bandpass filtering around its fundamental frequency ($f_1 \pm 10$ Hz) (see the filtered experimental data 2805, 2825, 2835, 2845, the agreement between the experimental data and numerical data improves far from the Hopf point (experimental data 2825, 2845, 2865 vis-à-vis numerical data 2835, 2855, 2875: z/L>0.285), although it remains relatively unchanged close to the Hopf point (experimental data 2805 vis-à-vis numerical data 2815: z/L=0.273). These trends are consistent with the graph 2700 (FIG. 27).

In accordance with the present embodiments, methods and frameworks for performing input-output SI near a Hopf bifurcation using data from only the fixed-point branch prior to the Hopf point itself has been provided. The frameworks and methods model the system with a DVDP-type equation perturbed by additive noise, and identifies the system parameters via the corresponding Fokker-Planck equation. The methods and frameworks have been demonstrated on a prototypical thermoacoustic oscillator (i.e., the flame-driven Rijke tube) undergoing a supercritical Hopf bifurcation. In accordance with the methods and frameworks of the present embodiments, the properties of the Hopf bifurcation—such as its location and its super/subcritical nature—can be accurately predicted even before the onset of limit-cycle oscillations. This establishes that a novel input-output SI has been successfully performed on a reacting flow using only pre-bifurcation data, advantageously paving the way for the development of new and innovative early warning indicators of thermoacoustic instability in combustion devices.

Compared with existing early warning indicators used in thermoacoustics, the SI framework in accordance with the present embodiments has two advantages: (i) it can predict the properties of a Hopf bifurcation without the need to set ad-hoc instability thresholds, and (ii) it can predict post-bifurcation behavior such as limit-cycle amplitudes. Although demonstrated on a thermoacoustic system, this SI framework is easily applicable to other nonlinear dynamical systems as well, provided that they obey the normal-form equation for a Hopf bifurcation (i.e., the Stuart-Landau equation). Examples of such systems include open shear flows, chemical reactions, and optical lasers—among many other systems in nature and engineering.

The SI framework in accordance with the present embodiments has two notable limitations. First, it assumes that the background noise amplitude is low. This assumption may not be valid in turbulent systems, which could complicate the development of an accurate actuator model. Output-only SI methods can offer a way out of this, but they typically require large datasets, which could be difficult to acquire in practical systems. Nevertheless, this problem can be circumvented with the use of adjoint equations.

Second, the SI framework in accordance with the present embodiments makes use of time-series data collected at a single location. This works well for the thermoacoustic system studied in this case study because its temporal dynamics is globally synchronized at every location in the flow domain. Such localized sampling keeps the matrix sizes manageable without compromising the accuracy of the numerical predictions. Other systems, however, may show elaborate spatial variations in their dynamics, requiring data to be sampled at multiple locations. In such a scenario, it may be necessary to use sparsity-promoting techniques and machine learning to process the larger data matrices.

Case Study 3: Output-Only SI of a Turbulent Thermoacoustic System

Self-excited thermoacoustic oscillations continue to hinder the development of lean-premixed gas turbines making the early detection of such oscillations a key priority. In accordance with the methods and frameworks of the present embodiments, output-only system identification of a turbulent lean-premixed combustor is performed near a Hopf bifurcation using the noise-induced dynamics generated by inherent turbulence in the fixed-point regime, prior to the Hopf point itself. The pressure fluctuations in the combustor are modeled with a van der Pol-type equation and its corresponding Stuart-Landau equation. The drift and diffusion terms are extracted from the equivalent Fokker-Planck equation via a transitional probability density function of the pressure amplitude. The extracted terms are then optimized with the adjoint Fokker-Planck equation. Through comparisons with experimental data, it is shown that this approach can enable prediction of (i) the location of the Hopf point, (ii) the order of nonlinearity, and (iii) the limit-cycle amplitude after the Hopf point. It is shown that output-only system identification can be performed on a turbulent combustor using only pre-bifurcation data, opening up new pathways for advantageously developing early warning indicators of thermoacoustic instability in practical combustion systems.

Thermoacoustic instability remains a key challenge in the development and operation of lean-premixed gas turbines. This problem arises from the coupling between the heat-release-rate (HRR) oscillations of an unsteady flame and the pressure oscillations of its combustor. If these two types of oscillations are sufficiently in phase with each other, thermal energy can be transferred from the flame to the pressure field via the Rayleigh mechanism, leading to self-excited flow oscillations at the natural acoustic modes of the system. At high amplitudes, such thermoacoustic oscillations can impair flame stability and increase thermal stresses. Thus, it is important to be able to forecast the onset of such thermoacoustic oscillations so that preventative measures can be taken.

Thermoacoustic oscillations often arise via a Hopf bifurcation. When a control parameter reaches the Hopf point, a fixed-point solution becomes unstable as a complex conjugate pair of eigenvalues crosses the imaginary axis, causing a transition from a fixed point to a limit cycle. If the limit cycle appears only after the Hopf point, the Hopf bifurcation is supercritical. If the limit cycle appears in a hysteric bistable regime between the Hopf and saddle-node points the Hopf bifurcation is subcritical. The super/subcritical nature of a Hopf bifurcation is determined by the degree of nonlinearity present in the system. To avoid detrimental effects of thermoacoustic instability, it is important to predict not just the location of the Hopf point but also the degree of nonlinearity. A technique to predict the location of the Hopf point and the degree of nonlinearity is demonstrated herein that, in accordance with the methods and frameworks of the present embodiments, exploits the noise-induced dynamics generated by inherent turbulence in the fixed-point regime prior to the Hopf point itself.

In the development of early warning indicators of thermoacoustic instability, initially extrinsic perturbations were applied to rockets and gas turbines to quantify their stability margins. Later, it was shown that the intrinsic dynamics of combustion noise contains sufficient information for an instability precursor, namely the damping rate computed from the autocorrelation function. This approach was then extended to the frequency domain, obtaining precursors for multi-mode oscillations. Additional precursors of thermoacoustic instability have since been proposed such as the Hurst exponent and recurrence quantification measures and then permutation entropy and ordinal partition transition networks. Most precursors, however, require ad-hoc instability thresholds to be defined, typically from experimental data in both the fixed-point and limit-cycle regimes. Moreover, although such precursors can predict the Hopf point, they usually cannot predict the limit-cycle dynamics after the Hopf point. In accordance with the methods and frameworks of the present embodiments, a feature known as coherence resonance, which is universal to all nonlinear dynamical systems near a Hopf bifurcation and which causes the noise-induced response to become more coherent as the Hopf point is approached, is exploited. The coherence resonance is used to predict the properties of a Hopf bifurcation and the resultant limit cycle, without the need for ad-hoc instability thresholds.

As discussed hereinabove, system identification (SI) involves using statistical tools to build mathematical models of dynamical systems based on observed data. In thermoacoustics, SI has been carried out to identify the flame transfer function, the flame describing function, and the parameters of a low-order oscillator model used to represent the pressure fluctuations in a combustor. In this third case study, the focus is on the last case in which the pressure fluctuations are modeled with one or more harmonic oscillators. Conventionally, stochastic differential equations containing noise terms have been used to model multiple acoustic modes in a combustor. In a similar approach, frequencies and linear growth rates can be identified by curve fitting the pressure spectrum. This approach has been expanded to show that it can predict not only the linear parameters but also the nonlinear parameters of a turbulent combustor by modelling the pressure oscillations as a single acoustic mode represented by a van der Pol (VDP) equation with additive noise. As a result, the linear and nonlinear coefficients can be extracted by analyzing the probability density function (PDF) given by the Fokker-Planck equation. It has been shown that the accuracy of this SI technique can be improved by incorporating adjoint-based optimization. However, these conventional SI techniques require at least some data from the limit-cycle regime to be able to predict the properties of the Hopf bifurcation and the resultant limit cycle.

In accordance with the present embodiments, an SI technique capable of predicting these features using only pre-bifurcation data has been disclosed. In this technique, the VDP coefficients are determined by measuring the stochastic response of the system (e.g., a low-density jet or a flame-driven Rijke tube, as presented above) to extrinsic noise of a known amplitude. By analyzing the relationship between the identified coefficients and the bifurcation parameters, the locations and types of the bifurcation points as well as the limit-cycle dynamics are able to be predicted using only pre-bifurcation data. This input-output SI technique is feasible when the background noise amplitude is low and when extrinsic perturbations can be readily applied, making the technique unsuitable for practical turbulent combustors.

In accordance with the methods and frameworks of an aspect of the present embodiments, output-only SI is performed on a turbulent lean-premixed combustor operating near a supercritical Hopf bifurcation using the noise-induced dynamics generated by inherent turbulence in the fixed-point regime before the Hopf point itself. Thus, the methods and frameworks in accordance with the present embodiments demonstrate a viable technique for predicting the properties of a Hopf bifurcation and, also, advantageously open up new pathways for the development of early warning indicators of thermoacoustic instability in turbulent combustion systems such as gas turbines.

Figure 29:
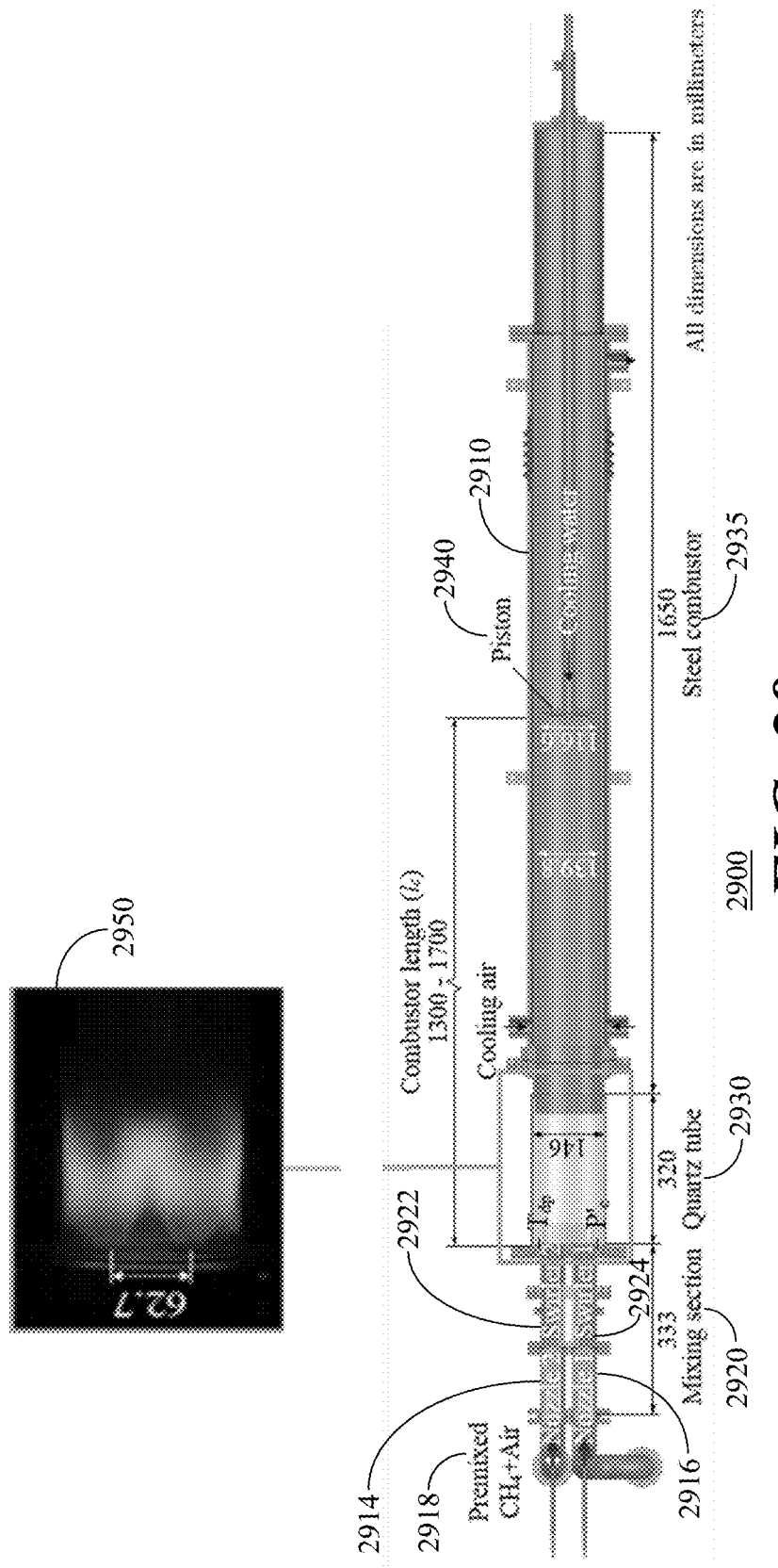
FIG. 29 depicts a cross-sectional view of a third experimental setup of a variable-length combustor for examination of SI in accordance with the present embodiments.

Referring to FIG. 29, a cross-sectional view 2900 depicts a variable-length combustor 2910. The combustor 2910 is equipped with two identical swirling nozzles 2914, 2916 from which fully-premixed reactants 2918 (e.g., methane ($CH_4$)-air) are injected via a mixing section 2920. The mixing section 2920 has an annular geometry defined by a mixing tube having an inner diameter of 38.1 mm, and a center body having an outer diameter of 19.1 mm, both 333 mm long. Axial swirlers 2922, 2924 with six vanes and a swirl number of 0.65 are respectively mounted in each of the two nozzles 2914, 2916, 76.2 mm upstream of a dump plane. The centerline-to-centerline distance between the two nozzles 2914, 2916 is 62.7 mm. The combustor 2910 consists of two sections: an optically accessible quartz tube 2930 (having a length of 320 mm and a diameter of 146 mm) and a steel tube 2935. A length ($l_c$) of the combustor 2910 is varied from 1300 to 1700 mm (in 25 mm steps) via an internal piston 2940.

The air and $CH_4$ flow rates are metered with thermal mass flow controllers: the air is metered at 200 SCFM, ±0.5% with, for example, a Sierra FlatTrak 780S mass flow controller manufactured by Sierra Instruments of California, USA; and the methane is metered at 500 SLM, ±0.6% by, for example, a Teledyne HFM-D-301 mass flow controller manufactured by Teledyne Hastings Instruments of Virginia, USA. The premixed methane-air mixture 2918 has an equivalence ratio of 0.65, an inlet temperature of 200° C., and a bulk velocity of 40 m/s, for a Reynolds number of 44,000. The pressure fluctuation in the combustor 2910 (p') is measured at the dump plane with a piezoelectric transducer such as a PCB 112A22 manufactured by PCB Piezotronics Inc, of New York, USA operating at 14.5 mV/kPa and sampled at 12,000 Hz for ten seconds. A broadband chemiluminescence snapshot 2950 depicts the flame in the combustor 2910.

Figure 30:
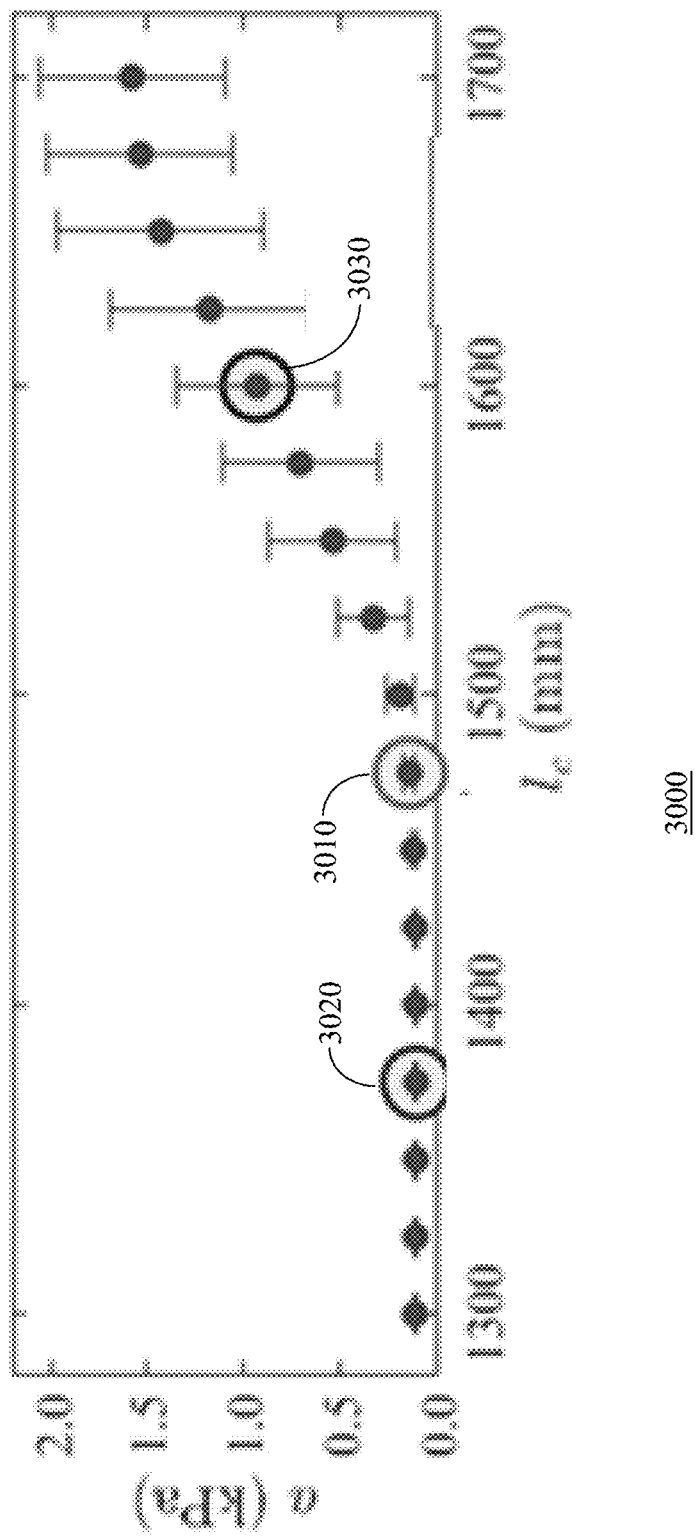
FIG. 30 depicts a bifurcation diagram showing pressure amplitude as a function of combustor length ($l_c$) for the variable-length combustor in accordance with the present embodiments.
Figure 31A:
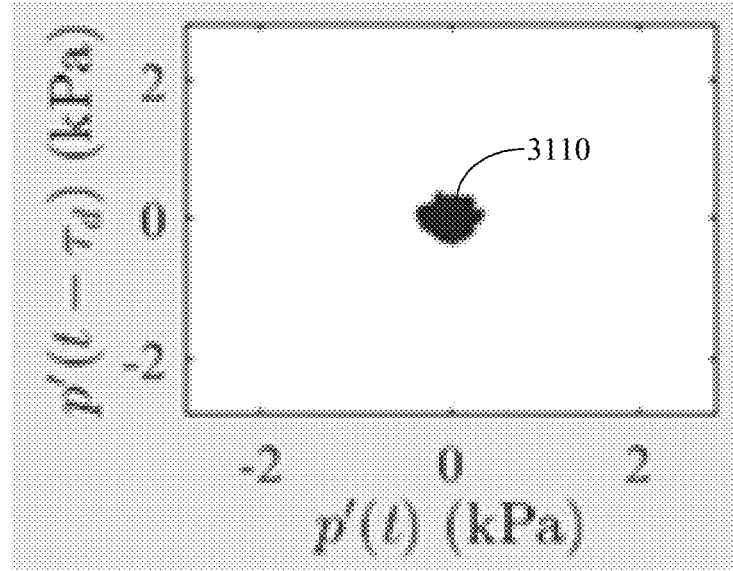
Figure 31B:
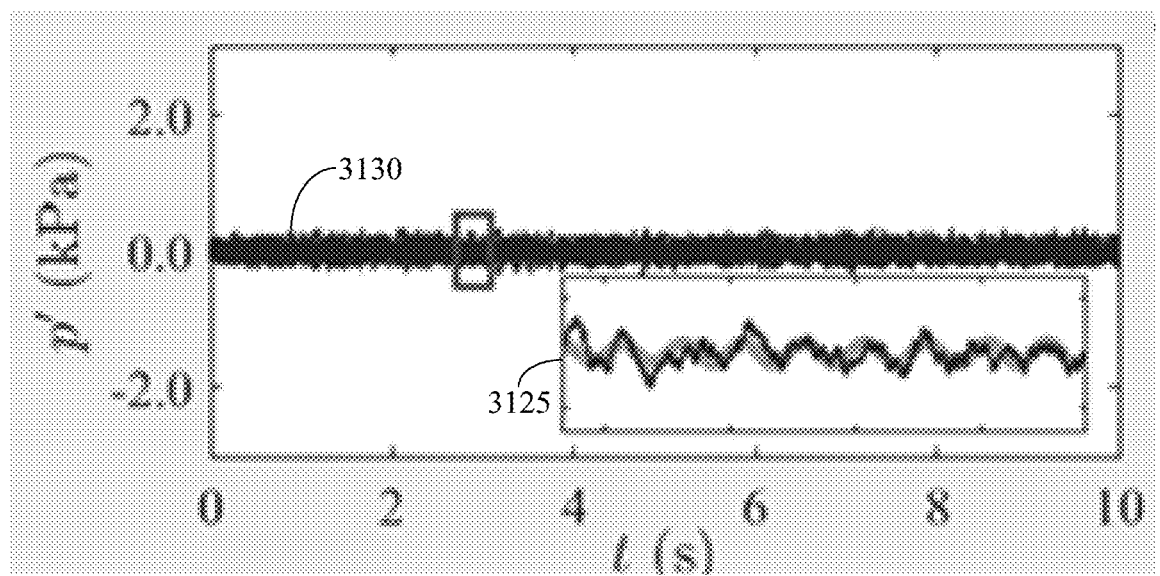
Figure 31C:
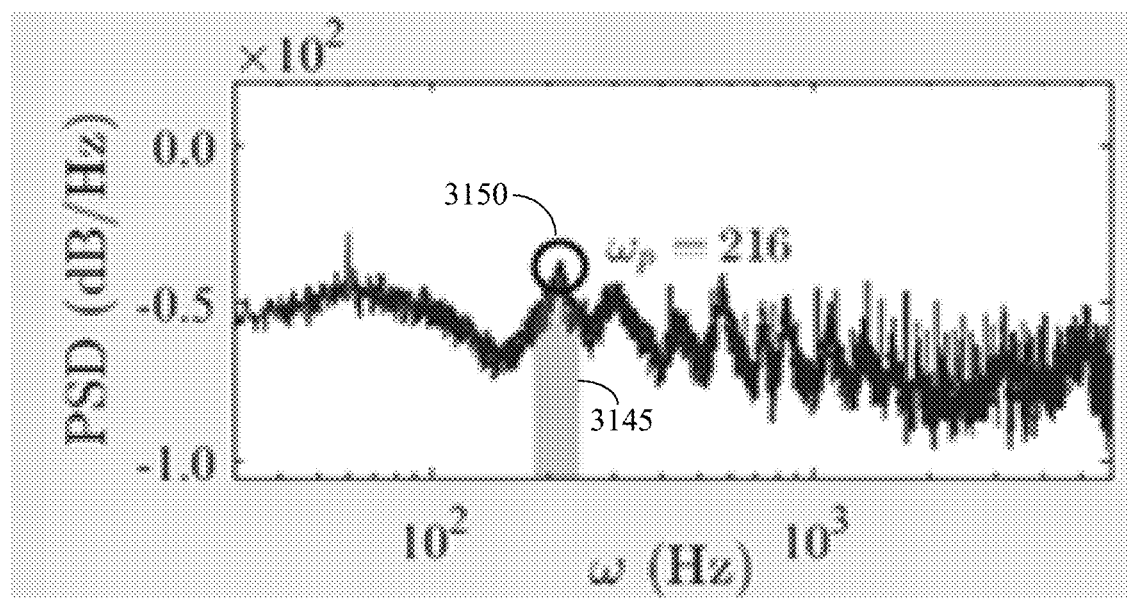
Figure 31D:
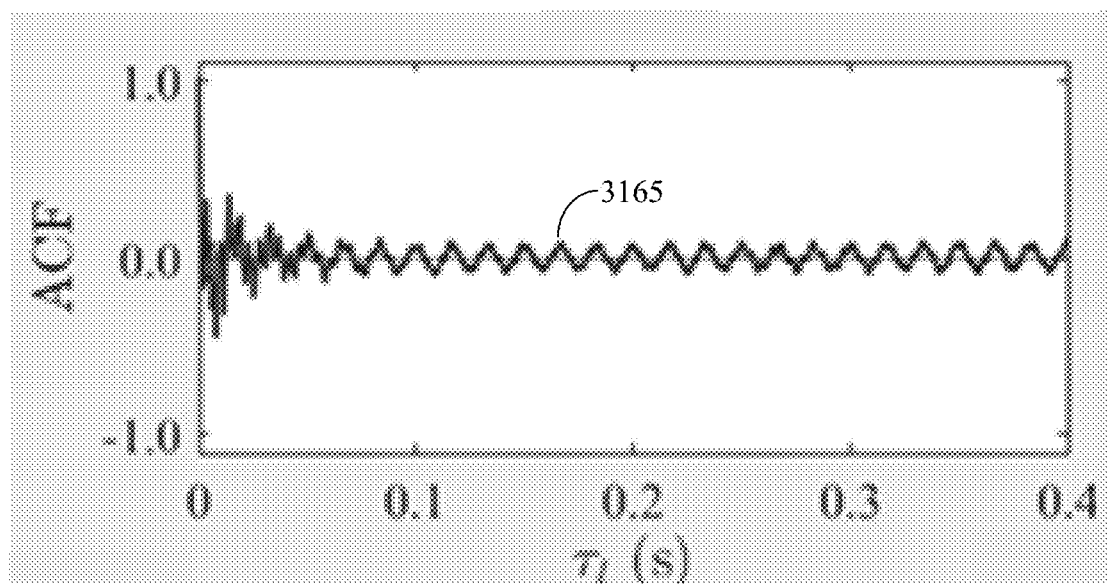
Figure 32A:
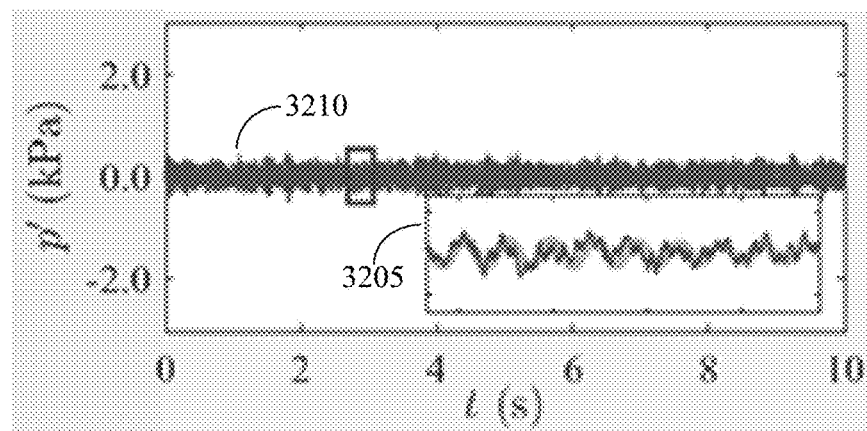
Figure 32B:
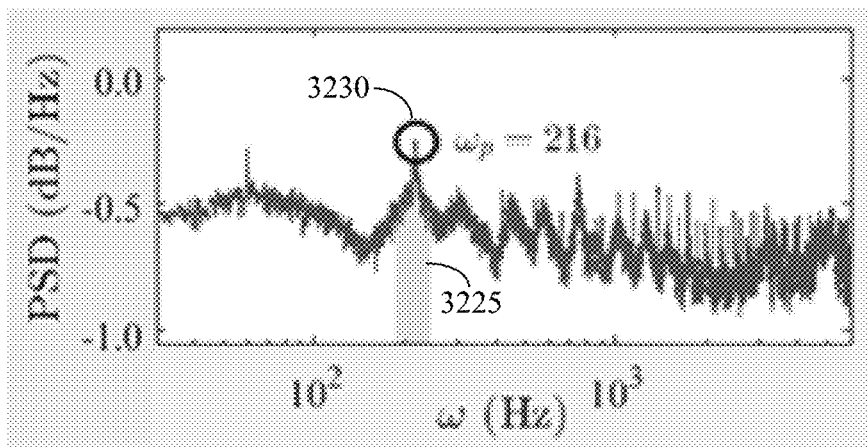
Figure 32C:
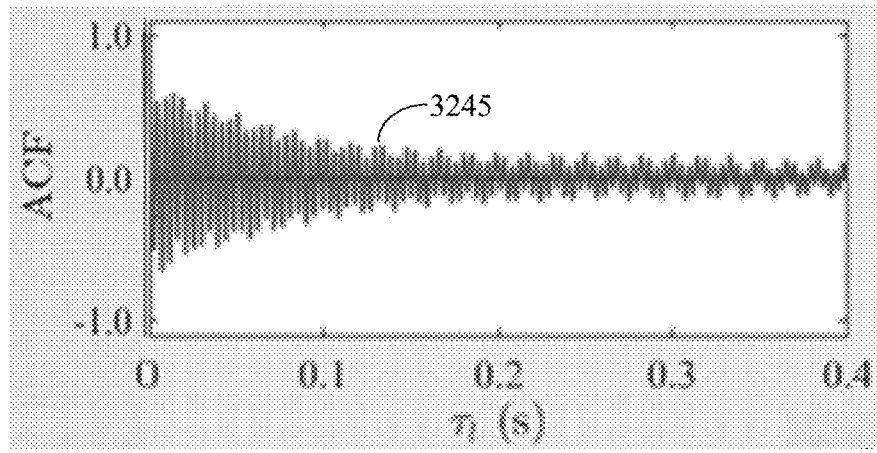

FIG. 30 shows a bifurcation diagram 3000, where the amplitude of p' in the combustor 2910 is computed with the Hilbert transform as a function of the combustor length ($l_c$), with the error bars indicating the standard deviation. As $l_c$ increases, a increases smoothly, indicating that the system is transitioning from a fixed point to a limit cycle via a supercritical Hopf bifurcation. The states before and after the Hopf bifurcation point in the bifurcation diagram 3000, which is at $l_c \approx 1500-1550$ mm, including a bifurcation value 3010 around the Hopf bifurcation point, a pre-bifurcation value 3020 and a post-bifurcation value 3030 are examined in FIGS. 31 to 33.

Referring to FIGS. 31A to 31D, a graph 3100 (FIG. 31A) depicts a phase portrait at the pre-bifurcation value of $l_c$ 1375 mm (value 3020 (FIG. 30)), a graph 3120 (FIG. 31B) depicts a time series at the pre-bifurcation value of $l_c$, a graph 3140 (FIG. 31C) depicts a power spectral density (PSD) at the pre-bifurcation value of $l_c$, and a graph 3160 (FIG. 31D) depicts a normalized auto-correlation function (ACF) at the pre-bifurcation value of $l_c$. Similarly, referring to FIGS. 32A to 32C, a graph 3200 (FIG. 32A) depicts a time series at the bifurcation value of $l_c$ 1475 mm (value 3010 (FIG. 30)), a graph 3220 (FIG. 32B) depicts a PSD at the bifurcation value of $l_c$, and a graph 3240 (FIG. 32C) depicts a normalized ACF at the pre-bifurcation value of $l_c$. Finally, a graph 3300 (FIG. 33A) depicts a phase portrait at the post-bifurcation value of $l_c$ 1600 mm (value 3030 (FIG. 30)), a graph 3320 (FIG. 33B) depicts a time series at the post-bifurcation value of $l_c$, a graph 3340 (FIG. 33C) depicts a PSD at the post-bifurcation value of $l_c$, and a graph 3360 (FIG. 33D) depicts a normalized ACF at the pre-bifurcation value of $l_c$. In the graph 3100 (FIG. 31A) and the graph 3300 (FIG. 33A), the average mutual information function is used to obtain the embedding time delay $\tau_d$ for phase-space reconstruction. In the graph 3120 (FIG. 31B), the graph 3200 (FIG. 32A), and the graph 3320 (FIG. 33B), the bandpass filtered time traces are shown as thick lines in the insets 3125, 3205, 3325. In the graph 3140 (FIG. 31C), the graph 3220 (FIG. 32B), and the graph 3340 (FIG. 33C), the shaded regions 3145, 3225, 3345 indicate the width of the bandpass filter. In the graph 3160 (FIG. 31D), the graph 3240 (FIG. 32C), and the graph 3360 (FIG. 33D), the ACF is plotted as a function of the time lag $\tau_l$.

Figure 33A:
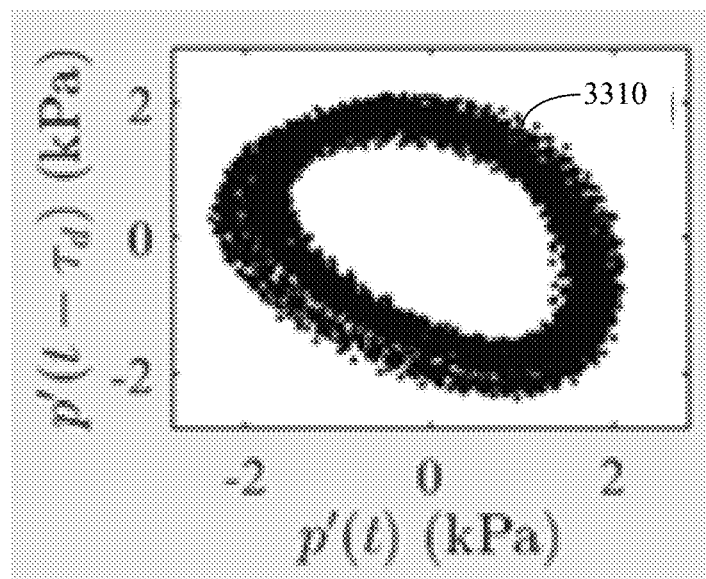
Figure 33B:
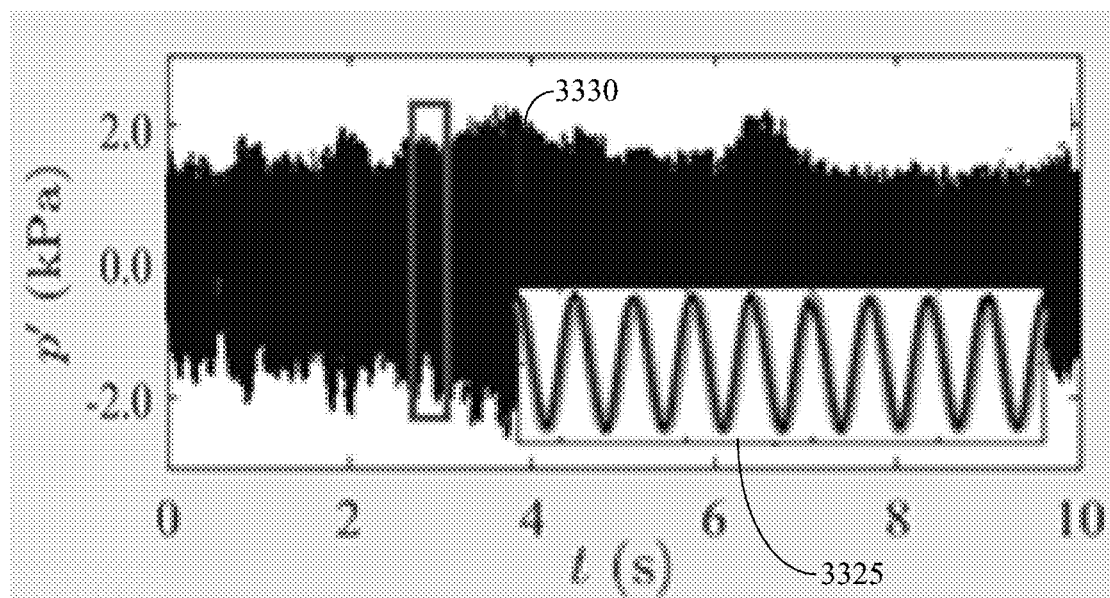
Figure 33C:
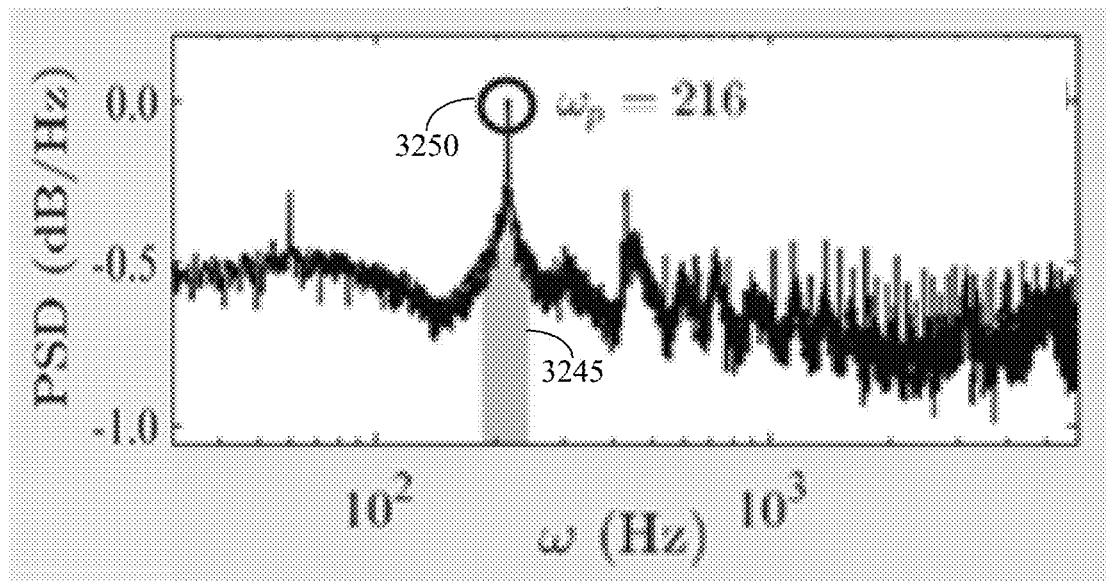
Figure 33D:
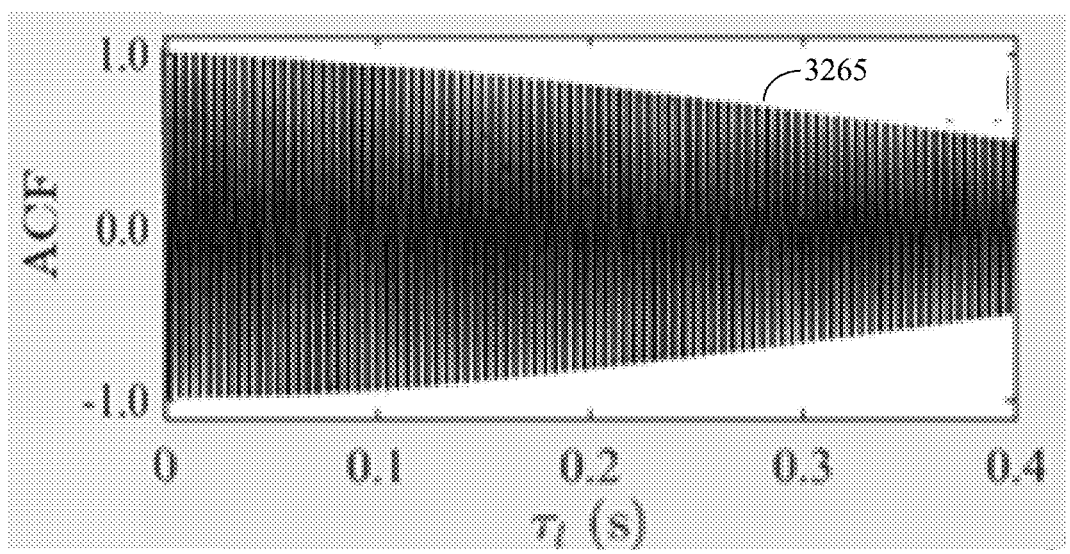

Referring to the graph 3120 (FIG. 31B), well before the Hopf point ($l_c$=1375 mm), the time series 3130 of p' shows low-amplitude aperiodic fluctuations with no sign of coherent motion, while the phase portrait 3110 in the graph 3100 (FIG. 31A) shows a single blob. These features are characteristic of a stable fixed-point attractor in phase space. However, an inspection of the power spectral density (PSD) in the graph 3140 (FIG. 31C) reveals initial signs of an impending instability at a peak 3150 $f_p \approx 216$ Hz. Closer to the Hopf point ($l_c$=1475 mm), the time series 3210 in the graph 3200 remains aperiodic and low in amplitude, while the PSD in the graph 3220 (FIG. 32B) shows a strengthening of the incipient self-excited mode at a peak $f_p$ 3230. After the Hopf point ($l_c$=1600 mm), the system evolves on a stable limit-cycle attractor, as evidenced by a closed trajectory in the phase portrait 3310 in the graph 3300 (FIG. 33A), high-amplitude coherent oscillations in the time series 3330 in the graph 3320 (FIG. 33B), and a sharp discrete peak 3250 at $f_p$ in the PSD in the graph 3240 (FIG. 33C). This transition from a fixed point to a limit cycle is also corroborated by the normalized auto-correlation functions (ACF), whose amplitude envelopes 3165, 3245, is seen to decay increasingly slowly as $l_c$ increases in the graphs 3160 (FIG. 31D), 3240 (FIG. 32C) and 3360 (FIG. 33D), indicating that the system becomes more coherent as it approaches—and then crosses—the Hopf point. For SI in accordance with the methods and frameworks of the present embodiments, the dominant thermoacoustic mode is isolated by bandpass filtering p'(t) around $f_p$ as seen in the insets 3125, 3205, 3315 with a bandwidth of $\Delta f = 0.3 f_p$ as seen in the shaded regions 3145, 3225, 3345.

For the output-only SI of a turbulent combustor, the pressure fluctuations in the combustor 2910 are modeled with a VDP-type oscillator perturbed by additive white Gaussian noise:

$$\ddot{x} - (\varepsilon + \alpha_1 x^2 + \ldots)\dot{x} + \omega^2 x = \sqrt{2d}\eta, \quad (34a)$$

$$x = a\cos(\omega t + \phi), \quad (34b)$$

where x represents p' (with amplitude a and phase $\phi$) and $\omega$ is the oscillation frequency. Following the mathematical transformation described hereinabove, the Fokker-Planck equation is obtained:

$$\frac{\partial}{\partial t} P(a, t) = -\frac{\partial}{\partial a}[D^{(1)} P(a, t)] + \frac{\partial^2}{\partial a^2}[D^{(2)} P(a, t)], \quad (35a)$$

$$D^{(1)} = \left(\frac{\varepsilon}{2} a + \frac{\alpha_1}{8} a^3 + \ldots\right) + \frac{d}{2\omega^2 a}, \quad D^{(2)} = \frac{d}{2\omega^2}. \quad (35b)$$

Figure 34A:
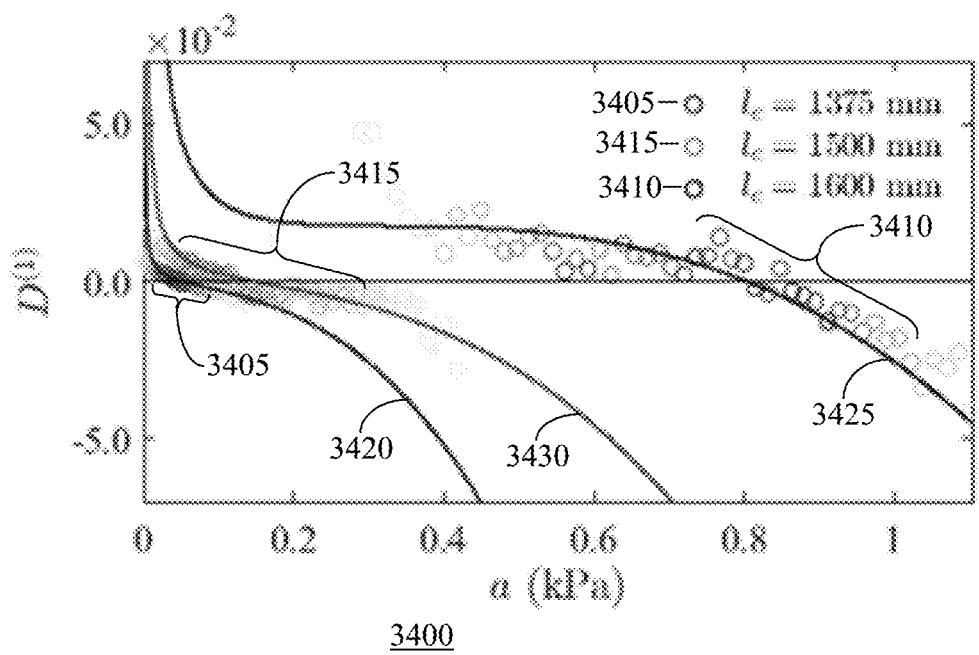
Figure 34B:
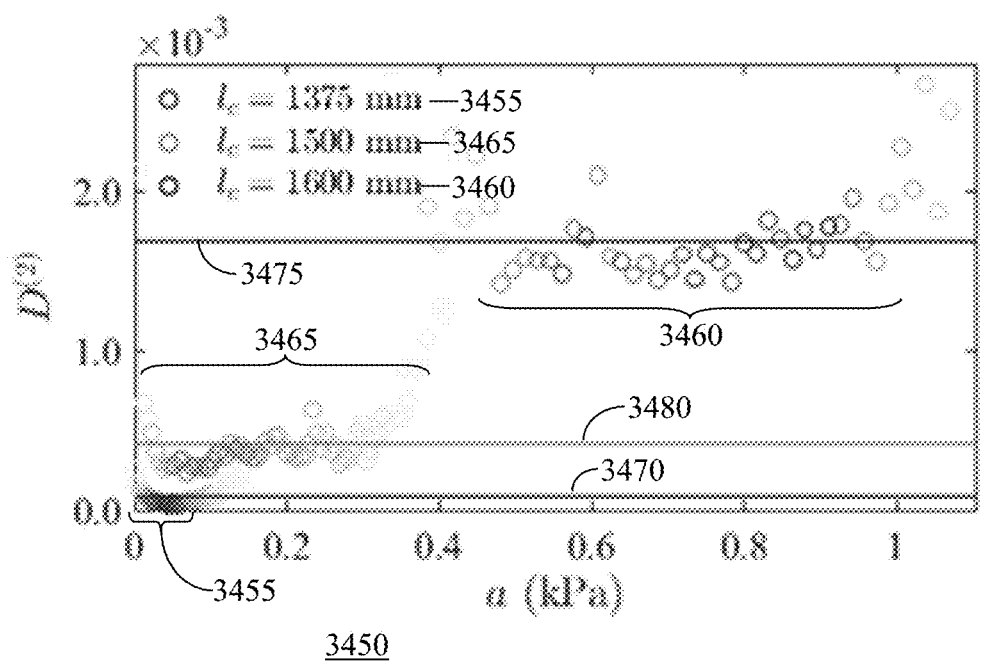
Figure 35A:
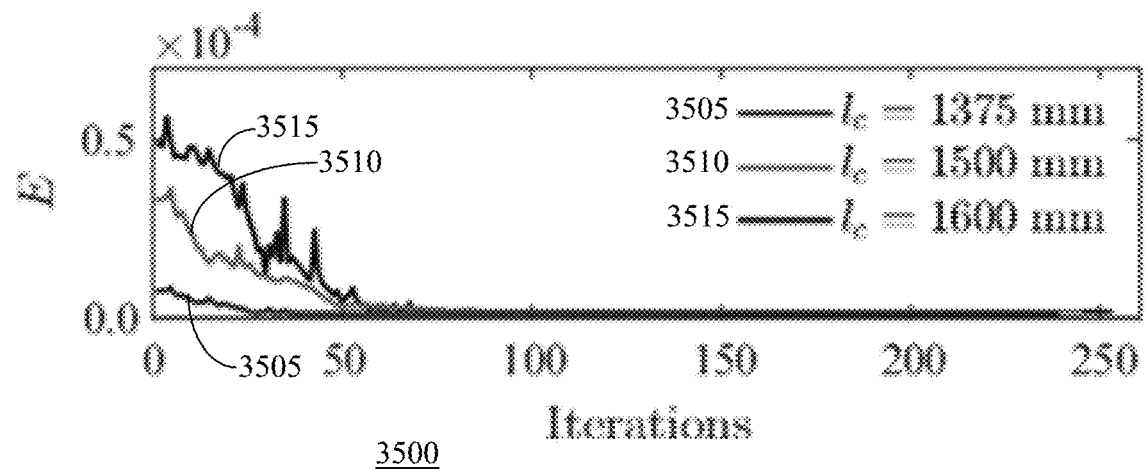
Figure 35B:
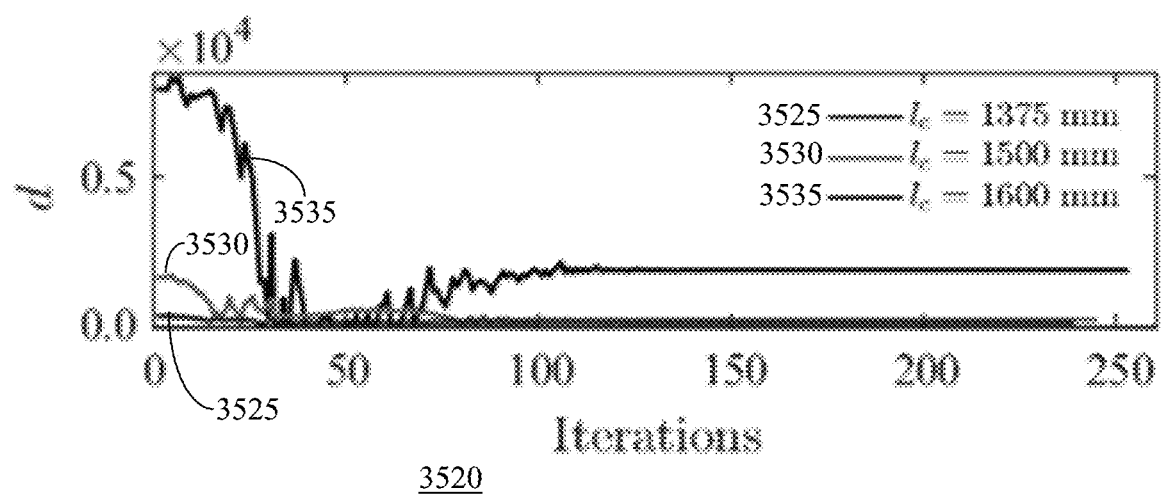
Figure 35C:
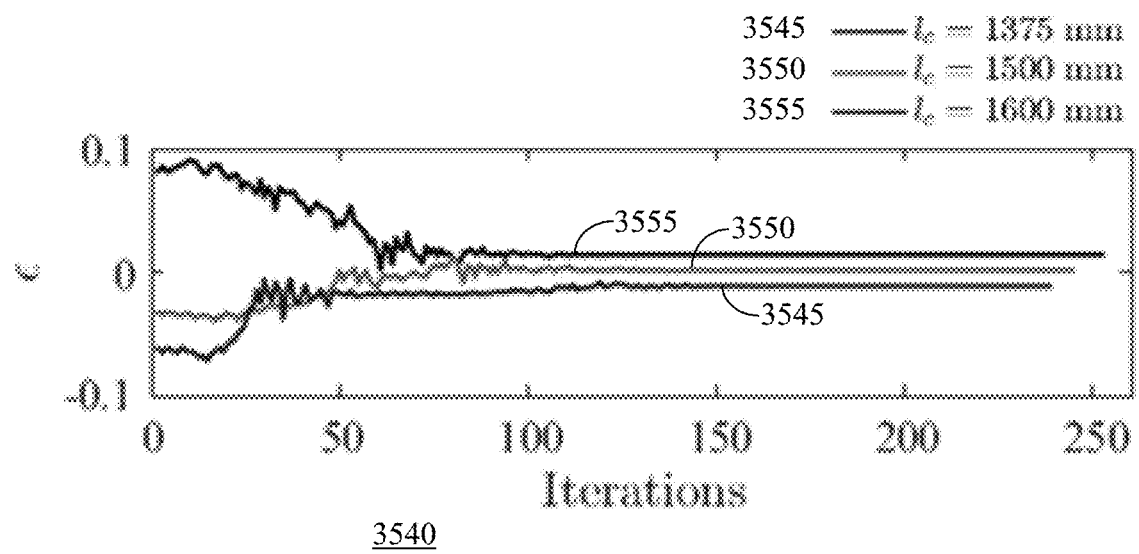
Figure 35D:
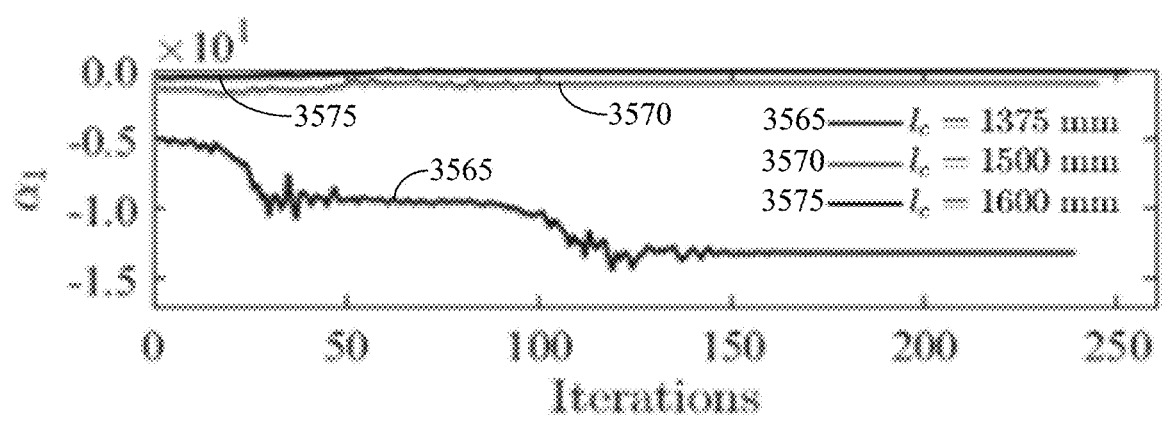

From Equations 23b and 24, $D^{(1)}$ and $D^{(2)}$ are extracted, the order of nonlinearity is determined, and the VDP coefficients are identified through polynomial regression. Referring to FIGS. 34A and 34B, graphs 3400, 3450 depict drift terms and diffusion terms, respectively, as measured experimentally for three combustor lengths ($l_c$) (i.e., experimental data for drift terms 3405 and diffusion terms 3455 at a pre-bifurcation length (1375 mm), for drift terms 3410 and diffusion terms 3460 at a post-bifurcation length (1600 mm), and drift terms 3415 and diffusion terms 3465 at a length around the bifurcation point (1500 mm)) and their regression (drift regression 3420, 3425, 3430 and diffusion regression 3470, 3475, 3480) based on Equation 35b in accordance with the methods and frameworks of the present embodiments. The intensity of the markers for the experimental data of the drift terms 3420, 3425, 3430 and the diffusion terms 3470, 3475, 3480 indicates the magnitude of P(a).

Next, the extracted VDP coefficients are optimized as discussed hereinabove. Specifically, the PDF-weighted error (i.e., E in Equation 27) is minimized between the experimental estimation and the numerical (coefficient-based) $D_\tau^{(n)}$ through a Nelder-Mead simplex algorithm.

In accordance with the methods and frameworks of the present embodiments, the values of $\tau_j$ are distributed uniformly between a lower bound ($\tau_1 = \Delta f^T$) and an upper bound ($\tau_2$), where $ACF_{r,2} = 0.25$ and [$\varepsilon$, $\alpha_1$, d] is updated until [E, $\varepsilon$, d] have converged, i.e. until every coefficient varies by less than 0.01% of its initial value. FIGS. 35A to 35D depict graphs 3500, 3520, 3540, 3560 which show the convergence history of E, $\varepsilon$, $\alpha_1$, d, for a pre-bifurcation combustor length ($l_c$=1375 mm), a bifurcation combustor length ($l_c$=1500 mm), and a post-bifurcation combustor length ($l_c$=1600 mm). The graph 3500 (FIG. 35A) illustrates the convergence histories 3505, 3510, 3515 of E for the pre-bifurcation, bifurcation, and post-bifurcation combustor lengths, respectively. The graph 3520 (FIG. 35B) illustrates the convergence histories 3525, 3530, 3535 of d, for the pre-bifurcation, bifurcation, and post-bifurcation combustor lengths, respectively. The graph 3540 (FIG. 35C) illustrates the convergence history 3550 of ε for the pre-bifurcation, bifurcation, and post-bifurcation combustor lengths, respectively. And the graph 3560 (FIG. 35D) illustrates the convergence history 3570 of $\alpha_1$ for the pre-bifurcation, bifurcation, and post-bifurcation combustor lengths, respectively. The initial values of E, ε, $\alpha_1$, d at the first iteration are obtained from Equations 23b and 24 (see also FIGS. 34A and 34B). As seen in each of the graphs 3500, 3520, 3540, 3560 convergence is achieved at the $239^{th}$ iteration for the pre-bifurcation combustion length ($l_c$=1375 mm), the $245^{th}$ iteration for the bifurcation combustion length ($l_c$=1500 mm), and the $253^{th}$ iteration for the post-bifurcation combustion length ($l_c$=1600 mm). It can be seen that the optimization significantly reduces the error (E) between the experimental and numerical solutions.

Figure 36A:
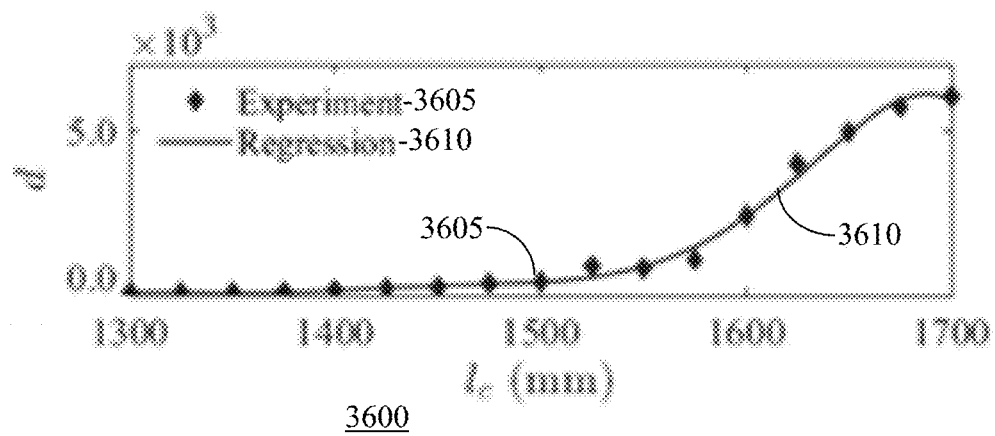
Figure 36B:
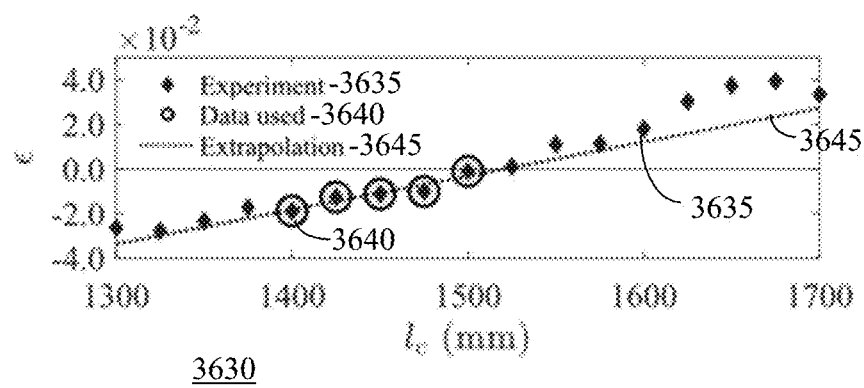
Figure 36C:
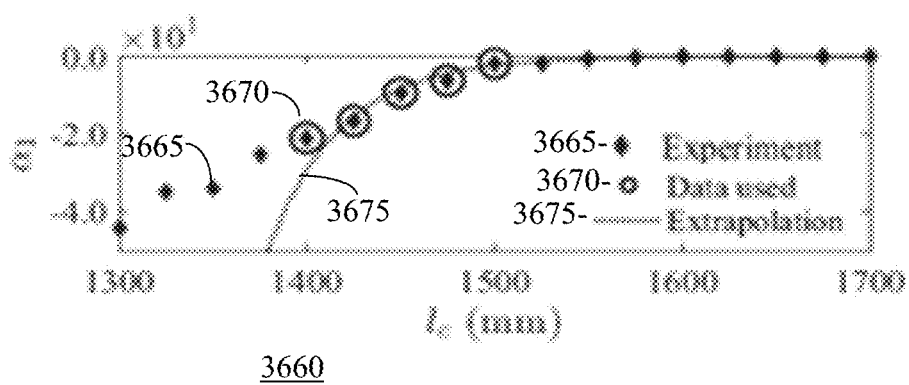

Referring to FIGS. 36A, 36B and 36C, graphs 3600, 3630, 3660 depict amplitude and coefficients after optimization by SI in accordance with the methods and frameworks of the present embodiments. The graph 3600 (FIG. 36A) depicts both experimental data 3605 and a regression trace 3610 of the noise amplitude d. The graph 3630 (FIG. 36B) depicts experimental data 3635 of the linear VDP coefficient ε and an extrapolation 3640 from the fixed-point regime to the limit-cycle regime of selected data 3645 using a linear model. And the graph 3660 (FIG. 36C) depicts experimental data 3665 of the highest identifiable nonlinear VDP coefficient $\alpha_1$ and an extrapolation 3670 from the fixed-point regime to the limit-cycle regime of selected data 3675 using a power-law model.

To perform SI with only pre-bifurcation data, the identified coefficients are extrapolated into the limit-cycle regime. As the system model in accordance with the methods and frameworks of the present embodiments is particularly valid near the Hopf bifurcation point, the $l_c$ range over which the extrapolation is performed is limited. Recognizing, in addition, that the linear coefficient ε0 varies linearly only within a finite range of $l_c$ near the Hopf bifurcation point, we perform SI is performed within this range only. The term $\varepsilon_l$ is found such that $\varepsilon_l < \varepsilon_{l+1} < \varepsilon_{l+2} < \varepsilon_{l+3}$, and $\varepsilon_l, \varepsilon_{l+1}, \ldots, \varepsilon_{l+k}$ and $\alpha_1, \alpha_{l+1}, \ldots, \alpha_{l+k}$ are used where $\varepsilon_{l+k} < 0$. In other words, the prediction is initiated when four consecutive increases in |ε| have occurred as shown in the graphs 3600, 3630, 3660. Using fixed-point data at $1400 \le l_c \le 1500$ mm, ε is extrapolated with a linear model and $\alpha_1$ is extrapolated with a power-law model as discussed hereinabove. In this way, the Hopf bifurcation point—across which ε changes sign—is identified to be at $l_c$=1521 mm. In accordance with the methods and frameworks of the present embodiments, this is advantageously done without the use of ad-hoc instability thresholds, in contrast to conventional early warning indicators of thermoacoustic instability.

Figure 37:
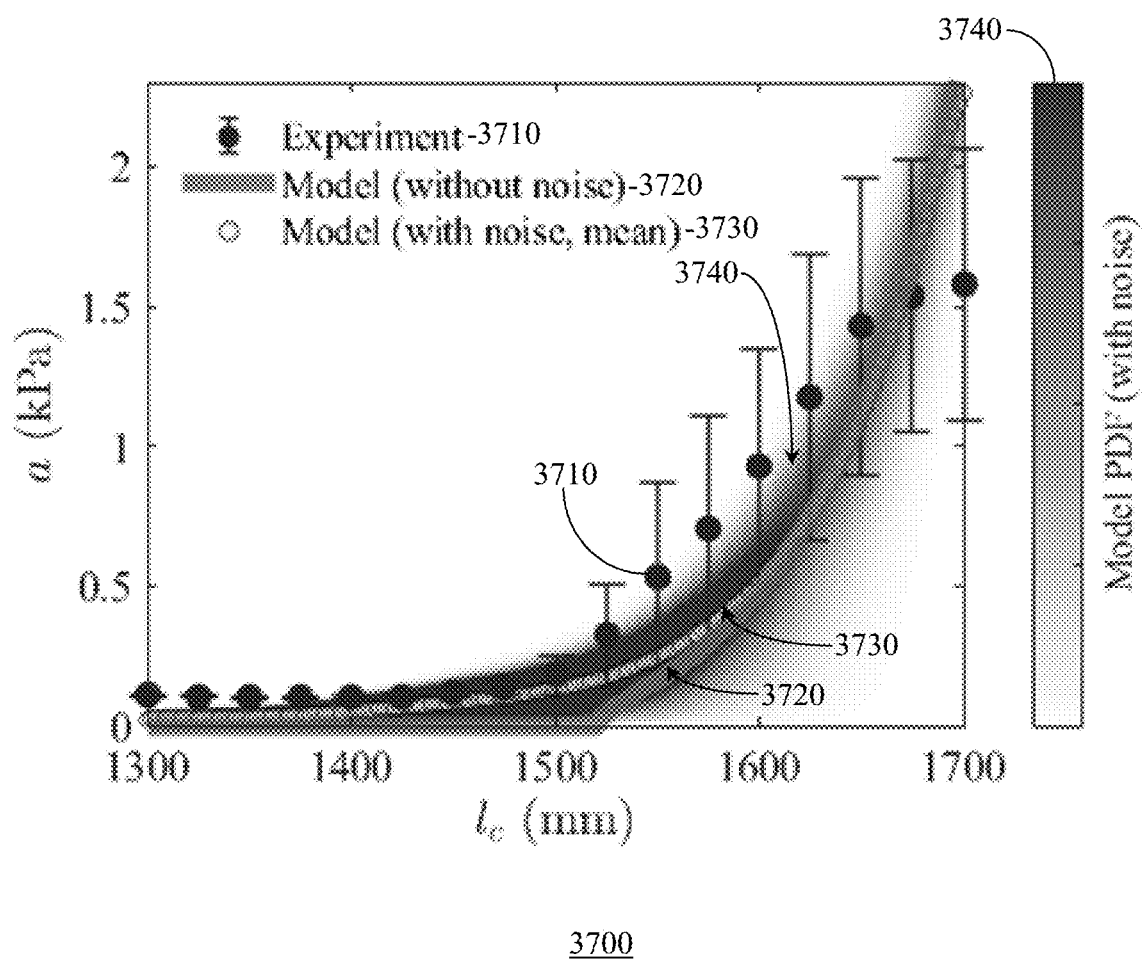
FIG. 37 depicts a comparison of a bifurcation diagram of experimental data, a bifurcation diagram derived from the noise-free model in accordance with the present embodiments, and a bifurcation diagram derived from the noise-perturbed model in accordance with the present embodiments.

Next, the extrapolated coefficients are used to solve the Stuart-Landau equation, thereby reconstructing the noise-free bifurcation diagram. Referring to FIG. 37, a graph 3700 compares bifurcation diagrams of experimental data 3710 (markers with error bars denoting the standard deviation), the noise-free model 3720, and the noise-perturbed model 3730. The shading 3740 in the background represents the model PDF computed after adding the identified noise profile, whose mean values are plotted 3730. Despite the linear assumption of ε and the fact that the highest identifiable nonlinearity is only cubic ($\alpha_1$), the agreement between the noise-free model and the experiments is reasonable. However, a closer inspection of the graph 3700 reveals that the experimental amplitude begins to grow even before the SI-predicted Hopf bifurcation point. Hypothesizing that this discrepancy might be due to the high level of intrinsic noise arising from turbulence in the combustor, the noise profile is extracted using SI (see the graph 3600 (FIG. 36A)). Instead of solving the noise-free Stuart-Landau equation, the stationary Fokker-Planck equation (Equation 28) is solved. In this way, a PDF-based bifurcation diagram is built that matches the experimental data more closely than the noise-free predictions 3720. The limit-cycle amplitude after the Hopf bifurcation point is also well predicted with the noise-perturbed model, highlighting the important role that stochastic processes play in determining the bifurcation diagram.

Using the noise-induced dynamics generated by inherent turbulence in the fixed-point regime in accordance with the methods and frameworks of the present embodiments, output-only SI has been performed of a turbulent lean-premixed combustor operating near a Hopf bifurcation. The pressure fluctuations in the combustor are modeled with a VDP-type equation and its corresponding Stuart-Landau equation. The model coefficients are determined with the transitional Fokker-Planck equation, and optimize with an adjoint-based algorithm. The effects of intrinsic noise due to turbulence are accounted for by solving the stationary Fokker-Planck equation with the identified noise profile. Through comparisons with experimental data, it has been shown that this SI technique can predict in accordance with the methods and frameworks of the present embodiments (i) the location of the Hopf bifurcation point, (ii) the order of nonlinearity, and (iii) the limit-cycle amplitude after the Hopf bifurcation point.

The SI technique in accordance with the methods and frameworks of the present embodiments has three notable strengths. First, it is simple, requiring just a single sensor and no actuator. Second, it uses data from only the fixed-point regime, before the Hopf bifurcation point itself, where the oscillation amplitude is still small. This implies that the technique is suitable for early warning detection of thermoacoustic instability, which is useful in practical combustion systems. Third, unlike most existing early warning indicators, the technique in accordance with the methods and frameworks of the present embodiments requires no ad-hoc instability thresholds, implying that it can be applied to a variety of turbulent thermoacoustic systems.

This SI technique, however, has two notable limitations. First, it works only when the system is close to the Hopf point and only when the control parameter (in this case $l_c$) is varied in small enough increments to allow for sufficient data collection. Second, owing to noise in the combustor, there is some discrepancy in the bifurcation diagrams of the experiments and the noise-free model. Although it has been shown that this discrepancy can be reduced near the Hopf bifurcation point by incorporating the noise profile from SI, the noise profile itself cannot be obtained without first observing the system in its limit-cycle regime. Thus, to be able to reconstruct a bifurcation diagram that accounts for the probabilistic effects of noise with only fixed-point data, one would have to develop a more advanced framework for predicting the noise profile based on the methods and frameworks of the present embodiments as disclosed herein.

Figure 38:
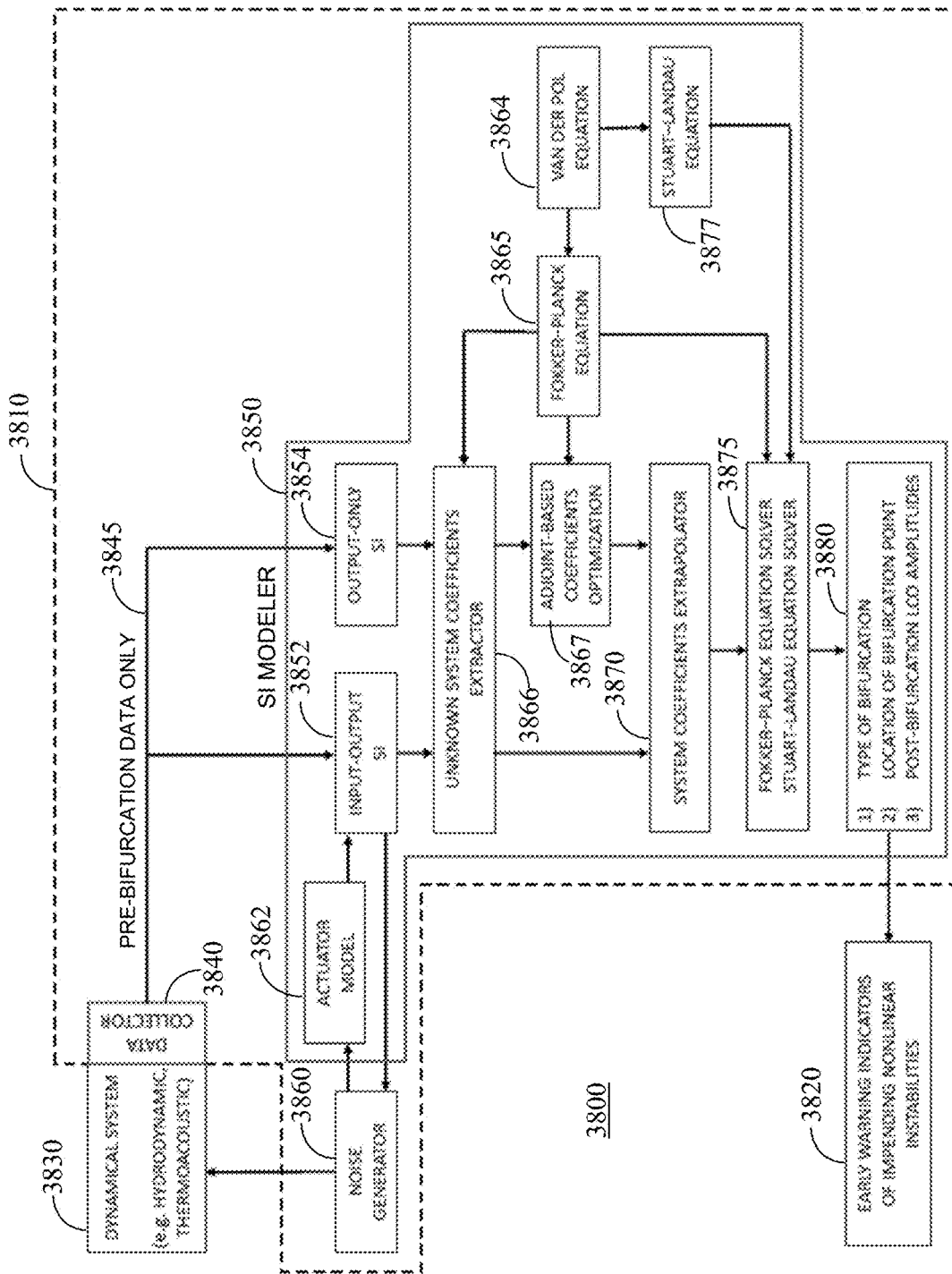
FIG. 38 depicts a block diagram of a framework for generating early-warning indicators of impending nonlinear instabilities of a dynamical system in accordance with the present embodiments.

In accordance with the methods and frameworks of the present embodiments, a system identification (SI) framework that exploits the noise-induced dynamics in the fixed-point regime (i.e. pre-bifurcation regime) is disclosed. Referring to FIG. 38, a block diagram 3800 depicts a framework 3810 for generating early-warning indicators of impending nonlinear instabilities 3820 of a dynamical system 3830 in accordance with the present embodiments. The framework 3810 includes a data collector 3840 coupled to the dynamical system 3830 for collecting data such as thermoacoustic fluctuations and a system identification (SI) modeler 3850 coupled to the data collector 3840 to receive data therefrom. Unlike conventional SI frameworks, the SI modeler 3850 in accordance with the present embodiments can predict the early-warning indicators of impending nonlinear instabilities 3820 using only pre-bifurcation data 3845 (i.e., the SI modeler 3850 does not require ad-hoc instability thresholds and can forecast the post-bifurcation behavior (i.e., limit-cycle amplitudes) using nothing more than the pre-bifurcation data). The SI modeler 3850 includes an input-output SI approach 3852 and an output-only approach 3854. The input-output SI approach 3852 controls a noise generator 3860 to feed noise, such as Gaussian white noise, into the dynamical system 3830, and a stochastic response of the dynamical system 3830 is measured. An actuator model 3862 is coupled to the noise generator 3860 to convert the noise generator input voltage into a noise amplitude (d) developed for use by the input-output SI approach 3852. The output-only SI approach 3854 uses intrinsic noise of the system 3830, namely turbulence and only the unperturbed data is collected.

The SI modeler 3850 models the system 3830 with a self-sustained oscillator model together with any additive noise term to generate a noise profile using a VDP-type equation 3864. By assuming that an amplitude of oscillations varies much more slowly than the oscillations themselves and by using stochastic averaging, the corresponding Fokker-Planck equation 3865, which can describe the probability density function of the oscillation amplitude, is derived from the VDP equation 3864. The model coefficients are determined by an unknown system coefficients extractor 3866 using the Fokker-Planck equation 3865. For the output-only SI approach 3854, the system coefficients are optimized with an adjoint-based coefficient optimization algorithm 3867 which uses the Fokker-Planck equation 3865 to extract unknown coefficients from the drift and diffusion terms of the collected data.

In both the input-output SI approach 3852 and the output-only SI approach 3854, a system coefficient extrapolator 3870 extrapolates the system coefficients from the extracted unknown coefficients using linear/power-law regression. To account for the effects of extrinsic noise, an equation solver 3875 solves the Fokker-Planck equation with the noise profile represented by the extrapolated system coefficients. For noise-free environments modeled with a VDP-type equation 3864, the equation solver 3875 solves a Stuart-Landau equation 3877 corresponding to the VDP model. The solutions of the equation solver 3875 are used by the SI modeler to predict locations and types of a bifurcation and the limit-cycle behavior (i.e. in the post-bifurcation regime) 3880 from only the fixed-point regime (i.e., the pre-bifurcation regime). The predictions 3880 are used to generate the early warning indicators 3820 of impending nonlinear instabilities.

In accordance with the present embodiments, the framework 3810 has been demonstrated on three experimental dynamical systems 3830: a laminar hydrodynamic system (e.g., a low-density jet), a laminar thermoacoustic system (e.g., a flame-driven Rijke tube), and a turbulent thermoacoustic system (e.g., a gas turbine combustor). In some dynamical systems exhibiting low intrinsic noise, the SI modeler 3850 can reconstruct the bifurcation diagram by the equation solver 3875 solving the noise-free Stuart-Landau equation 3877 with the extrapolated coefficients 3870. The bifurcation point and the post-bifurcation limit-cycle amplitude 3880 can then be obtained from the reconstructed bifurcation plot.

Thus, it can be seen that the methods and frameworks in accordance with the present embodiments enable forecasting the location and type of the bifurcation and the post-bifurcation limit-cycle behavior using only fixed-point data (i.e., pre-bifurcation data). In addition, the present embodiments capture the dynamics of the main frequency of thermoacoustic oscillations, even when the signal is contaminated by other modes. Further, the methods and frameworks in accordance with the present embodiments can be used to reliably forecast thermoacoustic instability in turbulent thermoacoustic systems. Novel SI has been demonstrated by the present embodiments using data from only the unconditionally stable regime, prior to a Hopf bifurcation point itself.

A further aspect of the present embodiments validates that the Stuart-Landau equation is valid in the vicinity of a Hopf bifurcation where the growth rate is still small for many nonlinear dynamical systems. Therefore, the methods and frameworks in accordance with the present embodiments can be used to forecast a Hopf bifurcation and the resulting limit-cycle dynamics without the need for any post-bifurcation data or ad-hoc instability thresholds.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A framework for generating early-warning indicators of impending nonlinear instabilities of a low-density jet comprising:
 a data collector coupled to the low-density jet for collecting pre-bifurcation data; and
 a system identification (SI) modeler for predicting early-warning indicators of impending nonlinear instabilities using only the pre-bifurcation data, wherein the SI modeler comprises:
  a system coefficient extrapolator for extrapolating van der Pol (VDP) coefficients in response to the pre-bifurcation data; and
  an equation solver for solving a Fokker-Planck equation with a noise profile represented by the extrapolated VDP coefficients to generate precursors to a Hopf bifurcation and/or to identify a type of the Hopf bifurcation and/or to forecast limit-cycle oscillation (LCO) amplitudes of a post-bifurcation regime;
 wherein the SI modeler predicts the type of the Hopf bifurcation and the LCO amplitudes of the post-bifurcation regime and generates the early-warning indicators of impending nonlinear instabilities of the low-density jet in response to the prediction;
 wherein the SI modeler further comprises a means for input-output SI, and wherein the means for input-output SI comprises an actuator modeler and a means for extracting unknown system coefficients; and wherein the data collector comprises means to measure flow fluctuations in the low-density jet, and wherein the SI modeler utilizes the means for input-output SI to predict the early-warning indicators of impending nonlinear instabilities using only the pre-bifurcation data.

2. The framework in accordance with claim 1 wherein the framework further comprises an additive noise generator coupled to the low-density jet to perturb flow oscillations of the low-density jet with different levels of white Gaussian noise generated by the additive noise generator, and wherein the SI modeler utilizes a self-sustained oscillator model and its corresponding Fokker-Planck equation to predict the early-warning indicators of impending nonlinear instabilities using only the pre-bifurcation data.

3. The framework in accordance with claim 1 wherein the type of the Hopf bifurcation comprises a supercritical Hopf bifurcation or a subcritical Hopf bifurcation.

4. A framework for generating early-warning indicators of impending nonlinear instabilities of a gas turbine combustor comprising:
a data collector coupled to the gas turbine combustor for collecting pre-bifurcation data; and
a system identification (SI) modeler for predicting early-warning indicators of impending nonlinear instabilities using only the pre-bifurcation data, wherein the SI modeler comprises:
a system coefficient extrapolator for extrapolating van der Pol (VDP) coefficients in response to the pre-bifurcation data; and
an equation solver for solving a Fokker-Planck equation with a noise profile represented by the extrapolated VDP coefficients to generate precursors to a Hopf bifurcation and/or to identify a type of the Hopf bifurcation and/or to forecast limit-cycle oscillation (LCO) amplitudes of a post-bifurcation regime;
wherein the SI modeler predicts the type of the Hopf bifurcation and the LCO amplitudes of the post-bifurcation regime and generates the early-warning indicators of impending nonlinear instabilities of the gas turbine combustor in response to the prediction;

wherein the SI modeler further comprises a means for input-output SI, and wherein the means for input-output SI comprises an actuator modeler and a means for extracting unknown system coefficients; and wherein the data collector comprises means to measure flow fluctuations in the gas turbine combustor, and wherein the SI modeler utilizes the means for input-output SI to predict the early-warning indicators of impending nonlinear instabilities using only the pre-bifurcation data.

5. The framework in accordance with claim 4 wherein the means to measure flow fluctuations in the gas turbine combustor comprises a microphone.

6. The framework in accordance with claim 4 wherein the framework further comprises a noise generator coupled to the gas turbine combustor to perturb flow oscillations of the gas turbine combustor with different levels of noise generated by the additive noise generator, and wherein the SI modeler utilizes a type of the VDP equation to model the gas turbine combustor perturbed by the additive noise and a Fokker-Planck equation to identify the nonlinear behavior in the post-bifurcation regime in order to predict the early-warning indicators of impending nonlinear instabilities using only the pre-bifurcation data.

7. The framework in accordance with claim 6 wherein the SI modeler further uses an actuator model responding to a noise-induced response of the gas turbine combustor to the additive noise to predict the early-warning indicators of impending nonlinear instabilities using only the pre-bifurcation data.

8. The framework in accordance with claim 2 wherein the SI modeler further determines the location of the bifurcation points separating the pre-bifurcation regime from the post-bifurcation regime and determines the limit-cycle oscillations in the post-bifurcation regime.

9. The framework in accordance with claim 4 wherein the type of the Hopf bifurcation comprises a supercritical Hopf bifurcation or a subcritical Hopf bifurcation.

* * * * *